(12) United States Patent
Zimmerman

(10) Patent No.: US 11,255,482 B1
(45) Date of Patent: Feb. 22, 2022

(54) QUICK-RELEASE ANCHORING APPARATUS WITH ACCELERATION DAMPING

(71) Applicant: Israel Harry Zimmerman, Los Angeles, CA (US)

(72) Inventor: Israel Harry Zimmerman, Los Angeles, CA (US)

( * ) Notice: Subject to any disclaimer, the term of this patent is extended or adjusted under 35 U.S.C. 154(b) by 0 days.

(21) Appl. No.: 17/137,644

(22) Filed: Dec. 30, 2020

(51) Int. Cl.
*F16M 13/02* (2006.01)
*F16B 47/00* (2006.01)

(52) U.S. Cl.
CPC .......... *F16M 13/022* (2013.01); *F16B 47/00* (2013.01)

(58) Field of Classification Search
CPC combination set(s) only.
See application file for complete search history.

(56) References Cited

U.S. PATENT DOCUMENTS

| | | |
|---|---|---|
| 1,518,943 A | 12/1924 | Story |
| 1,753,611 A | 4/1930 | Lower |
| 1,778,175 A | 10/1930 | Thune |
| 1,840,400 A | 1/1932 | Lebherz |
| 2,083,299 A | 6/1937 | Hunter |
| 2,233,870 A | 3/1941 | Muter |
| 2,542,400 A | 2/1951 | Donofrio |
| 2,565,793 A | 8/1951 | Weismantel |
| 2,601,279 A | 6/1952 | Hacus |
| 2,740,545 A | 9/1956 | Bates |
| 2,782,948 A | 2/1957 | Steinberg |
| 2,839,260 A | 6/1958 | Jacobi, Jr. |
| 2,895,636 A | 7/1959 | Martin |
| 2,908,473 A | 10/1959 | Snyder |
| 2,910,264 A | 10/1959 | Lindenberger |
| 2,932,119 A | 4/1960 | Borah |
| 2,936,139 A | 5/1960 | Lindstrom |
| 2,963,256 A | 12/1960 | Borah |
| 2,968,888 A | 1/1961 | Borah |
| 3,094,235 A | 6/1963 | Lunning |

(Continued)

FOREIGN PATENT DOCUMENTS

| | | |
|---|---|---|
| CN | 1079886 A1 | 12/1993 |
| CN | 203987324 U | 12/2014 |

(Continued)

*Primary Examiner* — Monica E Millner
(74) *Attorney, Agent, or Firm* — Walter W. Duft

(57) ABSTRACT

A quick-release anchoring apparatus with acceleration damping includes an anchor member configured to engage an external reference surface and form a substantially airtight seal therewith that defines a controlled pressure zone. A first auxiliary component carries the anchor member. A vent port provides fluid communication between the controlled pressure zone and an area of ambient pressure. A second auxiliary component moves relative to the first auxiliary component between a vent port closure position and a vent port open position. The second auxiliary component and the first auxiliary component are discrete components. One or more flexible members deform as the second auxiliary component moves in a venting direction away from the vent port closure position toward the vent port open position. The one or more flexible members resist accelerations of the second auxiliary component away from the vent port closure position but allow normal lifting of the anchoring apparatus.

20 Claims, 28 Drawing Sheets

(56) References Cited

U.S. PATENT DOCUMENTS

| | | |
|---|---|---|
| 3,159,370 A | 12/1964 | Rubinstein |
| 3,383,001 A | 5/1968 | Wei |
| 3,675,886 A | 7/1972 | Kampmier |
| 3,847,324 A | 11/1974 | Uchanski et al. |
| 4,040,549 A | 8/1977 | Sadler |
| 4,127,211 A | 11/1978 | Zerbey |
| 4,133,575 A | 1/1979 | Mader |
| 4,137,356 A | 1/1979 | Shoemaker et al. |
| 4,593,947 A * | 6/1986 | Yocum .................. B25B 11/007 294/187 |
| 4,726,553 A | 2/1988 | Wischusen, III |
| 4,756,497 A | 7/1988 | Lan |
| 4,759,525 A | 7/1988 | Cross et al. |
| 4,760,987 A | 8/1988 | Lan |
| 4,836,488 A | 6/1989 | Ross |
| 4,872,721 A | 10/1989 | Sniadach |
| 4,890,760 A | 1/1990 | Nicoll, Sr. et al. |
| 4,928,848 A | 5/1990 | Ballway |
| 4,940,138 A | 7/1990 | Hornstein |
| 4,941,635 A | 7/1990 | Lan |
| 4,955,493 A | 9/1990 | Touzani |
| 4,978,566 A | 12/1990 | Scheurer et al. |
| 5,040,719 A | 8/1991 | Ballway |
| 5,065,973 A | 11/1991 | Wang |
| 5,071,096 A | 12/1991 | Hartman et al. |
| 5,076,527 A | 12/1991 | Yung-Huei |
| 5,133,524 A | 7/1992 | Liu |
| 5,180,132 A | 1/1993 | Pearson et al. |
| 5,186,350 A | 2/1993 | McBride |
| 5,192,043 A | 3/1993 | Fa |
| 5,207,076 A | 5/1993 | Sciarrillo |
| 5,263,760 A * | 11/1993 | Sohol .......................... B60J 3/02 248/205.9 |
| 5,273,182 A | 12/1993 | Laybourne |
| 5,282,541 A | 2/1994 | Chen |
| 5,292,140 A | 3/1994 | Laing |
| 5,381,990 A | 1/1995 | Belokin et al. |
| D357,170 S | 4/1995 | Wellsfry |
| 5,413,302 A | 5/1995 | Ferster |
| 5,511,752 A | 4/1996 | Trethewey |
| 5,531,353 A | 7/1996 | Ward et al. |
| 5,667,180 A | 9/1997 | Duckworth |
| 5,711,501 A * | 1/1998 | Belokin .................. F16B 2/185 248/205.5 |
| 5,742,971 A | 4/1998 | Salinger |
| D397,915 S | 9/1998 | McNaughton |
| D400,763 S | 11/1998 | Taylor et al. |
| 5,992,806 A | 11/1999 | Adams |
| 6,000,575 A | 12/1999 | LaCour et al. |
| 6,039,206 A | 3/2000 | DeFrancesco |
| 6,059,138 A | 5/2000 | Labruyere |
| D439,116 S | 3/2001 | White |
| 6,264,054 B1 | 7/2001 | Miyake et al. |
| 6,315,153 B1 | 11/2001 | Osborn |
| 6,318,683 B1 | 11/2001 | Savoy |
| 6,367,652 B1 | 4/2002 | Toida et al. |
| 6,439,418 B1 | 8/2002 | Immerman et al. |
| 6,491,265 B2 | 12/2002 | Tracy |
| 6,497,394 B1 | 12/2002 | Dunchock |
| 6,511,031 B2 | 1/2003 | Lin |
| 6,520,368 B1 | 2/2003 | Chiu |
| 6,543,637 B1 | 4/2003 | Osborn |
| 6,571,976 B1 | 6/2003 | Sonnabend |
| 6,596,374 B1 | 7/2003 | Adjeleian |
| 6,666,420 B1 | 12/2003 | Carnevali |
| 6,745,987 B2 | 6/2004 | Rousselet et al. |
| 6,776,368 B1 | 8/2004 | Duncan et al. |
| 6,895,642 B2 | 5/2005 | Huang |
| 7,090,183 B2 | 8/2006 | Heybl et al. |
| 7,201,285 B2 | 4/2007 | Beggins |
| 7,306,113 B2 | 12/2007 | El-Saden et al. |
| 7,458,541 B1 | 12/2008 | Chang |
| 7,481,329 B2 | 1/2009 | Camp, Jr. |
| 7,726,715 B2 | 6/2010 | Nagasawa et al. |
| 8,025,169 B2 | 9/2011 | Zimmerman |
| 8,028,850 B2 | 10/2011 | Zimmerman |
| 8,272,523 B1 | 9/2012 | DeMusis, Sr. |
| 8,757,418 B2 | 6/2014 | Zimmerman |
| 9,494,184 B1 * | 11/2016 | Lee ....................... F16M 13/022 |
| 9,521,919 B1 | 12/2016 | Reyes |
| 9,651,229 B1 | 5/2017 | Huang |
| 9,801,483 B2 | 10/2017 | D'Alesio |
| 9,814,332 B2 | 11/2017 | Zimmerman |
| 10,520,009 B2 | 12/2019 | Smith et al. |
| 10,753,384 B1 * | 8/2020 | Chang ..................... F16K 15/14 |
| 2002/0130133 A1 | 9/2002 | Immerman et al. |
| 2003/0075666 A1 | 4/2003 | Dunchock |
| 2003/0102320 A1 | 6/2003 | Park |
| 2004/0238541 A1 | 12/2004 | Camp, Jr. |
| 2004/0238542 A1 | 12/2004 | Camp, Jr. et al. |
| 2006/0175506 A1 | 8/2006 | Lan |
| 2007/0012706 A1 | 1/2007 | Deadman |
| 2007/0205205 A1 | 9/2007 | Kliewer |
| 2008/0093370 A1 | 4/2008 | Darsey |
| 2008/0190948 A1 | 8/2008 | Sayasithsena |
| 2009/0250467 A1 | 10/2009 | Schmidt |
| 2009/0256043 A1 | 10/2009 | Lan |
| 2012/0329534 A1 * | 12/2012 | Barnett ................. G06F 1/1626 455/575.8 |
| 2014/0326630 A1 | 11/2014 | Henry |
| 2015/0230638 A1 | 8/2015 | Jagger |
| 2021/0207647 A1 * | 7/2021 | Liao ....................... F16B 47/00 |

FOREIGN PATENT DOCUMENTS

| | | |
|---|---|---|
| CN | 204015832 U | 12/2014 |
| CN | 204105618 U | 1/2015 |
| CN | 104545306 A | 4/2015 |
| CN | 204500194 U | 4/2015 |
| CN | 105996687 A | 10/2016 |
| DE | 3742636 | 1/1989 |
| EP | 1649788 | 4/2006 |
| JP | H05187430 A | 7/1993 |
| JP | 2000104724 A | 4/2000 |
| JP | 2003501315 | 1/2003 |
| JP | 2004160079 | 10/2004 |
| JP | 2006314739 | 11/2006 |
| WO | WO2012008942 | 1/2012 |
| WO | WO2019097212 A1 | 5/2019 |

* cited by examiner

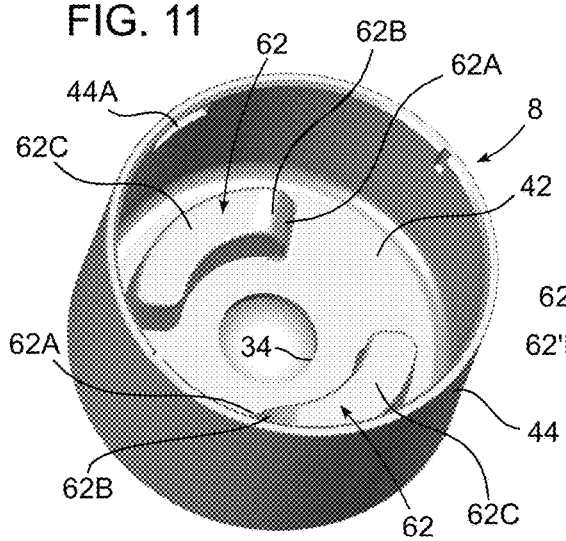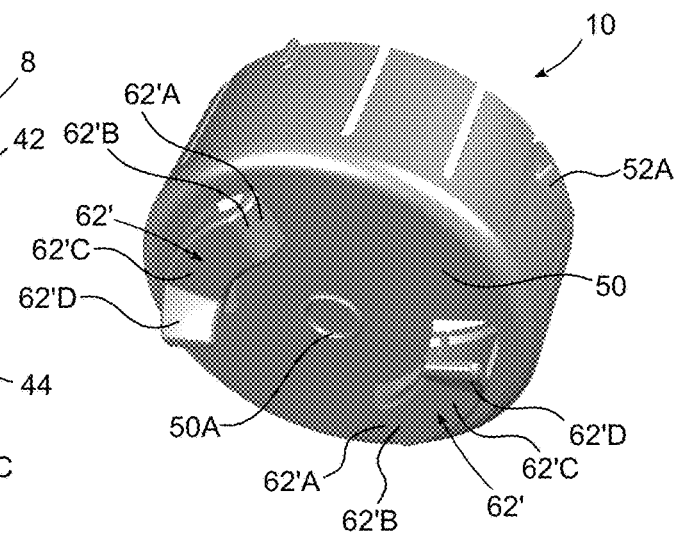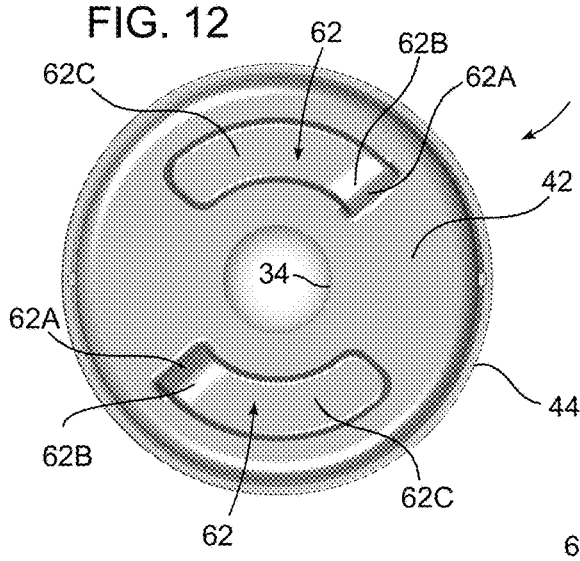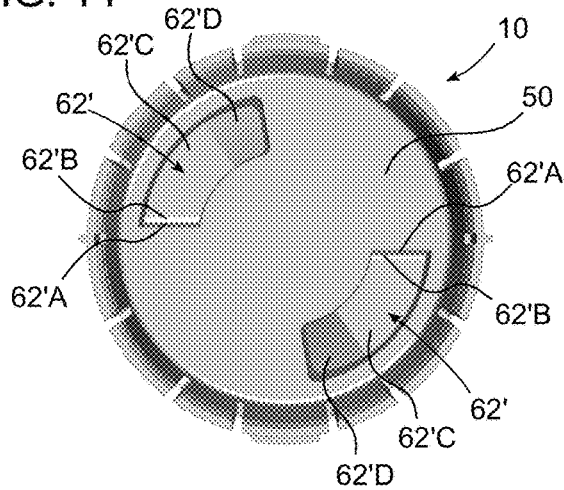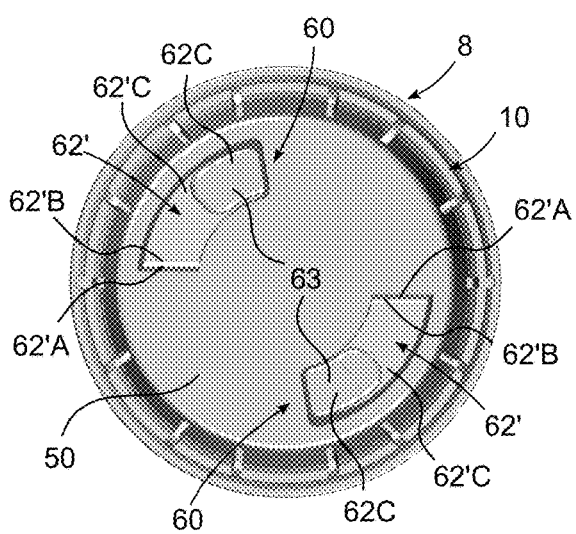

QUICK-RELEASE ANCHORING APPARATUS WITH ACCELERATION DAMPING

BACKGROUND

1. Field

The present disclosure relates to anchoring apparatus for releasably securing objects to surfaces. More particularly, the disclosure concerns anchoring apparatus having anchor members that adhere to surfaces by way of differential pressure when flexed. Still more particularly, the disclosure pertains to anchoring apparatus with quick-release differential pressure venting.

2. Description of the Prior Art

By way of background, anchoring apparatus that operate by way of differential pressure are known. Such apparatus often utilize anchor members such as suction cups and suction seal stabilizers. A suction cup typically includes a flexible base seal member configured as an elastomeric dome-shaped structure having a concave lower side and a relatively soft peripheral rim. In order to adhere the suction cup to a reference surface, the base seal member must be affirmatively flexed by pressing it against the reference surface with enough force to temporarily flatten the concave lower side so that air is expelled outside the peripheral rim. When the pressing force is released, the base seal member has a natural tendency to return to its initial dome shape. As this rebounding occurs, the volumetric cavity that lies inside the peripheral rim between the base seal member's lower side and the reference surface begins to enlarge. This in turn causes the air pressure in the volumetric cavity to proportionately decrease in accordance with Boyle's Law. A pressure differential is generated in which the pressure within the volumetric cavity is lower than the ambient air pressure outside the cavity, thereby resulting in a partial vacuum. The partial vacuum produces a suction force that increases until an equilibrium condition is reached wherein the elastic forces tending to return the base seal member to its initial concave configuration are balanced by the vacuum forces. Attempts to pull the suction cup away from the reference surface will only increase the size of the volumetric cavity and further decrease the air pressure therein. The resultant suction force will continue to increase until the pulling force becomes large enough to break the seal between the base seal member's peripheral rim and the reference surface.

Some suction cups are designed so that they can only be removed from the reference surface by applying sufficient brute lifting force to break the seal formed by the base seal member's peripheral rim, or by peeling up the rim to create a small opening that vents the volumetric cavity. Other suction cups are designed with a vent port and are used with anchoring apparatus having a mechanical stopper made of rigid material. The stopper is manually actuated into engagement with the vent port when it is desired to maintain suction, and is manually actuated out of engagement with the vent port when it is desired to break the suction. The stopper is typically hand-operable and cannot be actuated except by way of a specific movement pattern that involves the stopper being moved a noticeable distance.

A suction seal stabilizer includes a base seal member that operates somewhat similarly to a suction cup's base seal member, but is typically less concave, or even flat, and usually made from a softer more resilient material. Alternatively, the base seal member of a suction seal stabilizer may be constructed of the same material as a suction cup base seal member, but is thinner and more flexible than its suction cup counterpart. When a properly designed suction seal stabilizer is placed on a reference surface, no pushing force needs to be applied to flatten the base seal member apart from the weight of the stabilizer itself and any items or materials that it carries. Such devices are thus generally self-sealing (self-anchoring) in a manner that is not noticeable to the user. Because the base seal member is usually highly flexible and may have little or no concavity, its elastic rebound forces may be relatively weak and generally insufficient to overcome the opposing gravitational forces bearing down on the suction seal stabilizer. If the base seal member remains substantially flat against the reference surface with little or no rebound occurring, the suction forces will be negligible or non-existent. In some designs, the suction seal stabilizer may even be capable of being moved laterally over the reference surface with little apparent resistance. On the other hand, large suction forces will be generated when an attempt is made to pull the suction seal stabilizer away from the reference surface, or tilt the stabilizer, such as by applying a side load against an object being carried by the stabilizer. This property of suction seal stabilizers is advantageous for certain applications, such as when the stabilizer supports a beverage container. In that case, the beverage container can be moved laterally if a side load is applied sufficiently close to the reference surface, but will resist tipping and spillage when a side load or acceleration force is applied at higher elevations.

In a typical suction seal stabilizer, a vent port is provided for releasing the stabilizer from the reference surface. In such designs, an anchoring apparatus that incorporates the suction seal stabilizer may include a movable auxiliary component that acts as a mechanical stopper to open and close the vent port. The movable auxiliary component may be configured to carry an item or material that is to be anchored by the anchoring apparatus. Lifting the auxiliary component opens the vent port, allowing the anchoring apparatus to be lifted without appreciable resistance. This provides a form of stealth mode operation in which the user is not aware of the action of the suction seal stabilizer. When the anchoring apparatus is placed back down on the attachment surface, the movable auxiliary component will reengage the vent port, thereby "arming" the suction seal stabilizer into a stabilizing mode.

One characteristic of anchoring apparatus that employ a suction seal stabilizer is that the vent port may open inadvertently if the movable auxiliary component experiences spurious upward accelerations that tend to lift it out of engagement with the vent port. Several prior art designs have been proposed to address this issue.

U.S. Pat. No. 4,941,635 of Lan discloses an anchoring apparatus in which the suction seal stabilizer vent port is closed and opened by a two-part movable auxiliary member consisting of an upper cylinder that carries an item to be anchored to a reference surface and a lower plug that releasably engages the vent port and is connected to the upper cylinder by a coil spring. The coil spring is in a state of compression when the vent port is closed by the plug. The two-part movable auxiliary member opens the vent port in two stages. First, the upper cylinder moves upwardly while the compressed spring pushes down on the lower plug to keep the vent port closed. When the upper cylinder has traveled upwardly a predetermined distance, it engages a flange on the lower plug and lifts the plug out of contact with the vent port, thereby releasing the anchoring apparatus from the reference surface. A disadvantage of this design is that the coil spring exerts an upward force on the upper cylinder, and thus acts in concert with spurious upward acceleration forces instead of opposing them. Moreover, because the upper end of the spring is connected to a movable member (i.e., the upper cylinder), the spring force that maintains the lower plug in contact with the vent port weakens as the upper cylinder lifts in response to the upward acceleration forces. This may cause premature opening of the vent port and inadvertent release of the anchoring apparatus from the reference surface.

U.S. Pat. No. 4,756,497 of Lan discloses an anchoring apparatus in which the suction seal stabilizer vent port is integrally formed with an extendable-retractable conic air valve that adheres to the bottom of a cup that is to be anchored to a reference surface. As the cup moves upwardly, an air pressure drop is generated between the suction seal stabilizer and a reference surface causes the conic air valve to adhere to the bottom of the cup. Continued lifting of the cup pulls the conic air valve upwardly, causing it to extend until an upper limit is reached and the cup breaks free to open the vent port and release the suction seal stabilizer from the reference surface. A disadvantage of this design is that the conic air valve is integrated with the suction seal stabilizer and is reliant on the reduced air pressure generated thereby to maintain connectivity to the cup. If the conic air valve fails, so does the suction seal stabilizer.

It is to improvements in the design of self-anchoring apparatus having anchor members embodied as suction cups or suction seal stabilizers that the present disclosure is directed.

SUMMARY

A universal quick-release anchoring apparatus with acceleration damping includes an anchor member formed of a non-porous resilient material. The anchor member includes a flexible base seal member having a seal member upper side, a seal member lower side, and a seal member peripheral edge defining an outer periphery of the seal member upper side and the seal member lower side. The seal member lower side is configured to engage an external reference surface and form a substantially airtight seal therewith that defines a controlled pressure zone, the controlled pressure zone being located between the seal member lower side and the reference surface. A vent port extends through the anchor member and has a lower end in fluid communication with the controlled pressure zone and an upper end in fluid communication with an area of ambient pressure. The seal member is carried by a first auxiliary component. A second auxiliary component is movable relative to the first auxiliary component between a first position and a second position, the second auxiliary component and the first auxiliary component being discrete components formed independently of each other. The first position of the second auxiliary component represents a vent port closure position wherein the second auxiliary component is arranged to cause blocking of the vent port and prevent the passage of air therethrough, such that the controlled pressure zone is rendered airtight and the base seal member will resist movement of the anchoring apparatus away from the reference surface when the base seal member is flexed in a manner that increases the volume of the controlled pressure zone and decreases the air pressure therein. The second position of the second auxiliary component represents a vent port open position wherein the second auxiliary component is arranged to cause unblocking of the vent port and allow the passage of air therethrough, such that the controlled pressure zone is vented to the area of ambient pressure and the base seal member will not resist movement of the anchoring apparatus away from the reference surface. One or more flexible members resiliently deform to generate resistance as the second auxiliary component moves in a venting direction away from the vent port closure position toward the vent port open position. The one or more flexible members return to their initial form when the second auxiliary component returns to the vent port closure position. The one or more flexible members are connected between the first and second auxiliary components, with the first auxiliary component providing a vertically stable reference end thereof. The one or more flexible members are independent of the anchor member and non-reliant on pressure within the controlled pressure zone for generating the resistance. The resistance generated by deforming the one or more flexible members resists accelerations of the second auxiliary component away from the vent port closure position so as to prevent unwanted venting of the controlled pressure zone due to forces of a first magnitude acting on the anchoring apparatus in the venting direction. The resistance generated by deforming the one or more flexible members is insufficient to prevent movement of the second auxiliary component away from the vent port closure position during normal use of the anchoring apparatus in which a controlled force of a second magnitude in excess of the first magnitude is applied to the anchoring apparatus, so as to facilitate intentional venting of the controlled pressure zone and removal of the anchoring apparatus from the reference surface by a user.

BRIEF DESCRIPTION OF THE DRAWINGS

The foregoing and other features and advantages will be apparent from the following more particular description of example embodiments, as illustrated in the accompanying Drawings.

FIG. 11 is an upper perspective view showing a first auxiliary component of the anchoring apparatus of FIG. 1.

FIG. 12 is a top plan view showing the first auxiliary component of FIG. 11.

FIG. 13 is a bottom perspective view showing a second auxiliary component of the anchoring apparatus of FIG. 1.

FIG. 14 is a top plan view showing the second auxiliary component of FIG. 13.

FIG. 15 is a top plan view showing the second auxiliary component of FIGS. 11-12 slidably mounted to the first auxiliary component of FIGS. 13-14.

DETAILED DESCRIPTION OF EXAMPLE EMBODIMENTS

Figure 1:
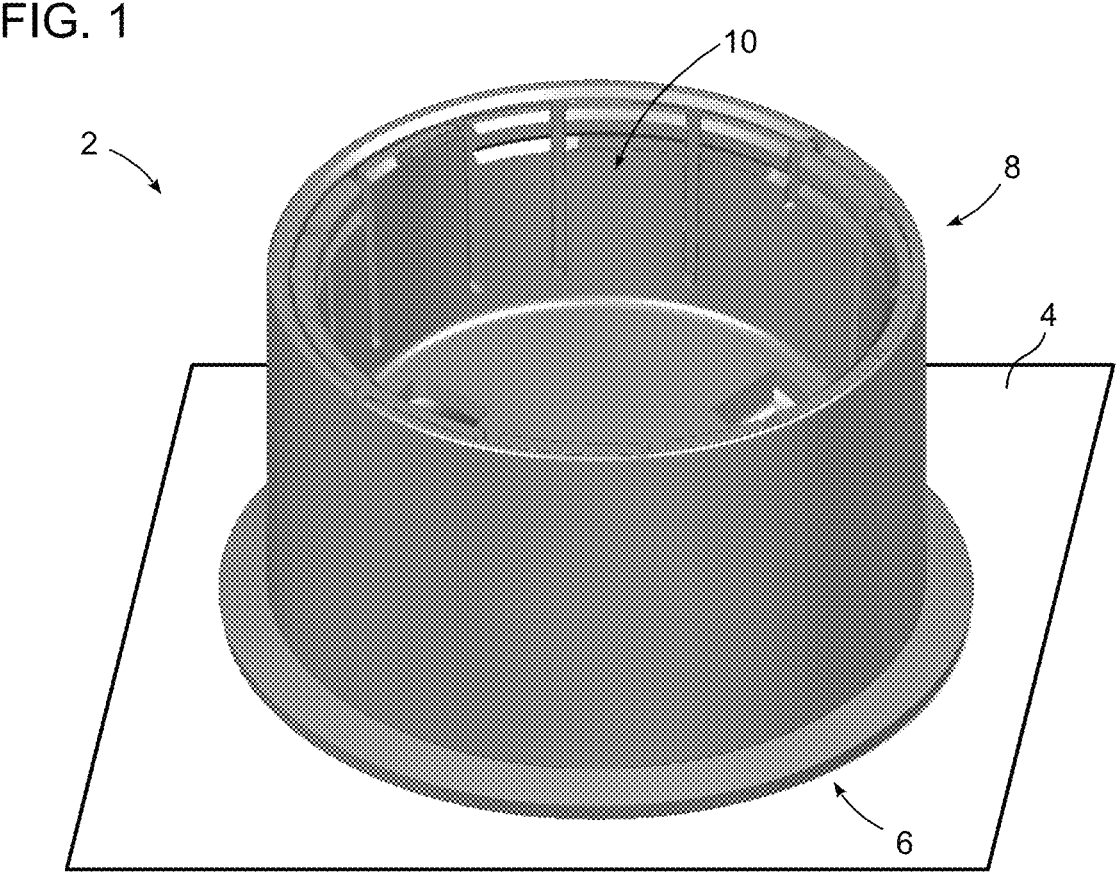
FIG. 1 is an upper perspective view showing an anchoring apparatus according to an example embodiment.
Figure 2:
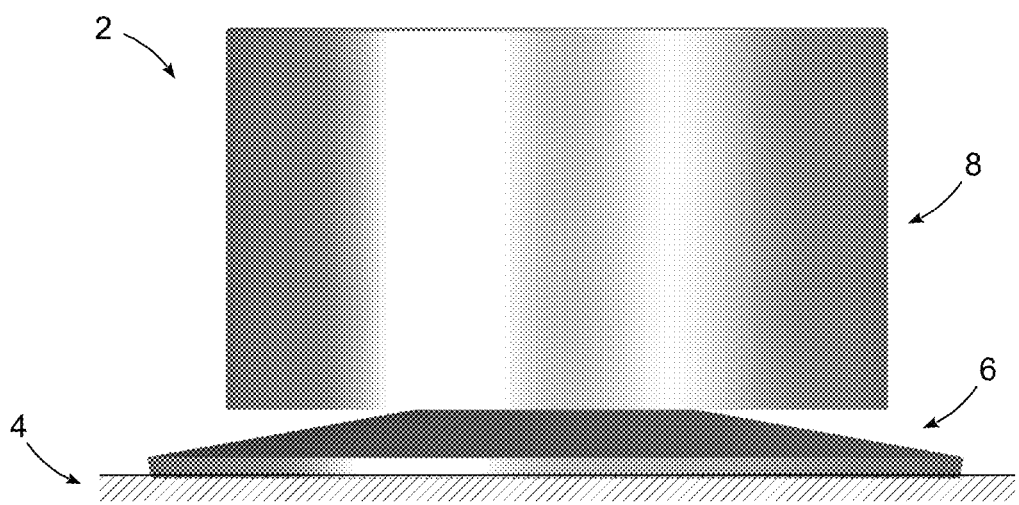
FIG. 2 is a side view showing the anchoring apparatus of claim 1.
Figure 3:
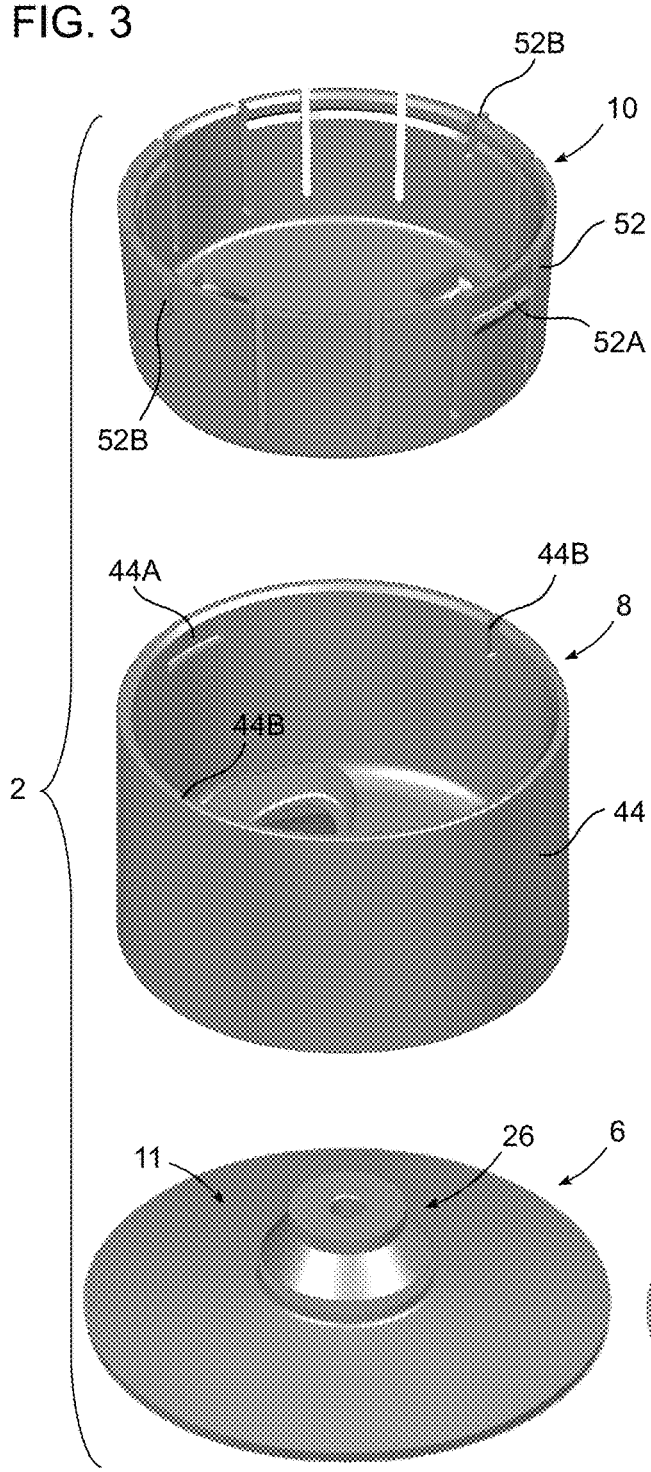
FIG. 3 is a fully exploded upper perspective view showing the anchoring apparatus of FIG. 1.

Turning now to the drawing figures, in which like reference numbers illustrate like structure in all of the several views, FIGS. 1-3 illustrate one possible embodiment of a quick-release anchoring apparatus 2 that may be constructed in accordance with the present disclosure. The anchoring apparatus 2 may be used to provide a unique holder or carrier for one or more items or materials, and provides directional release and attachment capability that allows the apparatus to be secured to a reference surface 4 (FIG. 1) and quickly released therefrom as needed. In the illustrated embodiment of FIGS. 1-3, the anchoring apparatus 2 includes an anchor member 6, a first auxiliary component 8 to which the anchor member is rigidly self-mounted (FIGS. 2 and 3), and a second auxiliary component 10 that is slidably mounted to the first auxiliary component (FIGS. 1 and 3). As described in more detail below, the first auxiliary component 8 serves as an anchor member carrier that may be used to mount and carry the anchor member 6. As further described below, the second auxiliary component 10 serves as a movable member or valve actuator that moves vertically relative to the first auxiliary component 8 and the anchor member 6 between a lower first position and an upper second position to selectively actuate a sealing function performed by the anchor member. In the illustrated embodiment of FIGS. 1-3, the first auxiliary component 8 and the second auxiliary component 10 may be independently formed as discrete components that are thereafter mechanically interconnected during assembly of the anchoring apparatus 2.

Figure 3A:
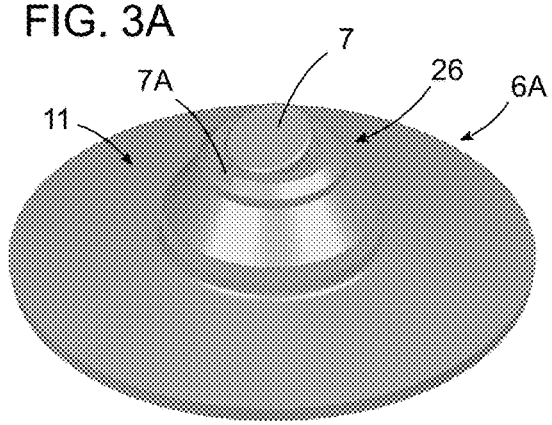
FIG. 3A is an upper perspective view showing an alterative anchor member that may be used in the anchoring apparatus of FIG. 1.

FIG. 3 depicts the anchor member 6 as having a first configuration wherein a vent port therein is arranged to be directly engaged by the second auxiliary component, as described in more detail below. FIG. 3A depicts an alternative anchor member 6A having a second configuration wherein a vent port therein is arranged to be indirectly engaged by the second auxiliary component via a vent port closure member 7 acting as an intermediary structure (described in more detail below).

As noted above, the anchoring apparatus 2 may be used as a holder or carrier for one or more items or materials.

Additional anchoring apparatus embodiments are described below in connection with FIGS. 24-47. Such anchoring apparatus may be used to adhere many different types of items or materials (including but not limited to beverage-containing vessels) to the reference surface 4 (such as a table top) by establishing and maintaining a controlled pressure zone that generates a partial vacuum to resist tipping when a side load (and/or vertical load) is applied to the anchoring apparatus. In each of the disclosed anchoring apparatus embodiments, the partial vacuum may be released (sometimes surreptitiously) and the anchoring apparatus lifted away from the reference surface 4 (sometimes without discernible resistance) when the anchoring apparatus (or an article carried thereby) is grasped and maneuvered in a manner consistent with normal lifting thereof.

Figure 4:
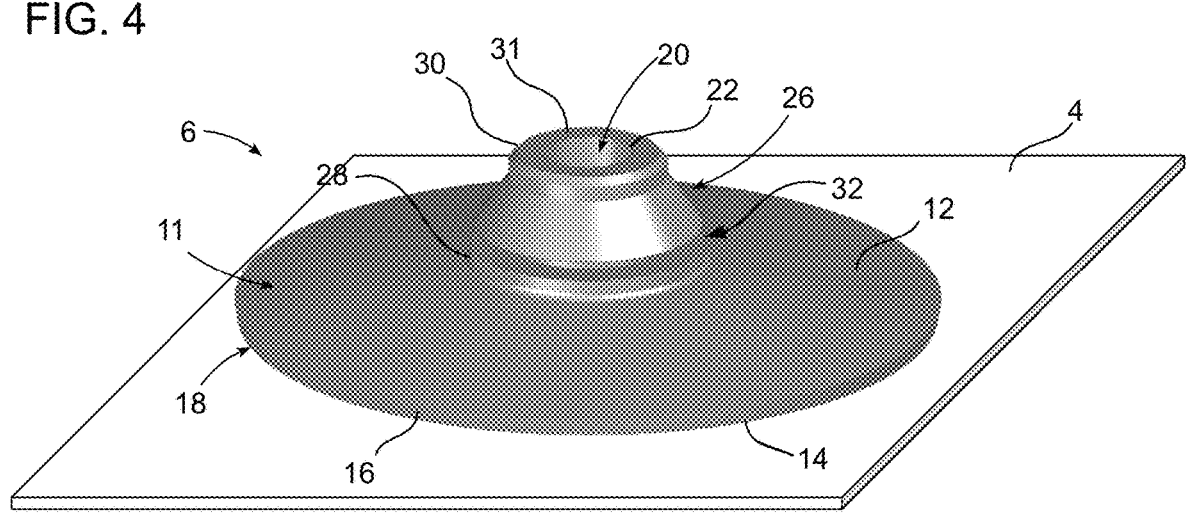
FIG. 4 is an upper perspective view showing an anchor member of the anchoring apparatus of FIG. 1.
Figure 5:
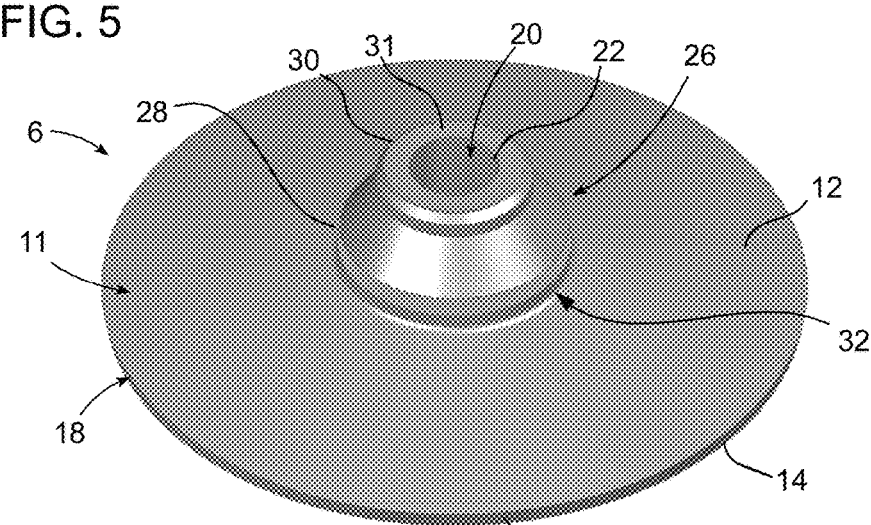
FIG. 5 is a further upper perspective view showing the anchor member of FIG. 4.
Figure 6:
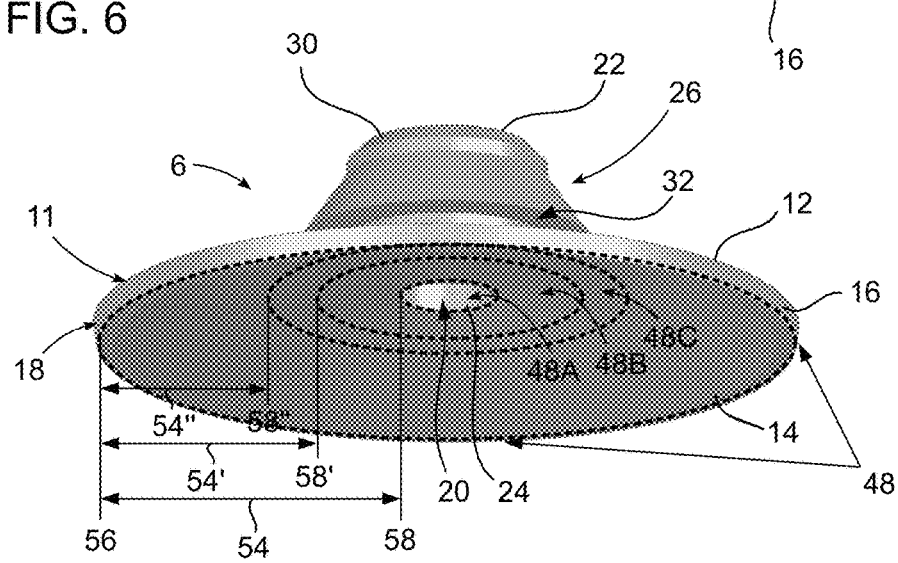
FIG. 6 is a lower perspective view showing the anchor member of FIG. 4.
Figure 7:
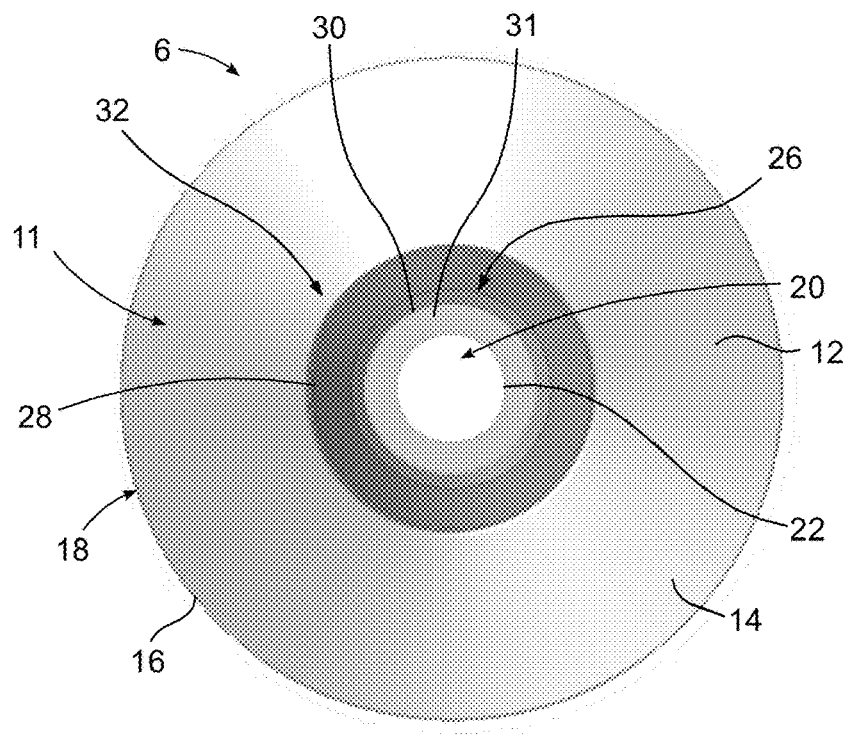
FIG. 7 is a top plan view showing the anchor member of FIG. 4.

Turning now to FIGS. 4-6, the anchor member 6 may be formed entirely as a unitary single-component article manufactured by way of injection-molding or using any other suitable technique. The anchor member 6 could also be formed as an assembly of two or more sub-components. However, a unitary single-component design may represent the most cost-effective approach. In its various embodiments, the anchor member 6 can be made from any suitable resilient material that is sufficiently non-porous, flexible and pliant during normal use of the anchoring apparatus 2 to form an effective seal with the reference surface 4. Silicone rubber having a suitable hardness and density represents one such material. Other resilient materials may also be used. Although many different configurations are possible, the anchor member 6 may fundamentally include a base seal member 11 having a seal member upper side 12, a seal member lower side 14, and a seal member peripheral edge 16 that defines an outer periphery 18 of the seal member upper side and the seal member lower side. As additionally shown in FIGS. 7-8, the outer periphery 18 of the base seal member 11 may be of substantially circular shape, with other shapes also being possible.

In some embodiments, the anchor member 6 may be constructed as a suction cup in which the base seal member 11 is sufficiently stiff and concave on its lower surface 14 to require that the anchoring apparatus 2 be actively pushed against the reference surface 4 to flatten the base seal member and develop a sealed controlled pressure zone. In such cases, releasing the anchoring apparatus 2 will cause the base seal member 11 to experience a partial elastic rebound that generates a negative pressure differential in the controlled pressure zone (relative to ambient pressure outside the controlled pressure zone), thereby adhering the anchoring apparatus to the reference surface 4 with an initial suction force. In other embodiments, the base seal member 11 may take the form of a suction seal stabilizer in which the base seal member is sufficiently pliable and non-concave on its lower surface 14 so as not to require that the anchoring apparatus 2 be actively pushed against the reference surface 4 to flatten the base seal member. In such cases, the anchoring apparatus may be self-sealing (self-anchoring) in a manner that is not noticeable to a user. Moreover, the base seal member 11 may not experience sufficient elastic rebound to generate any noticeable negative pressure differential after being placed on the reference surface 4. Lifting the anchoring apparatus 2 can in many cases performed without any apparent resistance being offered by the seal member 11, thus facilitating stealth mode operation. Additional differences between the two types of anchor members (i.e., suction cups and suction seal stabilizers) are discussed in the Background section above.

A vent port 20 may extend centrally through the anchor member 6, including through the seal member upper side 12 and the seal member lower side 14. The vent port 20, which may be circular or of any other suitable cross-sectional shape, includes a vent port upper end 22 (FIGS. 4-7) disposed above the seal member upper side 12. A vent port lower end 24 (FIGS. 6 and 8) is disposed on the seal member lower side 14. In the illustrated embodiment of FIGS. 4-8, the vent port 20 may be configured as a straight vertically-oriented cylindrical bore that extends from the vent port upper end 22 to the vent port lower end 24. In some embodiments, the vent port 20 may have a constant diameter. In other embodiments, the vent port 20 may not have a constant diameter (e.g, it may be stepped, tapered, etc.).

As shown in FIGS. 4-7, the vent port upper end 22 may be located at the top of a central anchor member stem 26 that can be integrally formed on the base seal member 11 in order to facilitate rigid self-mounting of the anchor member 6 to the first auxiliary component 8 of the anchoring apparatus 2. The anchor member stem 26 may include a stem lower end 28 (FIGS. 4-5) disposed on the seal member upper side 8, and a raised stem upper end 30 (FIGS. 4-6) disposed some distance above the stem lower end. In the illustrated embodiment, the vent port 20 extends concentrically through the anchor member stem 26, along a central vertical axis thereof. In this configuration, the vent port upper end 22 will be disposed on the stem upper end 30 and centered within an annular stem landing zone 31 of the stem upper end 30 that is configured for engagement with the second auxiliary component 10.

As previously mentioned in connection with FIG. 3A, an alternative anchor member 6A may include the vent port closure member 7. The vent port closure member 7 may be disposed on the stem upper end 30 and connected thereto integrally or as a discrete component. For example, the vent port closure member 7 may be integrally connected to the stem upper end 30 by way of one or more living hinges 7A to form a movable flap, lid or other vent port cover structure. The vent port closure member 7 may be biased (e.g., by the one or more living hinges) to move from a closed position to an open position. The closed position includes the vent port closure member 7 being arranged to block the vent port upper end 22 and prevent the passage of air through the vent port 20 to thereby seal the controlled pressure zone and render it airtight. The open position includes the vent port closure member 7 being arranged to unblock the vent port upper end 22 and allow the passage of air through the vent port 20 to thereby vent the controlled pressure zone.

Regardless of which version of the anchor member is used, the anchor member stem 26 may be configured so that the stem upper end 30 where the stem landing zone 31 is located (in the anchor member 6) or the vent port closure member 7 is situated (in the anchor member 6A) will maintain a substantially uniform shape at a substantially fixed location (relative to the first auxiliary component 8) during normal use of the anchoring apparatus 2. This may be accomplished by designing the anchor member stem 26 so as to be relatively rigid as compared to the base seal member 11.

In the illustrated embodiment of FIGS. 4-6, the relative rigidity of the anchor member stem 26 is is due in part to the fact that its height-to-width ratio is low and the stem width is relatively high as compared to the vent port diameter. For example, the height of the anchor member stem 26 as measured between its lower end 28 and its upper end 30 may be approximately the same as its lower end diameter, thereby providing a stem-height-to-width ratio of 1:1. In the illustrated embodiment, the lower end 28 of the anchor member stem 26 represents the maximum diameter of the stem. Various other stem-height-to-width ratios could also be used, depending on the material used for the anchor member 6 and the desired rigidity of the anchor member stem 26. The width of the anchor member stem 26 as measured at its smallest diameter section may be at least twice the width of the vent port 20 as measured at its largest diameter section, thereby providing a stem-to-vent-port width ratio of at least 2:1. In the illustrated embodiment, the upper end 30 of the anchor member stem 26 represents the minimum diameter of the stem. Various other stem-to-vent-port-width ratios could also be used, again depending on the material used for the anchor member 6 and the desired rigidity of the anchor member stem 26. As noted above, forming the anchor member stem 26 so as to be relatively rigid with respect to the base seal member 11 establishes a stable configuration and position for the stem upper end 30 (and thus the stem landing zone 31 or the vent port closure member 7). This stable configuration and position assists in closing the vent port 20 when placing the anchoring apparatus 2 on the reference surface 4 because the vent port will remain in proper alignment with the second auxiliary component 10 as the latter descends into sealing engagement therewith. As discussed in more detail below, side loads applied to the anchoring apparatus 2 will also be more efficiently transferred to the base seal member 11 with a relatively rigid anchor member stem 26, allowing the anchor member 6 to react quickly to initiate or increase its grip on the reference surface 4 when the anchoring apparatus is so loaded.

The relative rigidity of the anchor member stem 26 extends not only from the stem upper end 30 to the stem lower end 28, but also through the underlying portion of the base seal member 11 that extends below the vent port lower end 24 to the seal member lower side 14. The anchor member stem 26 is thus well supported and dimensionally stable in the vertical direction. This also assists in closing the vent port 20 when placing the anchoring apparatus 2 on the reference surface 4 because the vent port will always be engaged by the second auxiliary component 10 when the latter descends to a predetermined vertical position. The relative rigidity of the anchor member stem 26 extending down to the seal member lower side 14 in the vicinity of the vent port lower end 24 is in contrast to the relatively thin and flexible configuration of the remaining major peripheral portion of the base seal member 11 extending outwardly from the lower end region of the anchor member stem to the peripheral edge 14.

As noted above, the maximum diameter of the anchor member member stem 26 in the illustrated embodiment is at its lower end 28. In a medial section of the anchor member stem 26 that begins above the lower end 28, the anchor member stem may taper to a smaller diameter section that continues above the medial section to the stem upper end 30. As can be seen in FIGS. 4-6, this upwardly tapering portion of the anchor member stem 26 may form a frustocone that defines the medial section.

Figure 9:
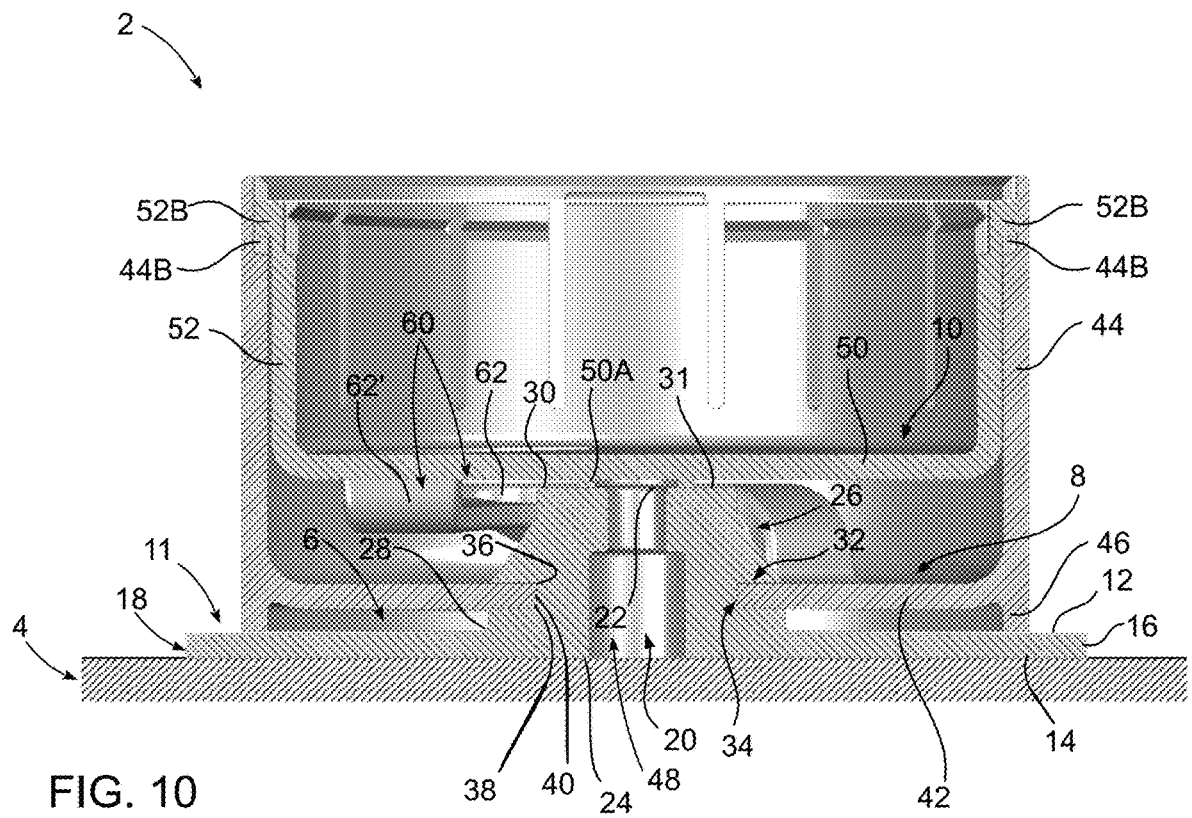
FIG. 9 is a cross-sectional centerline view showing the anchoring apparatus of FIG. 1 with a closed vent port.
Figure 10:
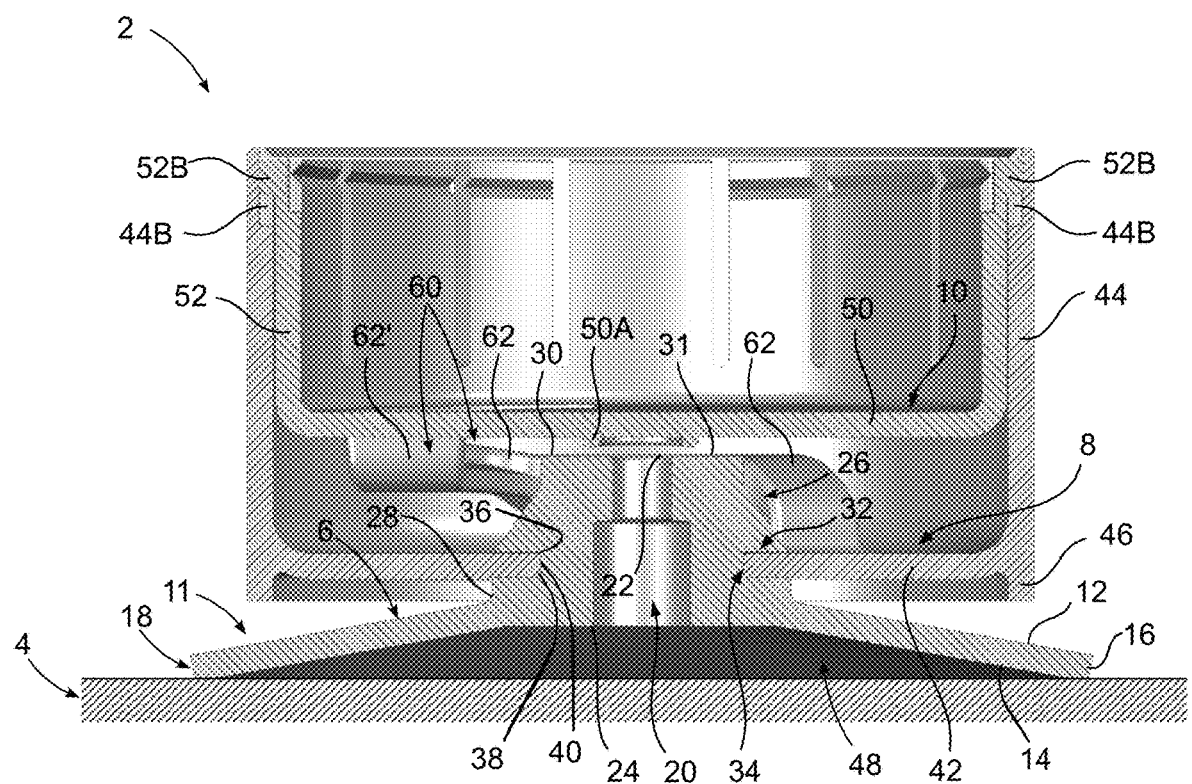
FIG. 10 is a cross-sectional centerline view showing the anchoring apparatus of FIG. 1 with an open vent port.

With additional reference now to FIGS. 9-10, the first auxiliary component 8 of the anchoring apparatus 2 may be embodied as any structure that is configured for vertically fixed mounting to the anchor member stem 26 without the use of discrete connecting members, such as fasteners, retainers, etc. This characteristic allows the anchor member 6 to be rigidly self-mounted to the first auxiliary component 8 in a stable vertically fixed relationship therewith. FIGS. 9-10 depict one optional configuration wherein the first auxiliary component 8 takes the form of a rigid (or semi-rigid) main body 42 (e.g., plastic, silicone rubber, etc.) that extends outwardly away from the anchor member stem 26 for some distance. By way of example only, the main body 42 may be formed as a circular disk-like structure that surrounds the anchor member stem 26.

The first auxiliary component 8 may be mounted to the anchor member stem 26 by virtue of rigid engagement with a mounting portion of the stem that may be implemented as an annular groove (channel) 32 formed on the anchor member stem 26 at any convenient location between the ends 28 and 30 thereof. In FIGS. 9-10, it will be seen that the annular groove 32 is situated immediately below the tapered medial section of the anchor member stem 26. The first auxiliary component 8 may include an anchor member mounting bore 34 centrally formed in its main body 42. The anchor member mounting bore 34 extends vertically between a bore upper end 36 and a bore lower end 38, and has a sidewall 40 whose position is dictated by the diameter of the bore.

The rigid inter-engagement of the annular groove 32 with the anchor member mounting bore 34 includes the back of the groove engaging the bore sidewall 40 and the upper and lower sidewalls of the groove respectively engaging the bore upper and lower ends 36 and 38, together with adjacent surface portions of the first auxiliary component's main body 42. The walls of the annular groove 32 serve to provide engagement projections that engage the anchor member mounting bore 34 and adjacent structure of the first auxiliary component 8. Advantageously, the frustocone shape of the anchor member stem 26 immediately above the annular groove 32 aids in mounting the first auxiliary component 8 to the anchor member 6 by compressibly deforming the anchor member stem as it advances through the anchor member mounting bore 34 until the annular groove seats in the bore.

The connection between the anchor member 6 and the first auxiliary component 8 may be improved by adhering to several design guidelines. As a first design guideline, the spacing of the bore upper and lower ends 36 and 38 (which defines the thickness of the first auxiliary component's main body 42 proximate to the anchor member mounting bore 34) may be chosen to closely match the spacing of the upper and lower sidewalls of the annular groove 32. As a second design guideline, the diameter of the anchor member mounting bore 34 may be chosen to closely match the diameter at the back of the annular groove 32. Adherence to the first and second design guidelines will ensure a tight fit between the main body 42 and the anchor member stem 26. As a result, side loads applied to the anchoring apparatus 2 will be quickly and efficiently transferred to the anchor member 6, allowing the base seal member 11 to rapidly initiate or increase its grip on the reference surface 4 in response to the loads.

As a third design guideline, the radial depth of the annular groove 32 may be chosen to maximize the interfacial engagement between upper and lower sidewalls of the annular groove and the upper and lower surfaces of the main body 42 proximate to the anchor member mounting bore 34. Adherence to the third design guideline will ensure a stable and secure connection between the anchor member stem 6 and the first auxiliary component 8, and thus the remaining structure of the anchoring apparatus 2 (of which the first auxiliary component forms a part). Detachment of the anchor member 6 from the remainder of the anchoring apparatus 2 during normal use will thus be unlikely, As a fourth design guideline, the location of the annular groove 32 may be chosen to be as close to the seal member upper side 12 as possible. For example, as shown in FIGS.

9-10, the annular groove 32 may be spaced from the seal member upper side 12 by a distance that is approximately the thickness of the base seal member 11 between its upper an lower sides 12 and 14. Other locations proximate to the seal members upper side 12 may also be used. Adherence to the fourth design guideline minimizes rotational moments introduced into the base seal member 11 as a result of side loads applied to the anchoring apparatus 2. As described in more detail below in connection with FIGS. 6 and 8, minimizing the rotational moments imparted to the base seal member 11 will facilitate more gradual deformation thereof in response to side loads, allowing the seal member lower side 14 to gradually peel away from the reference surface with a corresponding gradual increase in gripping strength. In contrast, large rotational moment shock loads imparted quickly to the base seal member 11 can result in rapid separation of the seal member lower side 14 from the reference surface 4, causing the anchor member 6 to rip away from the reference surface and thereby overturn the anchoring apparatus 2.

Observance of the foregoing design guidelines, coupled with the relative rigidity of the anchor member stem 26 itself, results in an assembly in which the anchor member stem and the first auxiliary component 8 will act in concert during normal use of the anchoring apparatus 2. These two structures will act as if they are formed integrally with each other as a single unit despite the fact that the anchor member stem 26 and the first auxiliary component 8 are separate structures that are interconnected without the use of discrete mechanical fasteners. If the base seal member 11 is additionally considered, the resultant combination may be likened to a natural tree, with the anchor member stem 26 representing the trunk, the first auxiliary component 8 (as well as the second auxiliary component 10) representing the branches, and the base seal member 11 representing the roots. External loads applied to the anchoring apparatus 2 may be likened to the wind. Such forces will be quickly and efficiently transferred from the first auxiliary component 8 to the rigid anchor member stem 26 via their rigid inter-engagement, then reacted down the rigid anchor member stem to the deformable base seal member 11, which will in turn resiliently stabilize the anchoring apparatus 2 via the base seal member's adherence to the reference surface 4.

The first auxiliary component 8 may optionally include additional structure integrated with or otherwise connected to the main body 42. In the embodiment of FIGS. 9-10, the additional structure of the first auxiliary component 8 includes a secondary body 44 that extends upwardly from the periphery of the main body 42 for some distance. By way of example only, the secondary body 44 may be formed as a tube-like structure that surrounds the main body 42. If desired, a tertiary body 46 of the first auxiliary component 8 may extend downwardly from the periphery of the main body 42 to help stabilize the anchoring apparatus 2 on the reference surface 4. By way of example only, the tertiary body 46 may be formed as a tube-like structure that surrounds the main body 42 and has the same diameter as the secondary body 44. As shown in FIG. 9, the tertiary body 46 may extend down to the base seal member's upper side 12 when the anchoring apparatus 2 is adhered to the reference surface 4, provided that the base seal member's peripheral edge 14 extends laterally beyond the lower edge of the tertiary body. Alternatively, the tertiary body 46 may extend down to the reference surface 4 when the anchoring apparatus is adhered thereto, provided that the base seal member's peripheral edge 14 lies within the perimeter of the tertiary body.

The second auxiliary component 10 of the anchoring apparatus 2 may be movable between a lower vent port closure position (shown in FIG. 9) and an upper vent port open position (shown in FIG. 10). In the vent port closure position, the second auxiliary component 10 is arranged to cause blocking of the vent port 20 and prevent the passage of air therethrough. In this position, the controlled pressure zone, shown by reference number 48, is rendered airtight and the base seal member 11 will resist movement of the anchoring apparatus 2 away from the reference surface 4 when the base seal member is flexed in a manner that increases the volume of the controlled pressure zone and decreases the air pressure therein. If the anchor member 6 is constructed in accordance with FIGS. 1-3 and 4-8, the second auxiliary component 10 may cause blocking of the vent port 20 by directly engaging the stem landing zone 31 defined on the upper end 30 of the anchor member stem 26. Alternatively, if the anchor member 6 is constructed in accordance with FIG. 3A, the second auxiliary component 10 may cause blocking of the vent port 20 by indirectly engaging the stem landing zone 31 using the vent port closure member 7 as an intermediary structure. In particular, the second auxiliary component 10 will push down on the vent port closure member 7, causing it to assume its closed position wherein the vent port 20 is blocked.

In the vent port open position, the second auxiliary component 10 is arranged to causes unblocking of the vent port 20 and allow the passage of air therethrough, such that the controlled pressure zone 48 is vented to the area of ambient pressure and the base seal member 11 will not resist movement of the anchoring apparatus away from the reference surface 4. If the anchor member 6 is constructed in accordance with FIGS. 1-3 and 4-8, the second auxiliary component 10 may cause unblocking of the vent port 20 by directly disengaging from the stem landing zone 31 defined on the upper end 30 of the anchor member stem 26. Alternatively, if the anchor member 6 is constructed in accordance with FIG. 3A, the second auxiliary component 10 may cause unblocking of the vent port 20 by indirectly disengaging from the stem landing zone 31 using the vent port closure member 7 as an intermediary structure. In particular, the second auxiliary component 10 will disengage from the vent port closure member 7, causing it to self-bias to its open position wherein the vent port 20 is unblocked.

The second auxiliary component 10 may be configured as any movable structure having the ability to either engage the stem landing zone 31 of the anchor member 6 and form a sealable interface therewith that closes the vent port 20 in an airtight manner, or engage the vent port closure member 7 of the anchor member 6A and cause the closure member to form a sealable interface with the vent port and close it in an airtight manner. FIGS. 9-10 depict one optional configuration wherein the second auxiliary component 10 takes the form of a rigid (or semi-rigid) main body 50 (e.g., plastic, silicone rubber, etc.) situated above the stem upper end 30 of the anchor member 6. By way of example only, the main body 50 of the second auxiliary component 10 may be formed as a circular disk-like structure. In the embodiment of FIGS. 9-10, the stem landing zone 31 is planar and a center portion of the main body 50 that engages the stem landing zone is formed with a non-planar stem engagement structure 50A in the form of a ring protrusion that extends downwardly from the lower side of the main body. In the illustrated embodiment, the stem engagement structure 50A is ring shaped, and is sized and positioned to engage the stem landing zone 31 in surrounding concentric relationship with the vent port 20 in the vent port closure position of FIG. 9.

In this embodiment, the vent port 20 is shown as being stepped inwardly so that the upper end 22 of the vent port has a smaller diameter than the lower end 24. The diameter of the stem engagement structure 50A may be slightly larger than the vent port's smaller diameter upper end 22. Other engagement structure configurations (such as a solid boss) could also be used. It will be appreciated that instead of the stem engagement structure 50A being formed on the main body 50, it could be formed on the stem landing zone 31 and extend upwardly therefrom. In other embodiments, the main body 50 and the stem landing zone 31 may both be planar to provide a planar sealable interface configuration.

The second auxiliary component 10 may optionally include additional structure integrated with or otherwise connected to the main body 50. In the embodiment of FIGS. 9-10, the additional structure of the second auxiliary component 10 includes a secondary body 52 that extends upwardly from the periphery of the main body 50 for some distance. By way of example only, the secondary body 52 may be formed as a tube-like structure that surrounds the main body 50.

In the embodiment of FIGS. 9-10, the secondary body 52 of the second auxiliary component 10 faces the secondary body 44 of the first auxiliary component 8, and may be situated in closely spaced relationship therewith. This arrangement provides a slidable mounting configuration whereby the second auxiliary component 10 is slidably mounted to the first auxiliary component 8 in a manner that allows the first auxiliary component to guide the second auxiliary component during the latter component's up and down movement. Although FIGS. 9-10 show the secondary body 52 of the second auxiliary component 10 being nested within the secondary body 44 of the first auxiliary component 8, the relationship of parts could be reversed. Thus, the secondary body 44 of the first auxiliary component 8 could be nested within the secondary body 52 of the second auxiliary component 10.

If desired, the first auxiliary component 8 and the second auxiliary component 10 may be interconnected at one or more locations to prevent inadvertent disassembly of the anchoring apparatus 2 during use. This allows the anchoring apparatus 2 to be lifted from the reference surface 4 by grasping the second auxiliary component 10 (or another structure connected thereto), and performing an upward lifting gesture. The interconnection(s) between the auxiliary components 8 and 10 may be provided at any suitable location on the anchoring apparatus 2, in any suitable manner. FIG. 3 illustrates one non-limiting example wherein one or more connections are provided by inter-engaging pockets and tabs. In particular, the secondary body 44 of the first auxiliary component 8 may be formed with one or more pockets 44A (one of two is shown) on its inside surface, and the secondary body 52 of the second auxiliary component 10 may be formed with one or more opposing tabs 52A (one of two is shown) on its outside surface. The tabs 52A engage the pockets 44A so that upward and downward movement of the second auxiliary component 10 relative to the first auxiliary component 8 is constrained by the height of the pockets. In this way, the second auxiliary component 10 will remain in engagement with the first auxiliary component 8. It will be appreciated that the arrangement of parts could be reversed, with the secondary body 44 of the first auxiliary component 8 having tabs and the secondary body 52 of the second auxiliary component 10 having pockets.

As further shown in FIG. 3, and as additionally illustrated in FIGS. 9-10, a slot-and-tab arrangement may be provided to guide the upward and downward movement of the second auxiliary component 10 and to prevent axial rotation thereof relative to the first auxiliary component 8. In particular, the secondary body 44 of the first auxiliary component 8 may be formed with one or more vertical slots 44B (two are shown) on its inside surface, and the secondary body 52 of the second auxiliary component 10 may be formed with one or more opposing vertical fins 52B (two are shown) on its outside surface. In this way, the second auxiliary component 10 will be guided vertically relative to the first auxiliary component 8, and will not rotate axially. It will be appreciated that the arrangement of parts could be reversed, with the secondary body 44 of the first auxiliary component 8 having fins and the secondary body 52 of the second auxiliary component 10 having slots.

In FIG. 9, the anchoring apparatus 2 is in a state wherein it has been placed onto the reference surface 4 and the second auxiliary component 10 is in its lower position with the vent port 20 being closed. Moreover, the base seal member 11 may have deformed into a state in which the seal member lower side 14 is fully or partially flattened against the reference surface 4. If the anchor member 6 is a suction cup, the seal member lower side 10 might not assume a flattened state unless the anchoring apparatus 2 is actively pushed downwardly with some degree of force. If the anchor member 6 is a properly-designed suction seal stabilizer, the weight of the anchoring apparatus 2 alone, or the anchoring apparatus in combination with whatever item(s) or material(s) it carries, may be enough to flatten the seal member lower side 10. In either case, because the controlled pressure zone 48 is not vented, any attempt to destabilize the anchoring apparatus 2 without raising the second auxiliary component 10 will result in suction resistance being generated by the base seal member 11, thereby maintaining the anchoring apparatus upright and in contact with the reference surface 4.

In FIG. 10, the anchoring apparatus 2 is in a state wherein the second auxiliary component 10 has been lifted to its upper position to open the vent port 20, and the anchoring apparatus is either in the process of being lowered onto the reference surface 4 or raised therefrom. Because the controlled pressure zone 48 is vented, raising the anchoring apparatus 2 may be performed without any suction resistance being offered by the base seal member 11. In the illustrated state of the anchoring apparatus 2, the lower side 10 of the base seal member 11 may (or may not) have a cambered concave configuration, depending on the design of the anchor member 6.

Figure 8:
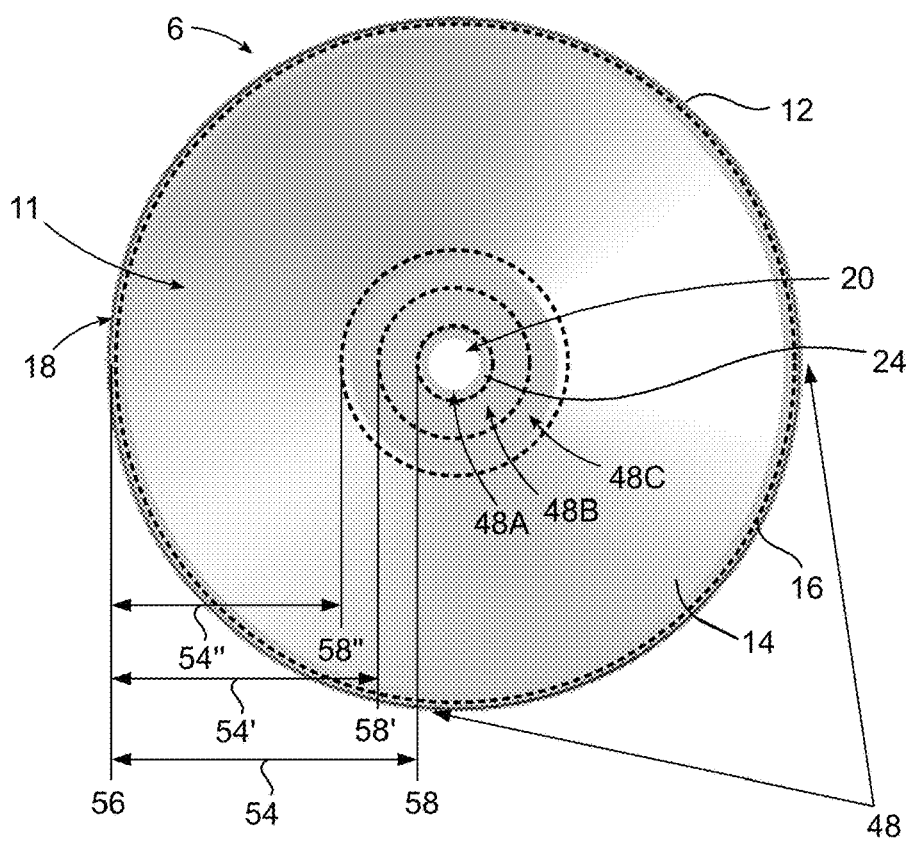
FIG. 8 is a bottom plan view showing the anchor member of FIG. 4.

Regardless whether the anchor member 6 is designed as a suction seal stabilizer or a suction cup, its configuration will be such that when the seal member lower side 14 engages the reference surface 4 with the vent port 20 blocked by the second auxiliary component 10, a substantially airtight seal is formed that seals the controlled pressure zone 48. In the illustrated embodiment of FIGS. 1-10, the controlled pressure zone 48 represents a circular region of variable size located within the base seal member's outer periphery 14 and between the seal member lower side 10 and the reference surface 4. The general region where the controlled pressure zone 48 is capable of developing is shown in FIGS. 6 and 8. It will be appreciated that the size and shape of the controlled pressure zone may vary according to the construction of the base seal member 11 and the applied forces that produce deformations thereof during use of the anchoring apparatus 2, as will now be described.

When the base seal member 11 is in a state of sealing contact with the reference surface 4, some portion of the seal member lower side 14 may lie flat on the reference surface in conforming interfacial contact therewith so as to form an airtight seal region 54. The airtight seal region 54 may be annular in shape, having a radial outer edge and a radial inner edge. The controlled pressure zone 48 will tend to lie radially inside the inner edge of the annular airtight seal region 54, which establishes a controlled pressure zone periphery.

In FIGS. 6 and 8, example locations of the airtight seal region's inner and outer edges are shown using dashed-line representations. When the base seal member 11 is in sealing contact with the reference surface 4, the outer edge of the airtight seal region 54 may lie at or near the base seal member's outer periphery 18, as indicated by reference number 56 in FIGS. 6 and 8. This position will typically not change as a result of subsequent deformations of the base seal member 6 so long as the anchoring apparatus 2 remains adhered to the reference surface 4. The inner edge of the airtight seal region 58 will lie radially inwardly from the base seal member's outer periphery 18, somewhere between the outer edge location 56 and the vent port 20.

In some configurations of the anchor member 6, the seal member lower side 14 may be completely flat in the base seal member's state of sealing contact with the reference surface 4. In that case, the airtight seal region 54 may extend all the way from its outer edge 56 to the vent port 20. Reference number 58 in FIGS. 6 and 8 indicates an example placement of the airtight seal region's inner edge at this location. When the airtight seal region inner edge 58 is thus situated, the controlled pressure zone 48 will have a negligible volume that may be defined solely by the area of the vent port 20, as shown by reference number 48A in FIGS. 6 and 8.

In other configurations of the anchor member 6, the seal member lower side 14 may not be completely flat in the base seal member's state of sealing contact with the reference surface 4. For example, an inner circular area of the seal member lower side 10 that is centered on the vent port 20 may be raised above the reference surface 4. In that case, the airtight seal region 54 may extend only part of the way from its outer edge 56 to the vent port 20, with the inner edge 58 of the airtight seal region 54 being situated at the perimeter of the inner circular area where the seal member lower side 10 begins to rise above the reference surface 4. Reference number 58' in FIGS. 6 and 8 indicates an example placement of the airtight seal region's inner edge at such an intermediate location. When the airtight seal region inner edge 58' is thus situated, the controlled pressure zone 48 may have a non-negligible volume that extends beyond the area of the vent port 20 to the perimeter of the raised inner circular area, as shown by reference number 48B in FIGS. 6 and 8.

At some point while the base seal member 11 is in sealing contact with the reference surface 4, the anchoring apparatus may be acted upon by outside forces that tend to separate the base seal member from the reference surface. Such forces include lifting forces directed away from the reference surface 4, tilting forces directed laterally at some distance above the reference surface, or combinations of such forces. When outside forces of this type are applied, the natural flexibility and pliability of the base seal member 11 will allow it to deform. Such deformations may be characterized by a radial inner portion of the airtight seal region 56 tending to separate from the reference surface 4, causing the inner edge 58 of the airtight seal region to dynamically reposition radially outwardly toward the outer edge 56. Reference number 58" in FIGS. 6 and 8 represents one example dynamic repositioning of the inner edge 58 that produces an airtight seal region 54" of reduced size. Such repositioning of the airtight seal region's inner edge 58" correspondingly produces an enlarging void at the center of the seal member lower side 14 and thereby expands the volume of the controlled pressure zone 48. Reference number 48C in FIGS. 6 and 8 illustrates such an expanded controlled pressure zone. The air pressure within the expanded controlled pressure zone 48C, which is sealed in an airtight manner, will consequently decrease in accordance with Boyle's law, thereby causing the anchoring apparatus 2 to experience increased adherence to the reference surface 4.

As previously noted, the foregoing base seal member deformation scenario only arises when the vent port 20 is closed by the second auxiliary component 10, as shown in FIG. 9. When the vent port 20 is open, as shown in FIG. 10, the controlled pressure zone 48 will be vented to an area of ambient pressure outside the controlled pressure zone 48, which may be atmospheric pressure.

Because the underside of the main body 50 of the second auxiliary component 10 directly or indirectly engages the stem landing zone 31 and closes the vent port 20 when the second auxiliary component is its lower position, the main body 50 may be thought of as forming a valve and the stem landing zone 31 may be thought of as forming a valve seat. FIGS. 9-10 illustrate a direct valve-and-valve-seat arrangement. In this embodiment, the valve seat provided by the annular surface of the stem landing zone 31 and the valve is provide by the ring shaped stem engagement structure 50A of the second auxiliary component's main body 50. In other direct valve-and-valve-seat embodiments, the stem engagement structure 50A could be eliminated. If the alternative anchor member 6A of FIG. 3A is being used, the vent port closure member 7 will act as a valve that engages the stem landing zone 31 as a valve seat. The underside of the main body 50 of the second auxiliary component 10, with or without the stem engagement structure 50A, may then be thought of as a valve actuator.

Proper alignment between the stem engagement structure 50A and the stem landing zone 31 (or between the stem engagement structure 50A and the vent port closure member 7) may be ensured by designing the anchor member stem 26 and the second auxiliary component 10 to have minimal lateral mobility and minimal rotational capability relative to their respective vertical axes. As previously discussed, minimizing positional movement of the anchor member stem 26 may be achieved by limiting its stem height-to-width ratio and by maximizing the its stem-to-vent-port width ratio, such that the anchor member stem is substantially rigid. Minimizing positional movement of the second auxiliary component 10 may be achieved by designing this component so that its secondary body 52 is very closely spaced from the secondary body 44 of the first auxiliary component 8 so as to limit any tolerances between these components, but without restricting the ability of the second auxiliary component slide up and down with respect to the first auxiliary component.

Both the main body 50 and the stem landing zone 31 may have conforming surface configurations that facilitate mutual surface-to-surface engagement. For example, as shown in FIGS. 9-10, the stem landing zone 31 has a substantially planar configuration and the lower side of the main body 42 may either have a specifically-designed non-planar configuration (such as the stem engagement structure 50A) or a large planar configuration. In either case, there is no possibility that the main body 52 will not affirmatively engage the stem landing zone 31 and form an airtight sealable interface that closes the vent port 20. If the anchor member 6A of FIG. 3A is being used, the upper side of the vent port closure member 7 may be planar or otherwise suitably configured to be engaged by the main body 50 of the second auxiliary component 10, with or without the stem engagement structure 50A.

With continuing reference to FIGS. 9-10, and with additional reference to FIGS. 11-15, the anchoring apparatus 2 may be designed to maintain affirmative direct or indirect engagement between the first auxiliary component 8 and the stem landing zone 31 even in the presence of accelerations that are imparted to the anchoring apparatus while engaging the reference surface 4. To that end, one or more flexible members 60 may be provided that resiliently deform to generate resistance as the second auxiliary component 10 moves in a venting direction away from the vent port closure position toward the vent port open position. The flexible members return to their initial form (shape and position) when the second auxiliary component 10 returns to the vent port closure position. The one or more flexible members 60 may be connected between the first and second auxiliary components 8 and 10, with the first auxiliary component providing a vertically stable reference end thereof. The one or more flexible members 60 are external to and independent of the anchor member 6, and non-reliant on pressure within the controlled pressure zone 48 for generating the resistance.

In the illustrated embodiment of FIGS. 9-15, there are two flexible members 60, each of which is formed by two interlocking fingers 62 and 62' that are respectively integrally formed on the first auxiliary component 8 and the second auxiliary component 10. In this embodiment, each flexible member 60 may thus be thought of as a two-part structure provided by an interlocking finger pair. Both of the interlocking fingers 62 and 62' of each flexible member 60 may be implemented as flexible structures, but this is not a requirement. For example, as described below in connection an alternate embodiment shown in FIGS. 42-47, one interlocking finger may be relatively flexible and the other interlocking finger may be relatively non-flexible, or even rigid.

For each flexible member 60, a first finger 62 on the first auxiliary component 8 engages a corresponding second finger 62' on the second auxiliary component 10. As can be seen in FIGS. 11-12, the first auxiliary component's fingers 62 extend as freestanding structures from the upper side of the main body 42 of the first auxiliary component 8. As can be seen in FIGS. 13-14, the second auxiliary component's fingers 62' extend as freestanding structures from the lower side of main body 50 of the second auxiliary component 10.

As shown in FIGS. 11 and 12, the first auxiliary component 8 may have two fingers 62 disposed on opposite sides of the central anchor member mounting bore 34. Each finger 62 may include a short longitudinally-oriented stub section 62A that emerges from the upper side of the first auxiliary component's main body 42 and extends for several millimeters (e.g., 2-10 mm, etc.) to a 90 degree transition 62B in the finger. After the 90 degree transition 62B, an elongated laterally-oriented finger section 62C extends to a free end of the finger 62. As best shown in FIG. 12, the elongated finger section 62C section of each finger 62 defines a cantilevered beam having an arcuate shape, with the respective arc centerlines of each finger section being aligned on a common circular axis (not shown) that is concentric with the central anchor member mounting bore 34. As additionally shown in FIGS. 16-17, the elongated finger sections 62C may be configured for flexing in the vertical direction by virtue having a relatively thin cross-sectional thickness dimension $t_1$ (e.g., 1-3 mm) that may vary depending on the material used to form the first auxiliary component 8.

As shown in FIGS. 13 and 14, the second auxiliary component 10 may have two fingers 62' disposed on opposite sides of the stem engagement structure 50A. Each finger 62' may include a short longitudinally-oriented stub section 62'A that emerges from the lower side of the second auxiliary component's main body 50 and extends for several millimeters (e.g., 2-10 mm, etc.) to a 90 degree transition 62'B in the finger. After the 90 degree transition 62'B, an elongated laterally-oriented finger section 62'C extends to a free end of the finger 62'. As best shown in FIG. 14, the elongated finger section 62'C section of each finger 62' defines an arcuate shape, with the respective arc centerline of each finger being aligned on a common axis (not shown) that is concentric with the stem engagement structure 50A. As additionally shown in FIGS. 16-17, the elongated finger sections 62'C may be configured for flexing in the vertical direction by virtue having a relatively thin cross-sectional thickness dimension $t_2$ (e.g., 1-3 mm) that may vary depending on the material used to form the second auxiliary component 10.

As can be seen in FIG. 13, a terminal portion 62'D of the elongated finger section 62'C angles downwardly from the remainder of the finger section. This assists in placing the fingers 62' of the second auxiliary component 10 in both vertically and rotationally overlapping, nested interlocking engagement with the fingers 62 of the first auxiliary component 8. An example of the vertically nested interlocking relationship between the fingers 62 and 62' is shown in FIGS. 9-10 and 16-17. An example of the rotationally overlapping, nested interlocking engagement between the fingers 62 and 62' is shown FIG. 15, with the overlapping region of the fingers being designated by reference number 63.

Figure 16:
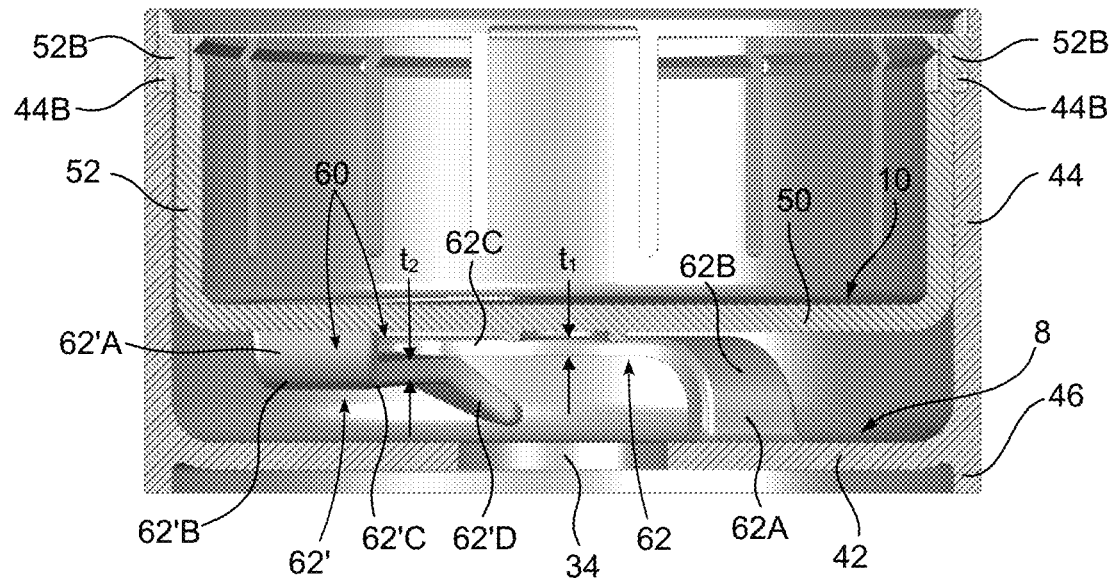
FIG. 16 is a cross-sectional centerline view showing the second auxiliary component of FIGS. 13-14 slidably engaging the first auxiliary component of FIGS. 11-12 in vent port closure position.
Figure 17:
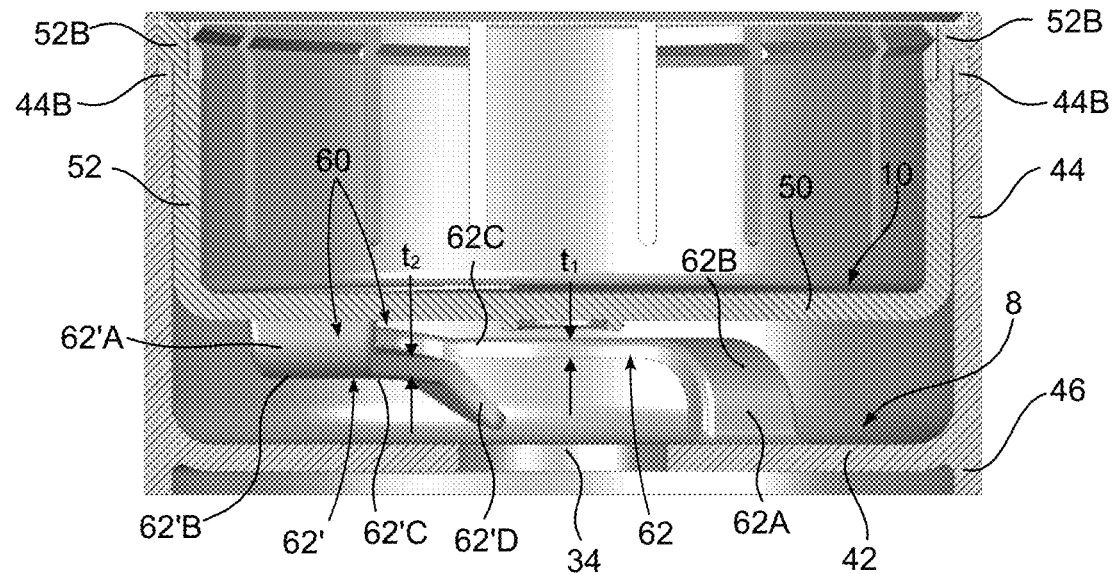
FIG. 17 is a cross-sectional centerline view showing the second auxiliary component of FIGS. 13-14 moving upwardly from the first auxiliary component of FIGS. 11-12 but being constrained by one or more flexible members that resiliently deform to resist the upward movement of the second auxiliary component.

When the second auxiliary component 10 is in the vent port closure position of FIGS. 9 and 16, the bottom of the elongated finger sections 62C of the first auxiliary component's fingers 62 may directly engage the top of the elongated finger sections 62'C of the second auxiliary component's fingers 62', so that there is no vertical gap between them. This ensures that any upward movement of the second auxiliary component 10 will be resisted by the fingers 62 and 62', and that the second auxiliary component can only be lifted from its vent port closure position by applying sufficient lifting force to cause deformation of one or both fingers. Because manufacturing tolerances may render it difficult to achieve a perfect no-gap spacing between the elongated finger sections 62C and 62'C with zero finger deflection, the fingers 62 and 62' may be configured so that there is a small amount of vertical interference between the elongated finger sections. The resultant deflection of one or both of the elongated finger sections 62C and 62'C will provide an initial preload force that tends to pull the second auxiliary component 10 downwardly into direct or indirect engagement with the stem landing zone 31 (see FIG. 9). Due to this initial preload force, the second auxiliary component 10 may be characterized as being acted upon by a form of artificial gravity. Any attempt to thereafter lift the second auxiliary component 10 upwardly from its vent port closure position will produce additional resistance caused by further deformation of one or both of the fingers 62 and 62'. According to Hooke's law, the flexible members 60 that are composed of the interlocking fingers 62 and 62' act as springs. One end of each spring-like flexible member 60 is anchored by the vertically fixed first auxiliary component 8 and the other end is movable with the second auxiliary component 10. A downward spring force is applied to the movable second auxiliary component 10 that increases in proportion to the distance traveled by the second auxiliary component from its vent port closure position in the upward venting direction. This is in direct contrast to certain prior art anchoring apparatus (as described in the Background section above) wherein in an upward spring force is applied to a movable cylinder that controls vent port opening. FIGS. 10 and 17 graphically illustrate what the maximum finger deformation might look like when the second auxiliary component 10 has reached its upper position in which the vent port 20 is fully open.

As best shown in FIG. 17, the downwardly angled terminal portion 62'D of each of the second auxiliary component's elongated finger sections 62'C may be used to help interlock the fingers 62 and 62' in an initial interference fit relationship when the second auxiliary component 10 is mounted to the first auxiliary component 8. Specifically, the second auxiliary component 10 may be lowered onto the first auxiliary component 8 in a rotational position wherein the fingers 62 and 62' are not in rotationally overlapping alignment. As previously noted, the notion of rotational overlapping alignment between the fingers 62 and 62' is illustrated by FIG. 15. In FIG. 15, the second auxiliary component is in a rotational position wherein its fingers 62' are in rotational overlapping alignment with the first auxiliary component's fingers 62. To take the fingers 62 and 62' out of overlapping rotational alignment, the second auxiliary component 10 may be rotated counter-clockwise until its elongated finger sections 62'C are no longer in contact with the elongated finger sections 62C of the first auxiliary component 8. In this rotational position, the fingers 62 and 62' will not impede vertical movement of the second auxiliary component 10 relative to the first auxiliary component 8, thereby allowing these components to be separated or joined as desired.

The one or more flexible members 60 may be designed so that the resistance generated by deforming one or both of the fingers 62 and 62' resists accelerations of the second auxiliary component 10 away from its vent port closure position so as to prevent unwanted venting of the controlled pressure zone 48 due to forces of a first magnitude acting on the anchoring apparatus 2 in the venting direction. Such forces could arise from the anchoring apparatus 2 experiencing vertical loading, lateral loading, or a combination of such loadings. On the other hand, the design of the one or more flexible members 60 may be such that the resistance generated by deforming one or both of the fingers 62 and 62' is insufficient to prevent movement of the second auxiliary component 10 away from the vent port closure position during normal use of the anchoring apparatus 2 in which a controlled force of a second magnitude in excess of the first magnitude is applied to the anchoring apparatus, so as to thereby facilitate intentional venting of the controlled pressure zone 48 and removal of the anchoring apparatus from the reference surface 4 by a user.

It will be appreciated that the one or more flexible members 60 may (or may not) decrease or even eliminate the stealthiness of the anchoring apparatus 2 for embodiments in which the anchor member 6 is a properly designed suction seal stabilizer. The above-mentioned force of a second magnitude may (or may not) be large enough to be felt by the user as a noticeable stickiness when an attempt is made to lift the anchoring apparatus 2 during normal use. In any event, what is gained from the one or more flexible members 60 is an ability of the anchoring apparatus 2 to resist spurious accelerations that could otherwise separate the anchoring apparatus from the reference surface 4, resulting in spillage of the items or materials being carried thereby.

The one or more flexible members 60 also provide the ability to mount the anchoring apparatus 2 on a reference surface 4 that is non-horizontal, or becomes so periodically over time, such as in a moving vehicle (e.g., an aircraft, watercraft or landcraft). In some cases, the one or more flexible members 60 may be designed so that the anchoring apparatus 2 can be mounted on a reference surface 4 that is vertical (or beyond vertical), even when the anchor member 6 is a suction seal stabilizer rather than a suction cup.

It will be seen in FIGS. 1-10 that the anchoring apparatus 2 may be implemented as a three-component assembly whose components include the seal member 6, the first auxiliary component 8, and the second auxiliary component 10. When the anchoring apparatus 2 is resting on the support surface 4 in the manner shown in FIG. 9, a user can grasp the secondary body 52 of the second auxiliary component 10, or a structure attached thereto (not shown), and lift the anchoring apparatus 2 upwardly in a normal manner. Doing so will lift the second auxiliary component 10 to its upper position (as shown in FIG. 10), cause the vent port 20 to unblock, and vent the controlled pressure zone 48. As a result, the anchoring apparatus 2 may then be lifted away from the reference surface 4 without any apparent resistance above and beyond its own weight and the weight of any item(s) or material(s) being carried thereby, as well as the resistance generated by deforming the flexible members 60. If, on the other hand, the anchoring apparatus 2 is resting on the reference surface 4 and is impacted by a side load that would otherwise tip the anchoring apparatus and dislodge or spill the item(s) or material(s) carried thereby, the vent port 20 will remain closed so long as the stem landing zone 31 is directly or indirectly engaged by the main body 50 of the second auxiliary component 10. Instead of the anchoring apparatus 2 tipping, the base seal member 11 will deform in a manner that tends to increase the volume of the controlled pressure zone 48, causing the air pressure therein to decrease so as to develop a dynamically increasing suction force that stabilizes the anchoring apparatus on the reference surface 4.

Figure 18:
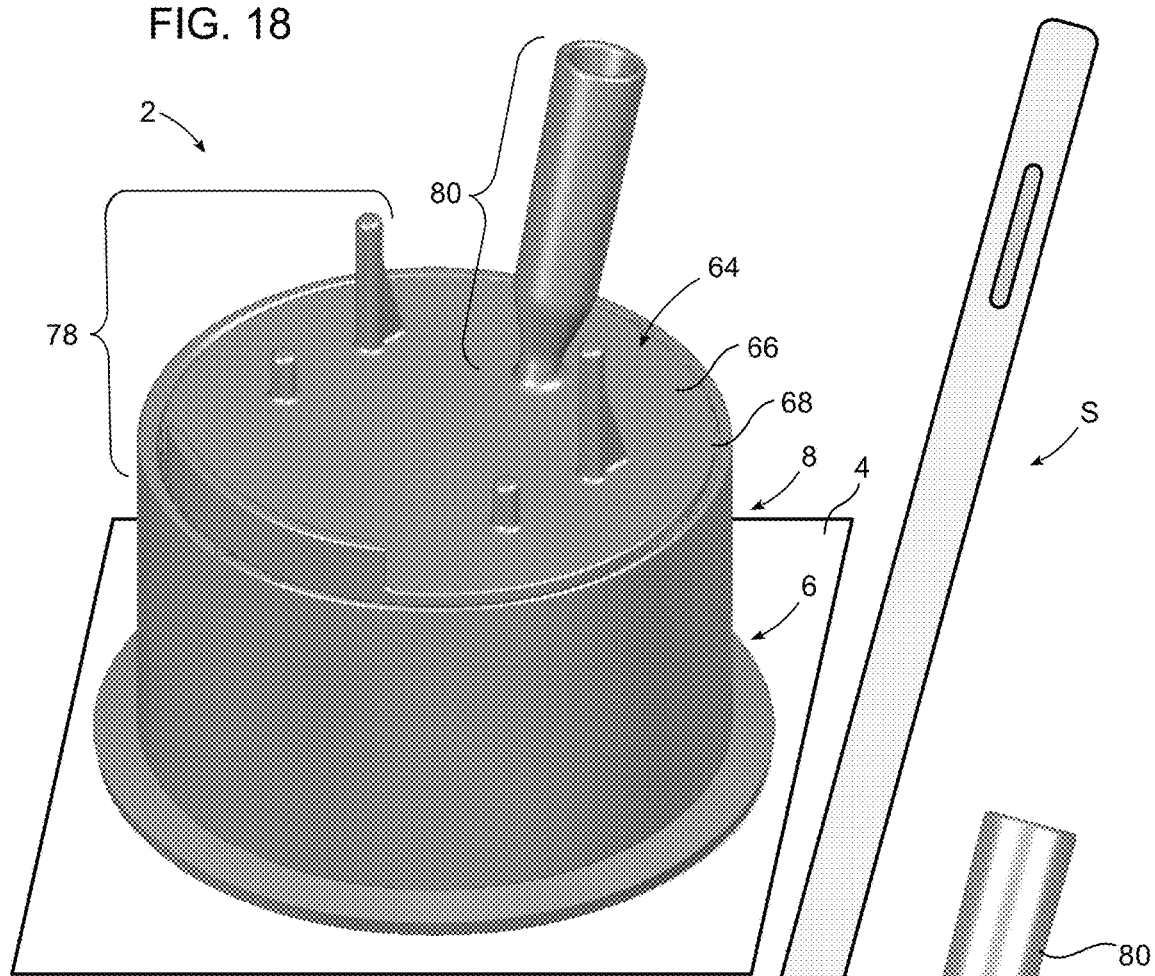
FIG. 18 is an upper perspective view showing the anchoring apparatus of FIG. 1 with a second auxiliary component cap member thereof configured as a dedicated attachment for carrying a smartphone.
Figure 19:
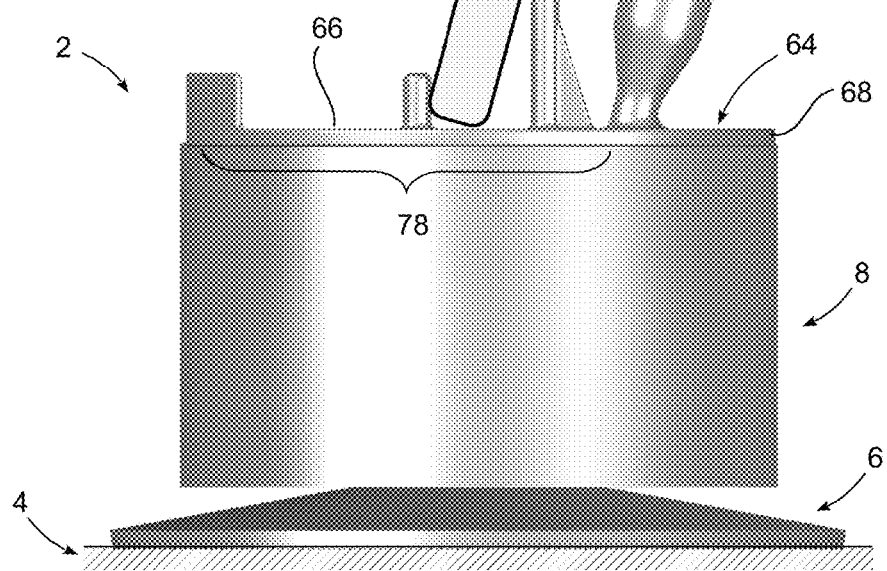
FIG. 19 is a side view showing the anchoring apparatus of FIG. 1 with the cap member of FIG. 18 carrying a smartphone.
Figure 20:
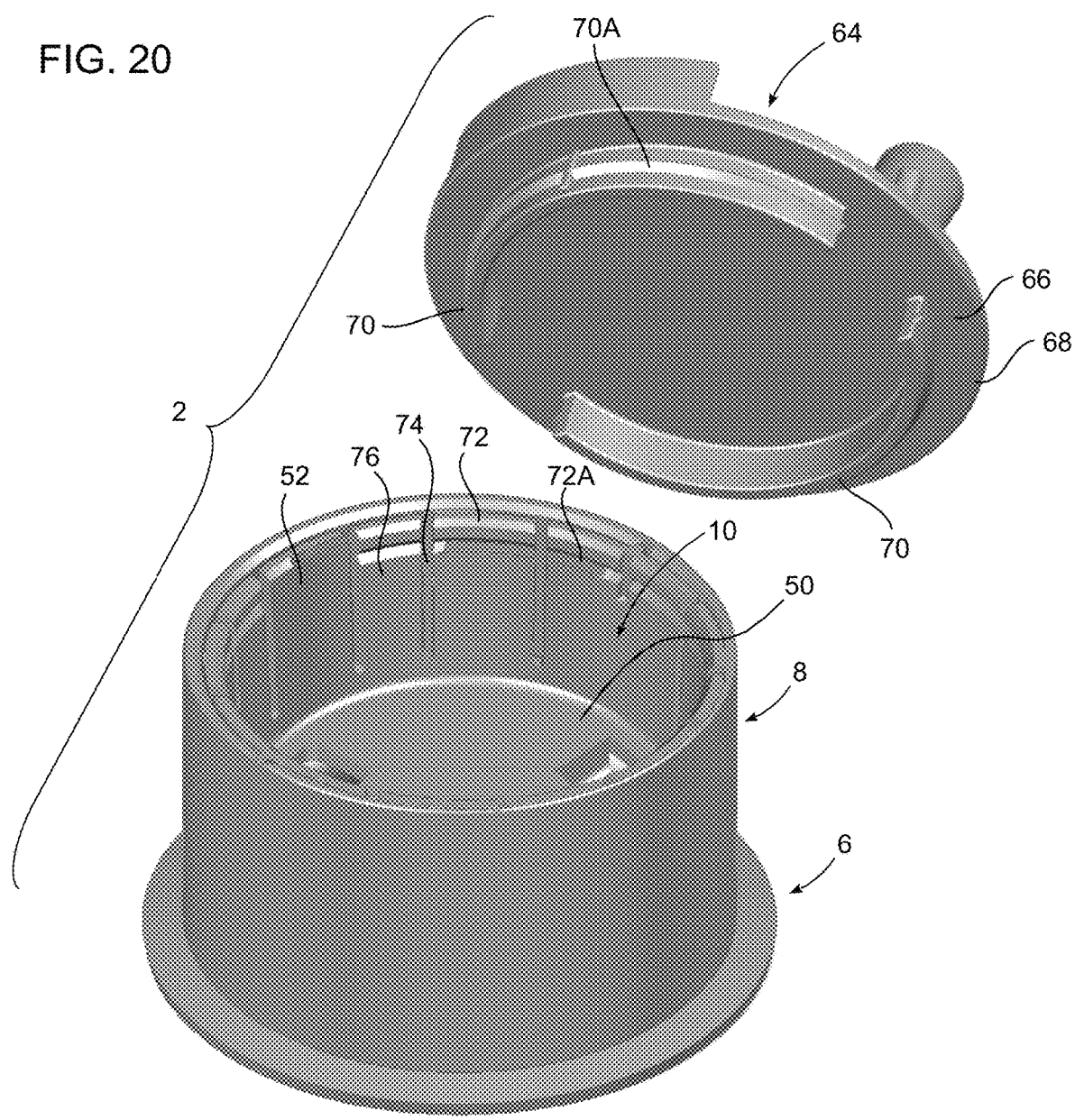
FIG. 20 is a partially exploded upper perspective view showing the anchoring apparatus of FIG. 1 with the cap member of FIG. 18 detached from the remainder of the anchoring apparatus.

Turning now to FIGS. 18-20, the second auxiliary component 10 may carry a cap member 64 on its secondary body 52. The cap member 64 may be formed from any suitable rigid (or semi-rigid) material, such as plastic, silicone rubber, etc. The cap member 64 includes a main body 66 that may be formed as a circular disk-like structure having a peripheral edge 68. As shown in FIG. 20, the cap member 64 may also include a secondary body 70 formed as one or more arcuate flanges that are spaced radially inwardly from the peripheral edge 68 and extend downwardly therefrom. The peripheral edge 68 of the cap member's main body 66 contacts (e.g., rests on) an upper edge 72 of the second auxiliary component's secondary body 52. The one or more arcuate flanges that form the cap member's secondary body 70 may extend downwardly from the main body 66 for mounting the cap member 64 to the second auxiliary component 10. In particular, the one or more flanges may extend along the inside wall of the secondary body 52 of the second auxiliary component 10 to provide a vertically overlapping area between the components.

The vertically overlapping area may be used to removably connect the cap member 64 to the second auxiliary component 10. For example, the one or more flanges that form the cap member's secondary body 70 may each be formed with an outwardly-extending circular ridge 70A that engages a corresponding inwardly-facing circular channel 72A formed on the inside wall of the secondary body 52. To provide sufficient flexibility to facilitate the removable mounting of the cap member 64 to the second auxiliary component 10, the latter's secondary body 52 may be formed with vertical slots 74. The slots 74 may define a plurality of independently movable wall sections 76 of the secondary body 52 that are capable of radial outward flexing. The outward flexing of the wall sections 76 allows the ridges 70A of the cap member's secondary body 70 to disengage from the channel(s) 72A of the second auxiliary component 10. It will be appreciated that instead of (or in addition to) defining flexible wall sections 76 in the secondary body 52, the wall of the secondary body could be circumferentially continuous and the one or more flanges that form the cap member's secondary body 70 could be fabricated so as to have a high degree of radial flexibility. Many other connection configurations for mounting the cap member 64 to the second auxiliary component 10 could also be used, including but not limited to threaded connections, connections in which one or more connectors on the cap member 64 engage the main body 50 of the second auxiliary component instead of the secondary body thereof, etc.

As can be seen in FIGS. 18-19, the cap member 64 may be formed with one or more carrier structures that extend upwardly from the main body 66 for carrying various items or materials to be secured to the reference surface 4. By way of example only, one of the carrier structures may be a smartphone carrier 78 for holding a smartphone "S" at different angles, and the other may be a pen or pencil carrier 80 for holding pens, pencils or other writing implements (not shown).

Figure 21:
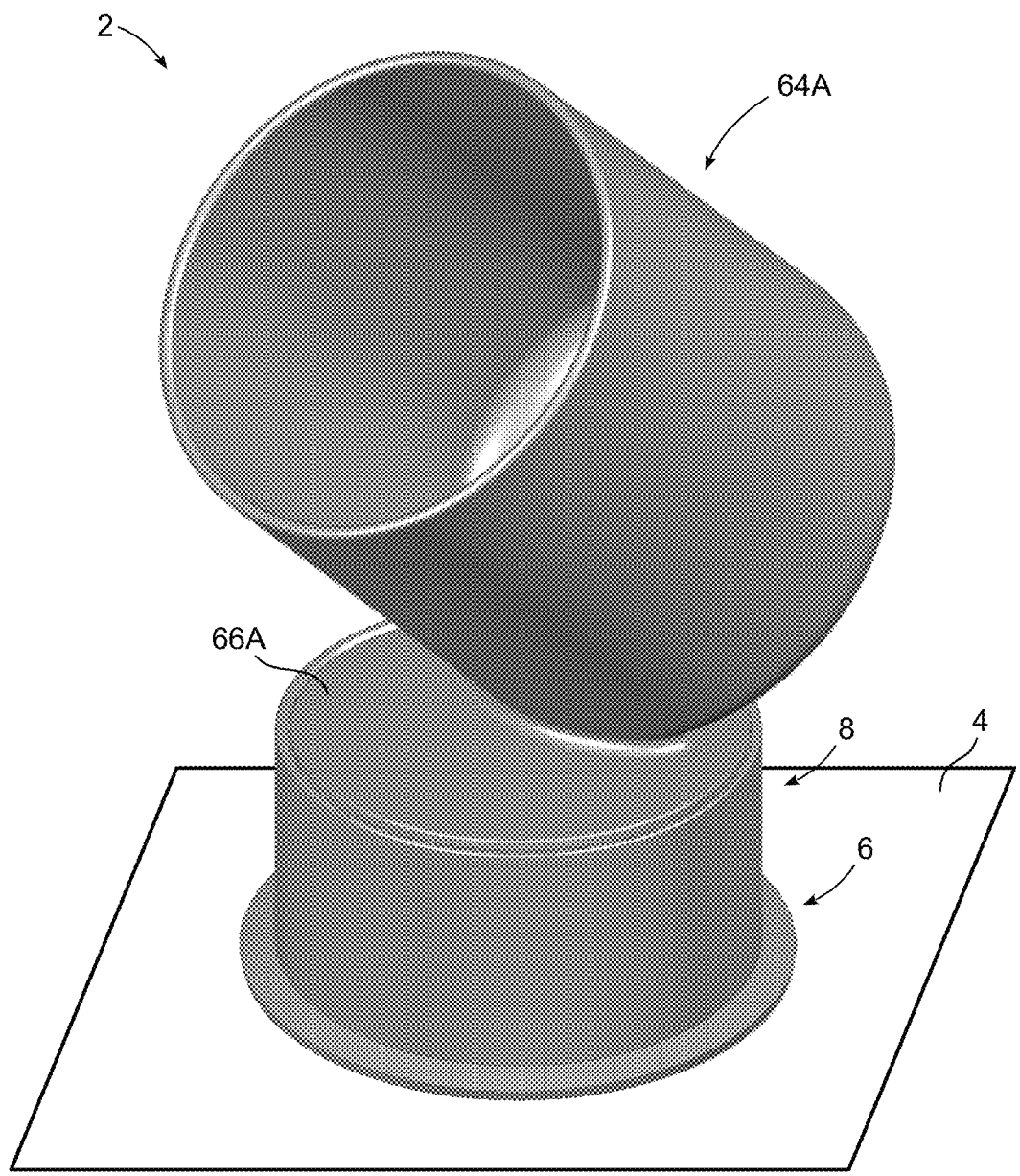
FIG. 21 is an upper perspective view showing the anchoring apparatus of FIG. 1 with another second auxiliary component cap member thereof configured as a dedicated attachment for carrying writing instruments.

FIG. 21 illustrates an alternative cap member 64A that is configured as a cup-shaped carrier dedicated to holding one or more pens, pencils or other writing implements (not shown). The cap member 64A has the same features as the cap member 64 of FIGS. 18-20, with the exception of the structure situated on the upper side of the main body 66A. In particular, an open-top, closed-bottom cup 67 is provided for carrying the one or more writing implements.

Figure 22:
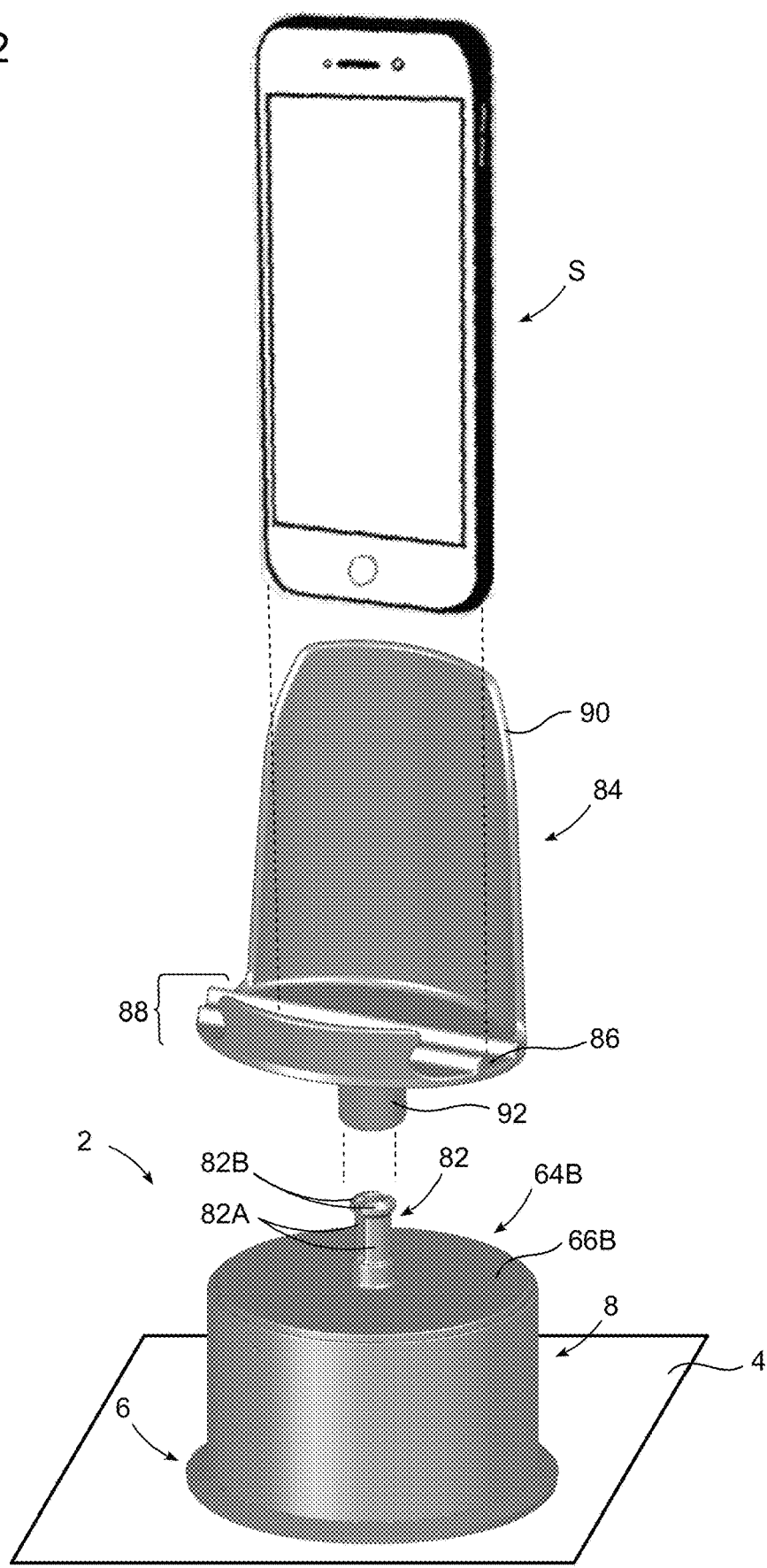
FIG. 22 is an exploded upper perspective view showing the anchoring apparatus of FIG. 1 with a modified cap member configured as a universal carrier, and with the carrier being connected to an attachment for carrying a smartphone.

In the illustrated embodiment of FIGS. 18-20, as well as the embodiment of FIG. 21, the cap members 64 and 64A are configured as dedicated attachments that hold specific items. As shown in FIG. 22, an alternative cap member 64B may function as a universal carrier that can mount any number of separate attachments, each of which is configured for holding one or more specific items. In this embodiment, the cap member 64B has the same features as the cap members 64 and 64A, with the exception of the structure situated on the upper side of the main body 66B. In particular, a universal mounting structure 82 may be provided that extends upwardly from the center (or other location) of the cap member's main body 66B. The universal mounting structure may be in the form of a male connector with two closely-spaced vertical prongs 82A of hemispherical cross-section, each having a radially outwardly-extending flange 82B on its free end. Many other connector designs could also be used. Attachments to be connected to the mounting structure 82 may be formed with counterpart female connectors.

FIG. 22 depicts one example attachment 84 that may be used to carry a smartphone "S". The smartphone carrier attachment 84 may have a disk-shaped phone-support base 86 with three parallel carrier structures 88 on its upper surface that are spaced apart to receive the base of the smartphone "S" at different angles. A back support member 90 extends upwardly from the phone-support base 86 to receive the back of the smartphone "S." A tubular female mounting structure 92 extends downwardly from the phone-support base 86 for connecting to the male mounting structure 82 of the cap member 64A. To facilitate fine-grained angular positioning of the smartphone "S," the mounting structure 82 and the smartphone carrier attachment 84 may be designed so that the female mounting structure 92 of the carrier attachment can be freely rotated on the male mounting structure 82 of the cap member 64A. It will be appreciated that many other types of attachments could be connected to the mounting structure 82. For example, attachments could be designed for holding kitchen, bath or other household items, workshop tools, and so on. Beverage holding attachments could also be used.

Figure 23:
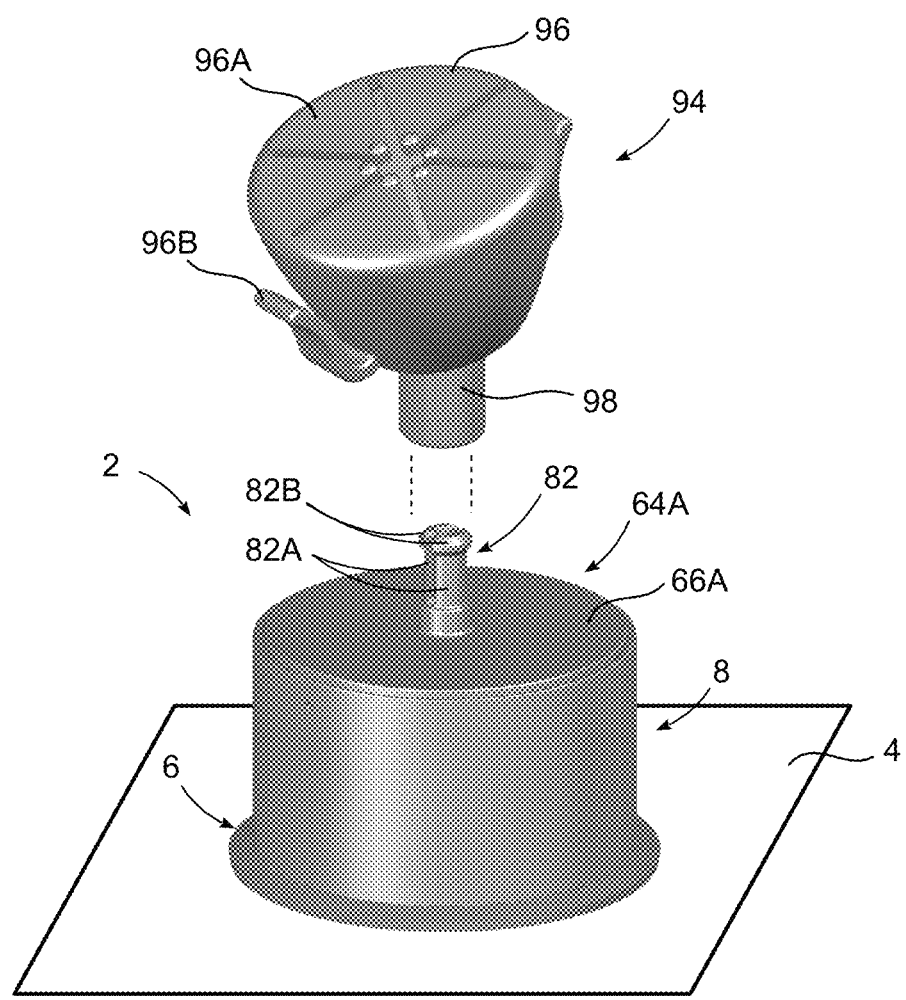
FIG. 23 is an exploded upper perspective view showing the anchoring apparatus of FIG. 1 with another modified cap member configured as a universal carrier, and with the carrier being connected to an attachment for carrying a liquid-containing bottle.

FIG. 23 is illustrative. This embodiment shows an attachment 94 that may be used to hold a liquid-carrying bottle, such as a bottle of nail polish (not shown). The bottle-holding attachment 94 includes a bottle receptacle 96 and a lower female mounting structure 98 that extends downwardly from the bottle receptacle for connecting to the male mounting structure 82 of the cap member 64A. The bottle receptacle 96 may include a plurality of resilient flaps 96A that engage and stabilize a bottle when it is inserted into the bottle receptacle. The bottle receptacle 96 may further include a pair of finger gripping tabs 96B that may be grasped by a user in order to lift the anchoring apparatus 2 from the reference surface 4.

Turning now to FIGS. 24-28, an alternative anchoring apparatus 102 is shown that is similar to the anchoring apparatus 2 of FIGS. 1-17, and may be formed from the same materials, but has alternative auxiliary components and a different flexible member design. Correspondence between components of the embodiment of FIGS. 24-28 and like components of the embodiment of FIGS. 1-17 is indicated by using corresponding reference numbers incremented by 100.

Figure 24:
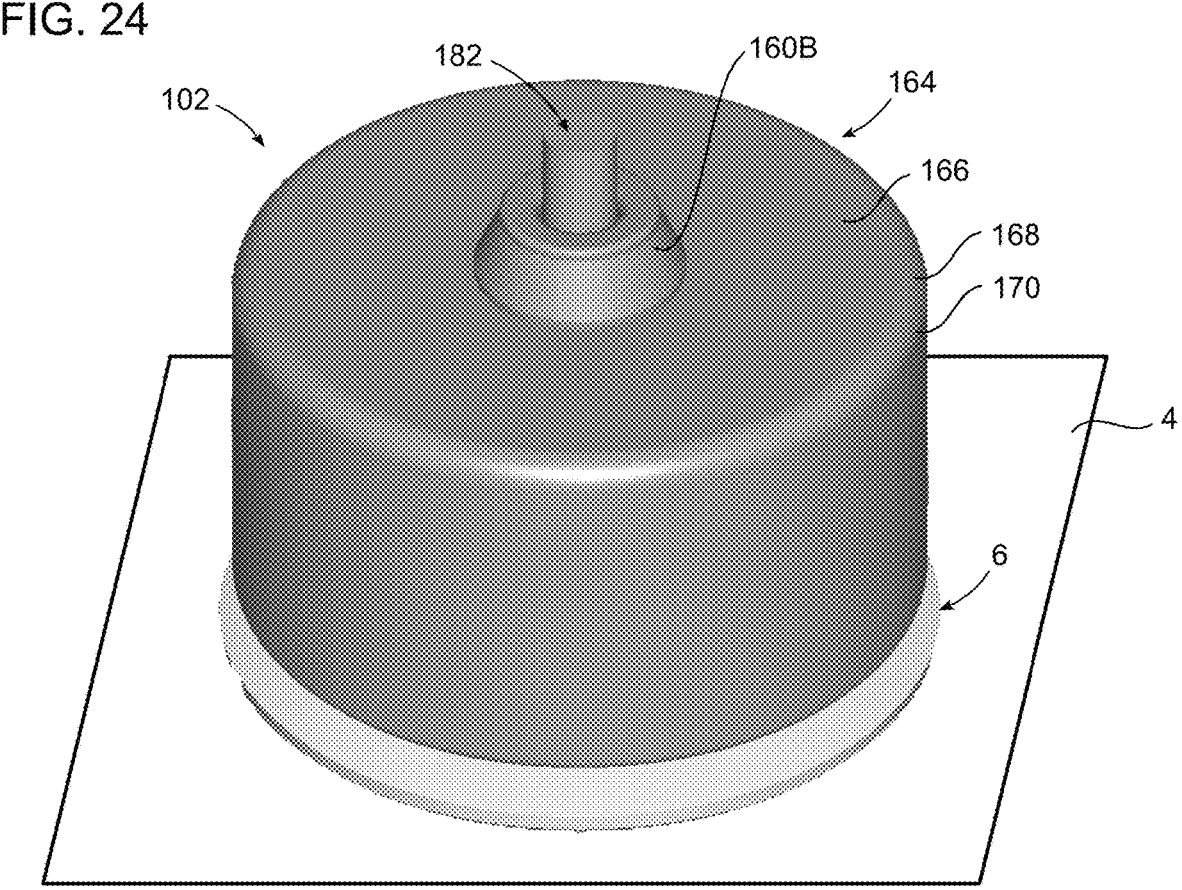
FIG. 24 is an upper perspective view showing an anchoring apparatus according to another embodiment.
Figure 25:
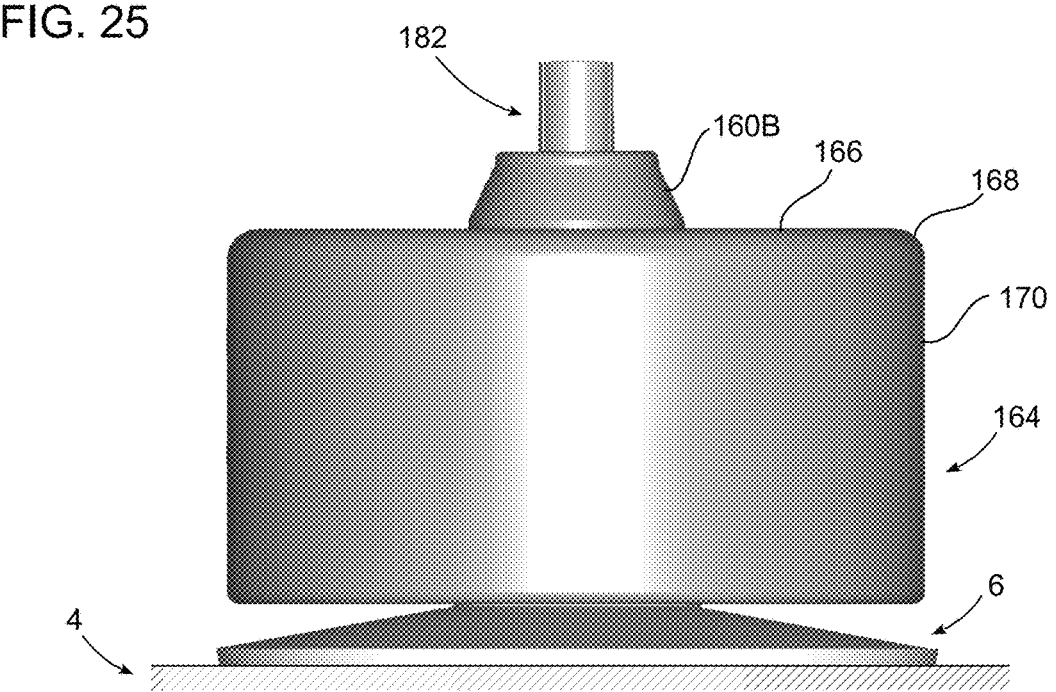
FIG. 25 is a side view of the anchoring apparatus of FIG. 24.
Figure 26:
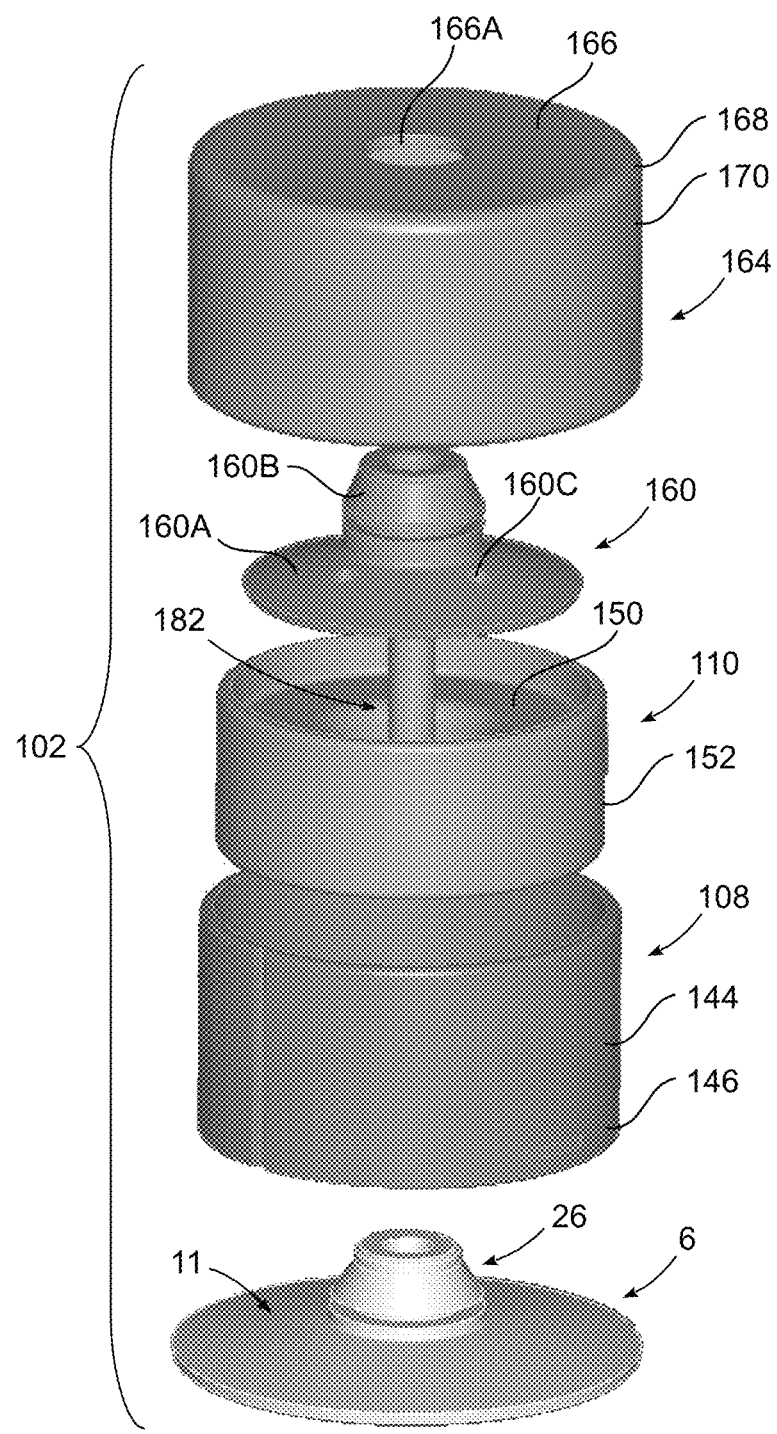
FIG. 26 is a fully exploded upper perspective view showing the anchoring apparatus of FIG. 24.

As can be seen in FIGS. 24-26, the anchoring apparatus 102 may include the previously-described anchor member 6 of FIGS. 4-8 (or alternatively the anchor member 6A of FIG. 3A), a first auxiliary component 108 that is rigidly self-mounted to the anchor member stem 26, and a second auxiliary component 110 that is vertically movable relative to the first auxiliary component. As additionally shown in FIGS. 27-28, the first auxiliary component 108 may include a circular disk-like main body 142, a tube-like secondary body 144 extending upwardly from the periphery of the main body, and a tube-like tertiary body 146 extending downwardly from the periphery of the main body in radial alignment with the secondary body. The second auxiliary component 110 may include a circular disk-like main body 150, a tube-like secondary body 152 extending upwardly from periphery of the main body, and a tube-like tertiary body 153 extending downwardly from the periphery of the main body in radial alignment therewith. The outside surfaces of the second auxiliary component's secondary body 152 and tertiary body 153 may be in opposing closely spaced relationship with the inside surface of the first auxiliary component's secondary body 144 to help guide the second auxiliary component's vertical motion.

A cap member 164 nests over the first auxiliary component's secondary body 144. The cap member 164 is fixedly connected to the first auxiliary component 108 and thus may be considered to be a part of that component. A single discrete flexible member 160 is provided that is independent of both the first auxiliary component 108 and the second auxiliary component 110. The flexible member 160 resiliently deforms to generate resistance as the second auxiliary component 110 moves in a venting direction away from the vent port closure position toward the vent port open position. The flexible member 160 returns to its initial form (shape and position) when the second auxiliary component 110 returns to the vent port closure position. The flexible member 160 is connected between the first and second auxiliary components 108 and 110, with the first auxiliary component providing a vertically stable reference end thereof (via the cap member 164). The flexible member 160 is external to and independent of the anchor member 6, and is non-reliant on pressure within the controlled pressure zone 48 for generating the resistance.

The cap member 164 may be configured as an inverted cup-shaped structure that covers the top and sides of the first and second auxiliary components 108 and 110, with other configurations also being possible. A main body 166 of the cap member 164 may be shaped as a substantially circular disk-like structure having a central bore 166A and circular peripheral edge 168. A secondary body 170 of the cap member 164 may be formed as a tube-like structure that extends downwardly from the peripheral edge 168.

Figure 27:
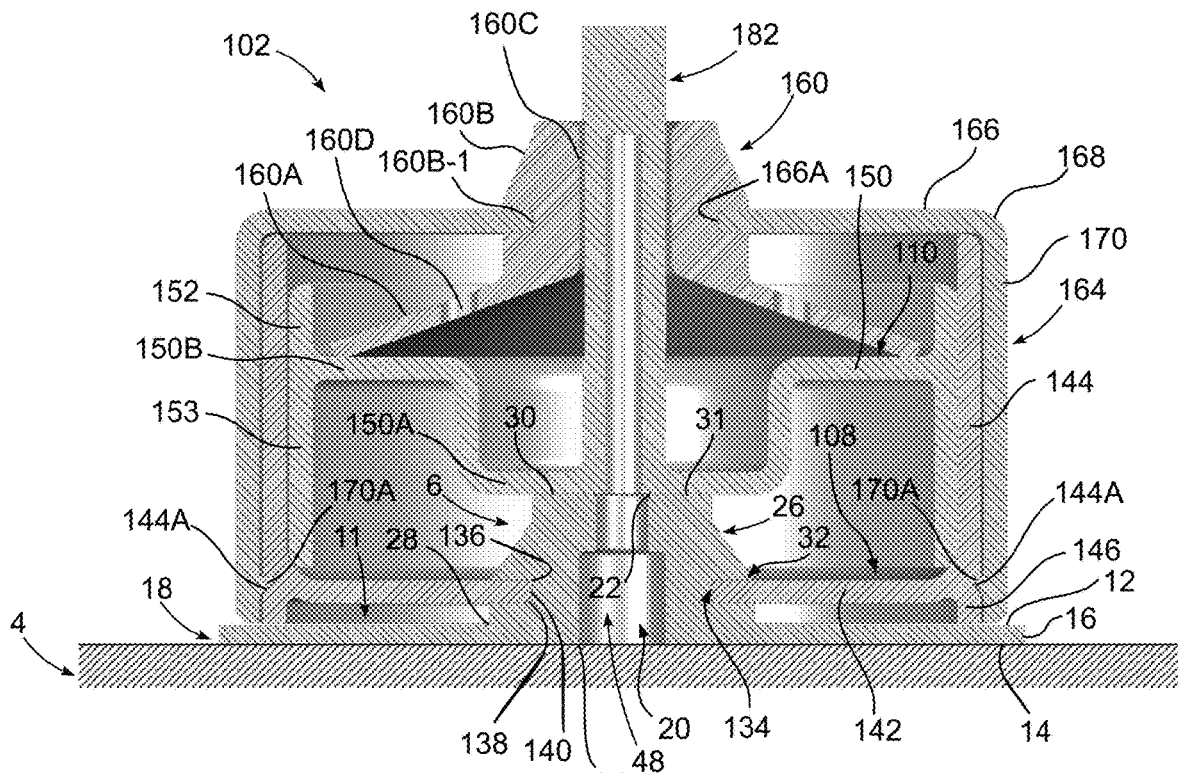
FIG. 27 is a cross-sectional centerline view showing the anchoring apparatus of FIG. 24 with a closed vent port.
Figure 28:
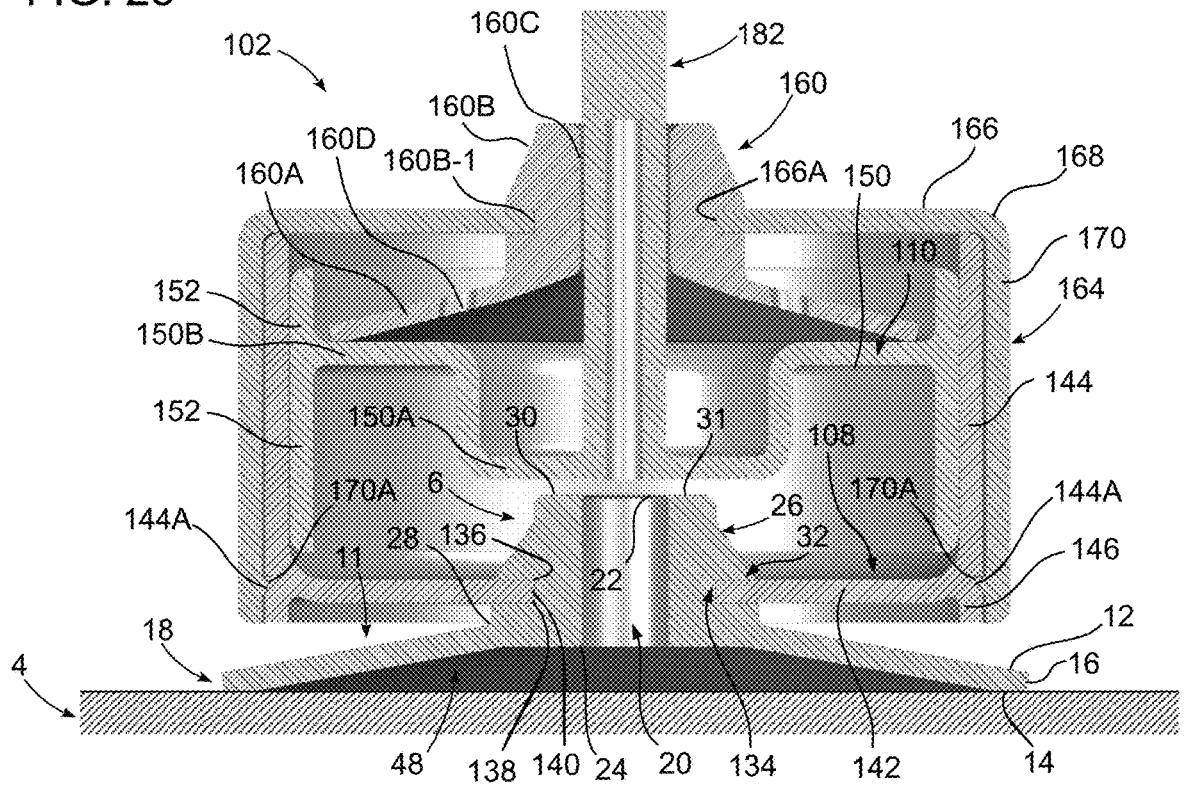
FIG. 28 is a cross-sectional centerline view showing the anchoring apparatus of FIG. 22 with an open vent port.

As best shown in FIGS. 27-28, the secondary body 170 of the cap member 164 may be formed with one or more radially inwardly-extending prongs 170A (two are shown) proximate to its lower edge. The prongs 170A engage one or more corresponding notches 144A (two are shown) formed on the radial outside surface of the first auxiliary component's secondary body 144. This arrangement effectively latches the cap member 164 in place on the first auxiliary component 108. With the exception of a central upwardly-protruding mounting structure 182 of the second auxiliary component 110, the first and second auxiliary components 108 and 110 are substantially covered and hidden from view by the cap member 164.

The flexible member 160 is similar in design to the anchor member 6, and may be constructed using the same type of resilient material (e.g., silicone rubber). The flexible member 160 is disposed between the second auxiliary component 110 and the cap member portion 164 of the first auxiliary component 108, and operates to bias the second auxiliary component to its vent port closure position. As can be seen in FIGS. 26-28, the flexible member 160 may include a relatively flexible conical base 160A and a relatively non-flexible central stem 160B extending upwardly from the base. As best shown in FIGS. 27-28, the flexible member base 160A rests on the upper side of the second auxiliary component's main body 150. The flexible member stem 160B is mounted to the cap member's main body 166. The same mounting technique used to mount the anchor member 6 to the first auxiliary component 108 may be used to mount the flexible member 160 to the cap member 164. In particular, the flexible member stem 160B may be formed with an annular groove 160B-1 that tightly engages the central bore 166A of the cap member's main body 166.

To limit the vertical size required for the flexible member 160, the main body 150 of the second auxiliary component 110 may be stepped so as to form two levels. A radially inboard lower level 150A engages the stem landing zone 131 on the stem upper end 130 of the anchor member 6. The mounting structure 182 of the second auxiliary component 110 may be formed as a cylindrical post that extends upwardly from the lower level 150A. Other mounting structure configurations may also be used. The mounting structure 182 may be used to mount one or more items or materials (not shown) to be carried by the anchoring apparatus 102, or one or more attachments (not shown) that carry one or more items or materials. It will be appreciated that the main body 166 of the cap member 164 may also be configured as a carrier for carrying one or more items or materials. Although the interior of the mounting structure 182 is shown as being hollow along a portion of its length, a solid mounting structure design could also be used. A raised radially outboard upper level 150B of the second auxiliary component's main body 150 engages the flexible member base 160A of the flexible member 160.

As best shown in FIGS. 27-28, the flexible member 160 may be formed with a central vertical bore 160C that extends through both the flexible member base 160A and the flexible member stem 160B. The flexible member bore 160C is sized to slidably receive the mounting structure 182.

The cap member 164 is vertically fixed by virtue of its connection to the first auxiliary component 108 (thereby forming part of the first auxiliary component), which is itself connected in a vertically fixed manner to the anchor member 6. When the second auxiliary component 110 is in the vent port closure position of FIG. 27, the bottom of the flexible member base 160A will engage the upper side of the second auxiliary component's main body 150 (as previously noted). Because the flexible member stem 160B is connected to the vertically fixed cap member 166, any upward movement of the second auxiliary component 110 will be resisted by the flexible member base 160A as it deforms from its initial conical state (shown in FIG. 27) to a more flattened configuration (shown in FIG. 28). The second auxiliary component 110 can only be lifted from its vent port closure position by applying sufficient lifting force to produce such deformation of the flexible member base 160A.

The flexible member 160 may be designed so that the resistance generated by deforming the flexible member base 160A resists accelerations of the second auxiliary component 110 away from its vent port closure position so as to prevent unwanted venting of the controlled pressure zone 48 due to forces of a first magnitude acting on the anchoring apparatus 102 in the venting direction. Such forces could arise from the anchoring apparatus 102 experiencing vertical loading, lateral loading, or a combination of such loadings. On the other hand, the design of the flexible member 160 may be such that the resistance generated by deforming the flexible member base 160A is insufficient to prevent movement of the second auxiliary component 110 away from the vent port closure position during normal use of the anchoring apparatus 102 in which a controlled force of a second magnitude in excess of the first magnitude is applied to the anchoring apparatus, so as to thereby facilitate intentional venting of the controlled pressure zone 48 and removal of the anchoring apparatus from the reference surface 4 by a user.

As can be seen in FIGS. 26-28, the flexible member base 160A may be formed with one or more vent holes 160D that allow air to pass between the upper and lower sides thereof in order to equalize air pressure as the second auxiliary component 110 moves upwardly and downwardly during use of the anchoring apparatus 102. This will ensure that the vertical movement of the second auxiliary component is not impeded by any air pressure imbalance between the upper and lower sides of the flexible member base 160A.

As best shown in FIG. 27, the flexible member 160 may be sized so that, when the which the second auxiliary component 110 is in the vent port closure position, the vertical distance between the lower surface of flexible member stem's annular groove 160B-1 and the lowermost portion of the flexible member base 160A corresponds to the spacing between the lower side of the cap member's main body 166 and the upper side of the second auxiliary component's main body 150. However, because manufacturing tolerances may render it difficult to achieve a perfect no-gap spacing, the flexible member 160 may be sized so that there is a small amount of vertical interference between the lower side of the flexible member base 160A and the upper side of the main body 150. This will ensure that the flexible member 160 is in an initial interference fit relationship with the cap member 164 and the second auxiliary component 110 when the latter is in its vent port closure position. In order for the flexible member 160 to fit within this vertically-restricted space, the flexible member base 160A must deform. This will place the flexible member 160 in an initial state of deformation whereby it exerts a downward preload force on the second auxiliary member 110 in the vent port closure position.

Due to the initial preload force exerted by the flexible member 160, the second auxiliary component 110 may be characterized as being acted upon by a form of artificial gravity. Any attempt to lift the second auxiliary component 110 upwardly from its vent port closure position will produce additional resistance caused by further deformation (flattening) of the flexible member base 160A. According to Hooke's law, the flexible member 160 forms a spring whose downward spring force increases in proportion to the distance traveled by the second auxiliary component 110 from its vent port closure position in the upward venting direction. This is in direct contrast to certain prior art anchoring apparatus (as described in the Background section above) wherein an upward spring force is applied to a movable cylinder that controls vent port opening. FIG. 28 graphically illustrates what the maximum flexible member base deformation might look like when the second auxiliary component 110 has reached its upper position in which the vent port 20 is fully open.

It will be appreciated that the flexible member 160 may (or may not) decrease or even eliminate the stealthiness of the anchoring apparatus 102 for embodiments in which the anchor member 6 is a properly designed suction seal stabilizer. The above-mentioned force of a second magnitude may (or may not) be large enough to be felt by the user as a noticeable stickiness when an attempt is made to lift the anchoring apparatus 102 during normal use. In any event, what is gained from the flexible member 160 is an ability of the anchoring apparatus 102 to resist spurious accelerations that could otherwise separate the anchoring apparatus from the reference surface 4, resulting in spillage of the items or materials being carried thereby. The flexible member 160 also provides the ability to mount the anchoring apparatus 102 on a reference surface 4 that is non-horizontal, or becomes so periodically over time, such as in a moving vehicle (e.g., an aircraft, watercraft or landcraft). In some embodiments, the flexible member 160 may be designed so that the anchoring apparatus 102 can be mounted on a reference surface 4 that is vertical (or beyond vertical), even when the anchor member 6 is a suction seal stabilizer rather than a suction cup.

It will be seen that the anchoring apparatus 102 may be implemented as a four-component assembly whose components include the anchor member 6, the first auxiliary component 108 (including its cap member 164), the second auxiliary component 110, and the flexible member 160. When the anchoring apparatus 102 is resting on the support surface 4 in the manner shown in FIG. 27, a user can grasp the exposed upper end of mounting structure 182, or a separate structure mounted thereto (not shown), and lift the anchoring apparatus upwardly in a normal manner. Doing so will lift the second auxiliary component to its upper position (as shown in FIG. 28), cause the vent port 20 to unblock, and vent the controlled pressure zone 48. As a result, the anchoring apparatus 102 may then be lifted away from the reference surface 4 without any apparent resistance above and beyond the weight of the anchoring apparatus and any item(s) or material(s) (not shown) being carried thereby, as well as the resistance generated by deforming the flexible member 160. If, on the other hand, the anchoring apparatus 102 is resting on the reference surface 4 in the manner shown in FIG. 27 and is impacted by a side load that would otherwise tip the anchoring apparatus and dislodge or spill the item(s) or material(s), the vent port 20 will remain closed so long as the stem landing zone 31 is directly or indirectly engaged by the main body 150 of the second auxiliary component 110, and the anchoring apparatus will not tip due to a negative pressure differential having developed in the controlled pressure zone 48.

As shown in FIGS. 27 and 28, the lower level 150A of the second auxiliary component's main body 150 is configured for efficient direct or indirect engagement with the stem landing zone 31 so as to promote superior sealing of the vent port 20. In the illustrated embodiment, the main body lower level 150A completely blankets the stem landing zone 31 by covering the entire surface area thereof to block the vent port 20, and may in fact be several times larger in areal extent. For example, if the main body lower level 150A and the stem landing zone 31 are both circular, the diameter of the lower level may be at least two or more times larger than the diameter of the stem landing zone 31. If the anchor member 6A is being used, the main body lower level will likewise blanket the vent port closure member 7 disposed on the stem upper end 30, causing it to then engage the stem landing zone 31 to block the vent port 20.

Turning now to FIGS. 29-33, an alternative anchoring apparatus 202 is shown that is similar to the anchoring apparatus 2 of FIGS. 1-17, and may be formed from the same materials, but has alternative auxiliary components and a different flexible member design. Correspondence between components of the embodiment of FIGS. 29-33 and like components of the embodiment of FIGS. 1-17 is indicated by using corresponding reference numbers incremented by 200.

Figure 29:
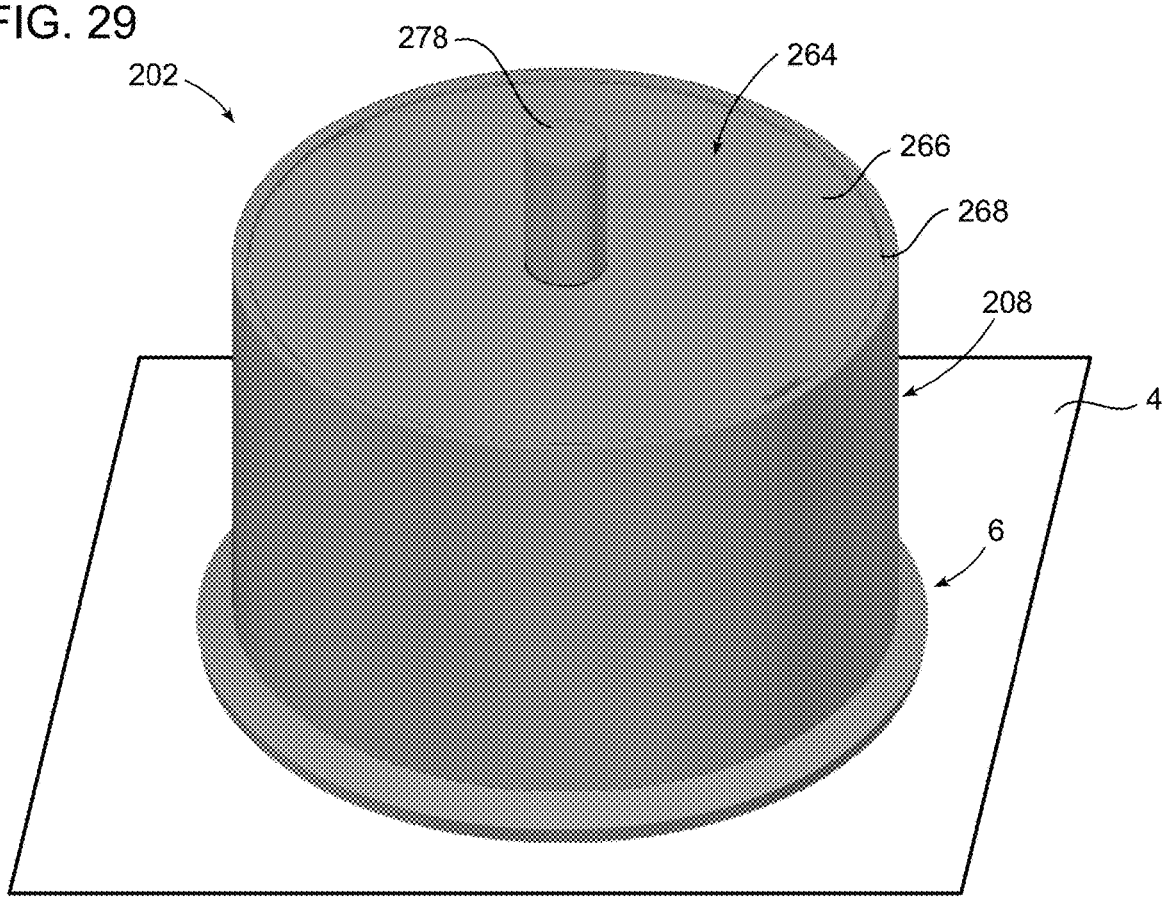
FIG. 29 is an upper perspective view showing an anchoring apparatus according to another example embodiment.
Figure 30:
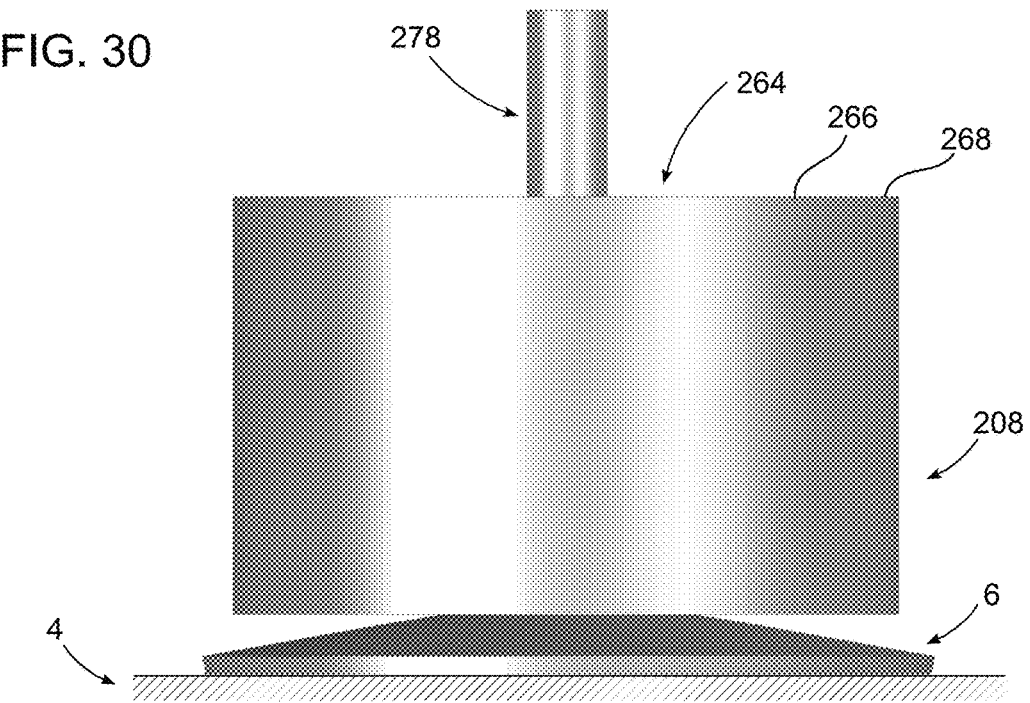
FIG. 30 is a side view showing the anchoring apparatus of FIG. 29.
Figure 31:
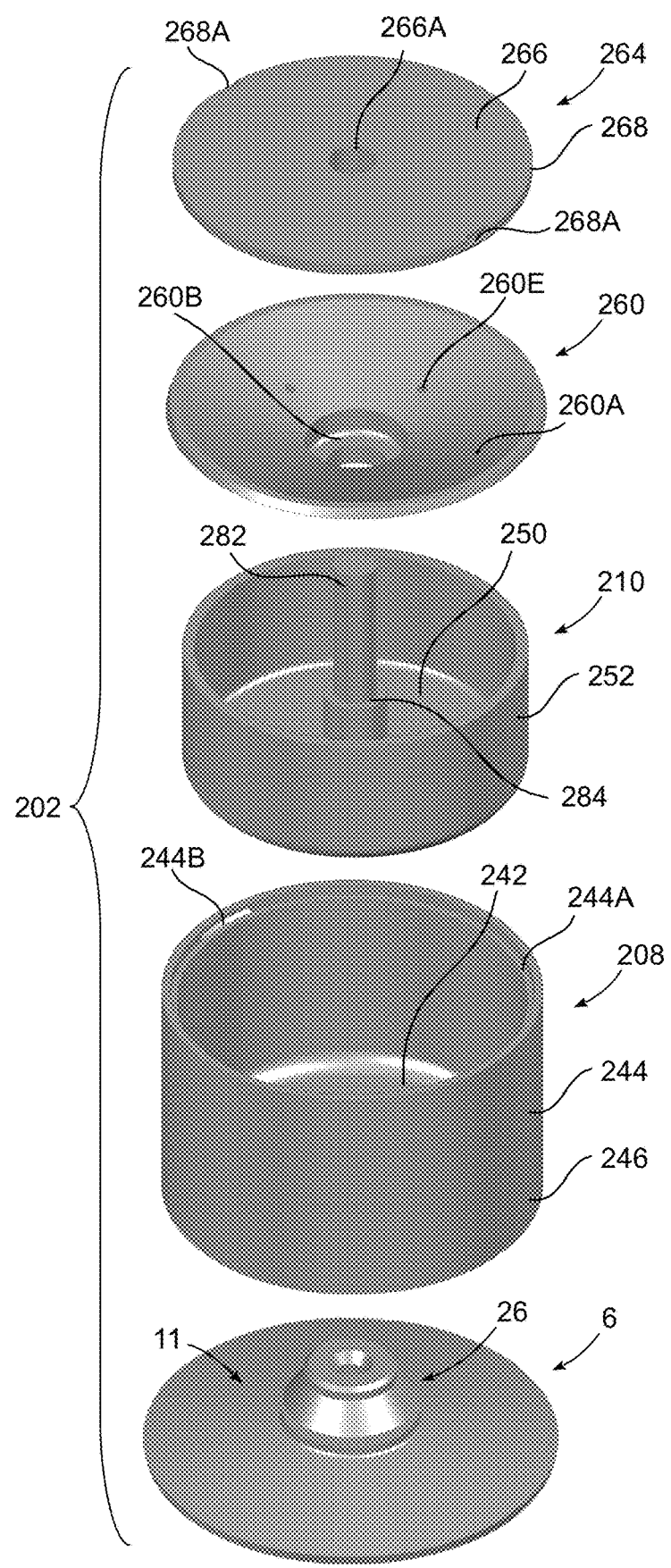
FIG. 31 is fully exploded upper perspective view showing the anchoring apparatus of FIG. 29.

As can be seen in FIGS. 29-31, the anchoring apparatus 102 may include the previously-described anchor member 6 of FIGS. 4-8 (or alternatively the anchor member 6A of FIG. 3A), a first auxiliary component 208 that is rigidly self-mounted to the anchor member stem 26, and a second auxiliary component 210 that is vertically movable relative to the first auxiliary component. As additionally shown in FIGS. 32-33, the first auxiliary component 208 may include a circular disk-like main body 242, a tube-like secondary body 244 extending upwardly from the periphery of the main body, and a tube-like tertiary body 246 extending downwardly from the periphery of the main body in radial alignment with the secondary body. The second auxiliary component 210 may include a circular disk-like main body 250 and a tube-like secondary body 252 extending upwardly from periphery of the main body. The outside surface of the second auxiliary component's secondary body 252 may be in opposing closely spaced relationship with the inside surface of the first auxiliary component's secondary body 144 to help guide the second auxiliary component's vertical motion.

A cap member 264 may be supported on the first auxiliary component's secondary body 244. The cap member 264 is fixedly connected to the first auxiliary component 208 and thus may be considered to be a part of that component. A single discrete flexible member 260 is provided that is independent of both the first auxiliary component 208 and the second auxiliary component 210. The flexible member 260 resiliently deforms to generate resistance as the second auxiliary component 210 moves in a venting direction away from the vent port closure position toward the vent port open position. The flexible member 260 returns to its initial form (shape and position) when the second auxiliary component 210 returns to the vent port closure position. The flexible member 260 is connected between the first and second auxiliary components 208 and 210, with the first auxiliary component providing a vertically stable reference end thereof (via the cap member 264). The flexible member 260 is external to and independent of the anchor member 6, and is non-reliant on pressure within the controlled pressure zone 48 for generating the resistance.

The cap member 264 may be configured as a circular disk-like structure that covers the open upper end of the first auxiliary component 208, with other configurations also being possible. Like the first and second auxiliary components 208 and 210, the cap member 264 may be formed from any suitable rigid (or semi-rigid) material, such as plastic, silicone rubber, etc.

A main body 266 of the cap member 264 may be shaped as a circular disk-like structure having a central bore 266A and a circular peripheral edge 268. As shown in FIG. 31, the secondary body 244 of the first auxiliary component 208 may be formed with an annular shoulder 244A proximate to the secondary body's upper edge. The annular shoulder 244A may be formed as a step on the inside surface of the secondary body 244. The peripheral edge 268 of the cap member 164 is seated on the shoulder 244A. One or more prongs 268A (two are shown) may extend radially outwardly from the peripheral edge 268. The one or more prongs 268A engage one or more notches 244B (one of two is shown in FIG. 31) formed on the inside wall of the first auxiliary component's secondary body 244, slightly above the annular shoulder 244A. This arrangement effectively latches the cap member 264 in place on the first auxiliary component 208.

Figure 32:
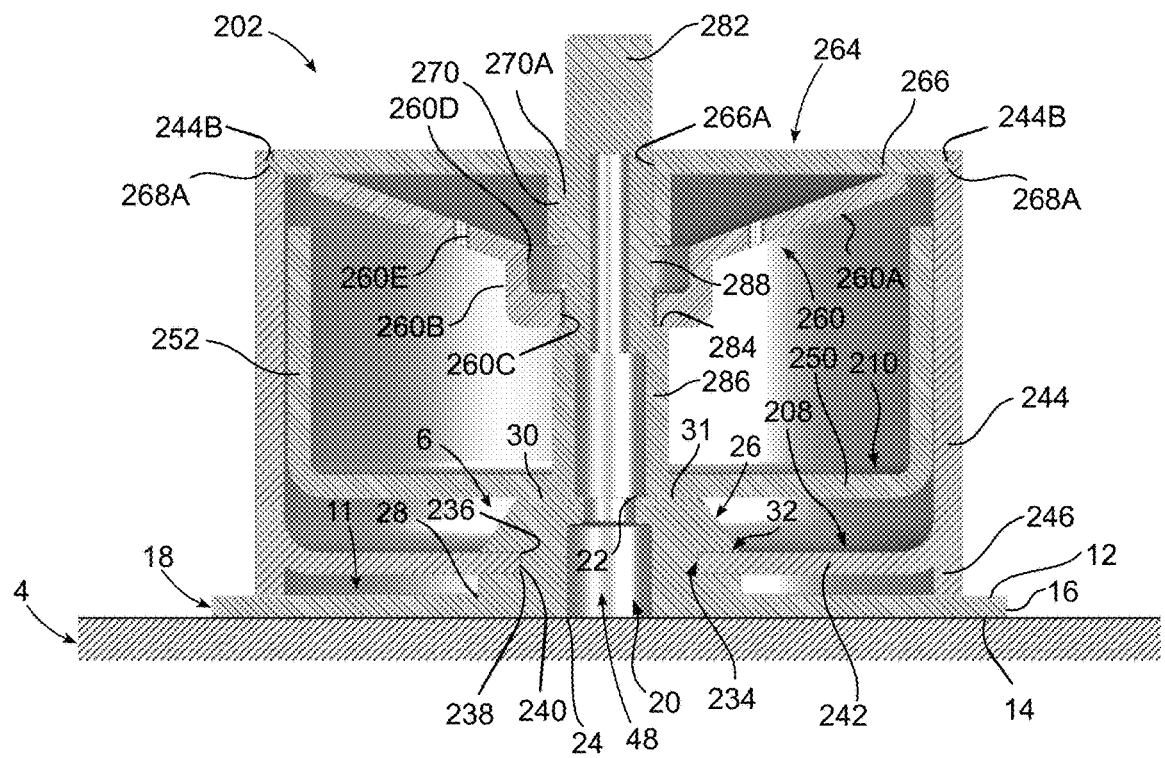
FIG. 32 is a cross-sectional centerline view showing the anchoring apparatus of FIG. 29 with a closed vent port.
Figure 33:
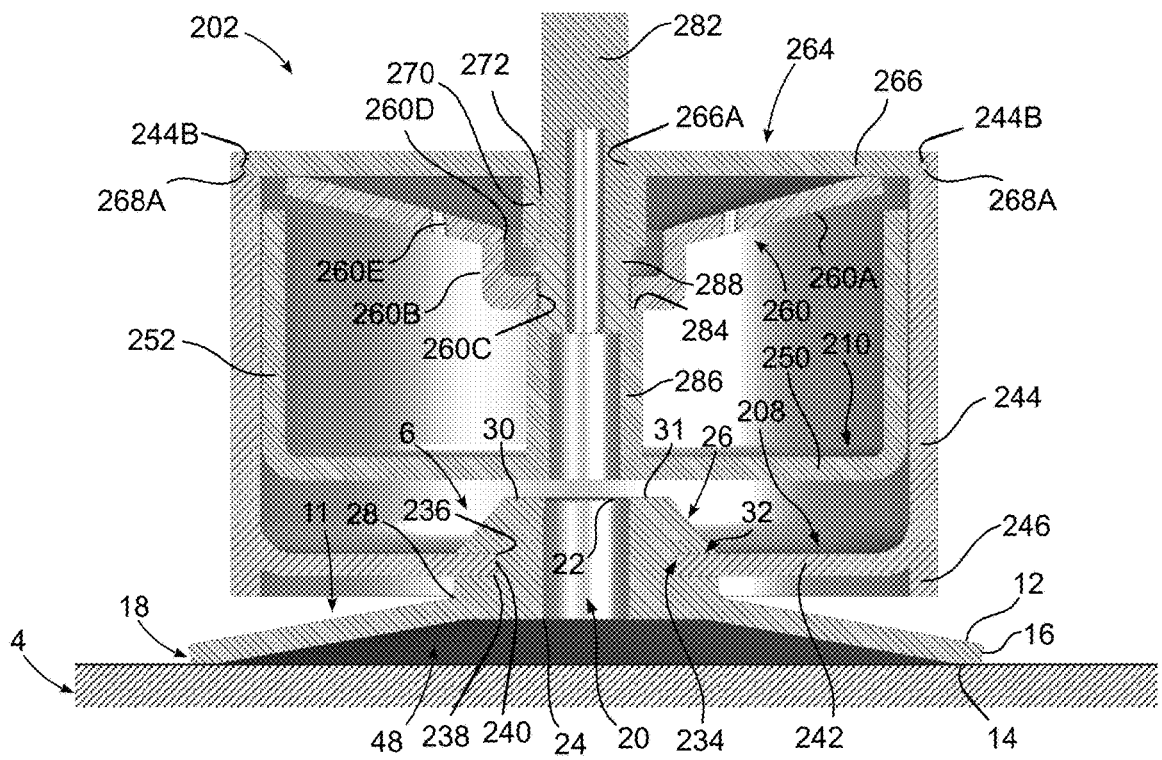
FIG. 33 is a cross-sectional centerline view showing the anchoring apparatus of FIG. 29 with an open vent port.
Figure 34:
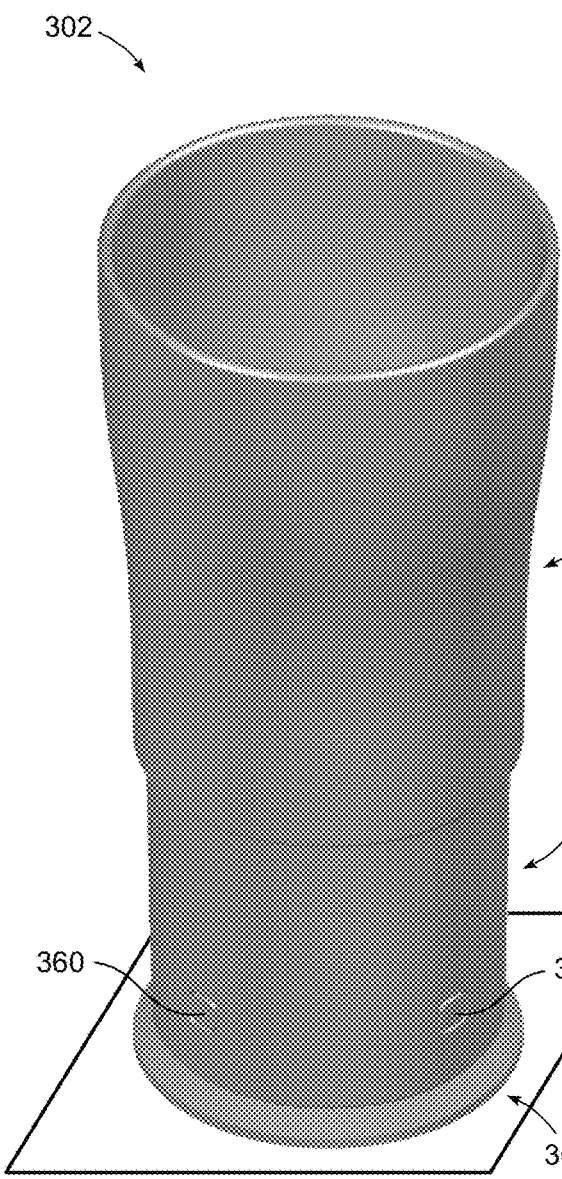
FIG. 34 is an upper perspective view showing an anchoring apparatus according to another example embodiment.
Figure 35:
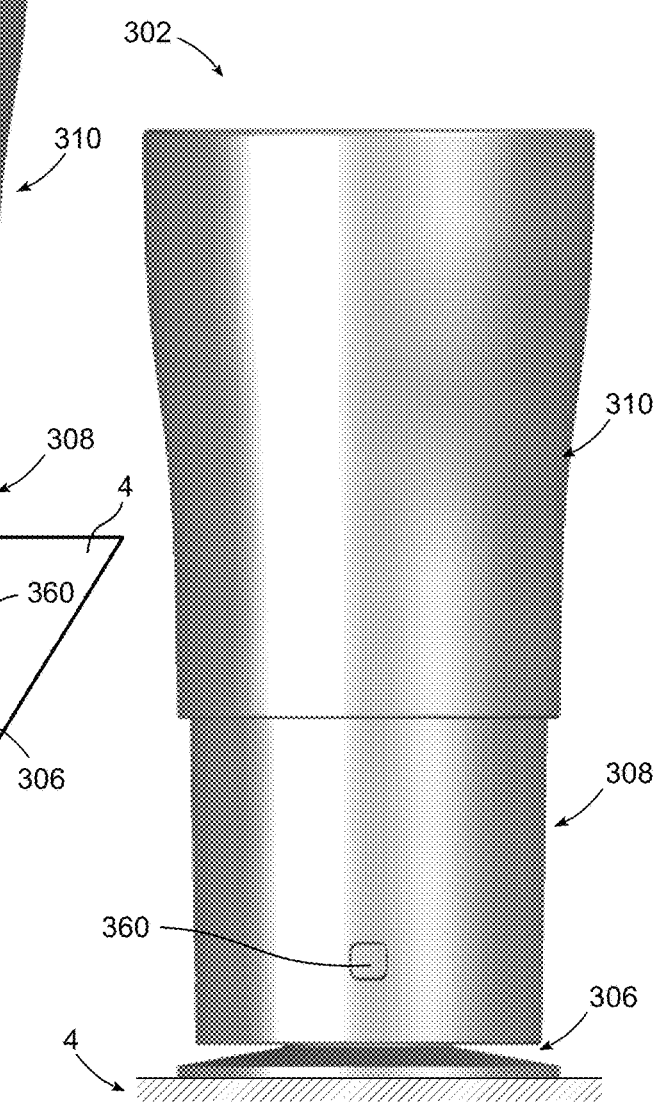
FIG. 35 is a side view showing the anchoring apparatus of FIG. 34.

As can be seen in FIGS. 32-33, a secondary body 270 of the cap member 264 extends downwardly from a central portion of the lower side of the main body 266 as a short tubular sleeve member. The secondary body 270 is formed with a central vertical bore 270A that aligns with the main body's central bore 266A and defines a lower extension thereof.

With continuing reference to FIGS. 31-33, the second auxiliary component 210, and particularly the center portion of the main body 250, may be formed with an integral mounting structure 282 that may be configured as a cylindrical post extending upwardly therefrom. Other mounting structure configurations may also be used. The mounting structure 282 may include a horizontal (e.g., annular) shoulder 284 formed by a transition in cross-sectional size between a larger diameter base portion 286 of the mounting structure and a smaller diameter upper portion 288. The upper portion 288 of the mounting structure 282 extends through the bores 266A and 272 of the cap member 264 to define an upper exposed portion of the mounting structure 282. The exposed portion of the mounting structure 282 may be used to mount one or more items or materials (not shown) to be carried by the anchoring apparatus 202, or one or more attachments (not shown) that carry one or more items or materials. It will be appreciated that the main body 266 of the cap member 264 may also be configured as a carrier for carrying one or more items or materials. Although the interior of the mounting structure 282 is shown as being hollow along a portion of its length, a solid mounting structure design could also be used.

The illustrated configuration in which the second auxiliary component's mounting structure 282 extends through the bores 266A and 270A of the cap member 264 helps guide the second auxiliary component's vertical motion. Also guiding the movement of the second auxiliary component 210 is its secondary body 252, which extends upwardly from the periphery of the main body 250 in close proximity to the first auxiliary component's secondary body 244. In particular, the outside surface of the second auxiliary component's secondary body 252 may be in opposing closely spaced relationship with the inside surface of the first auxiliary component's secondary body 244.

The flexible member 260 may be constructed using the same type of resilient material as the anchor member 6 (e.g., silicone rubber). The flexible member 260 is disposed between the first auxiliary component's cap member 264 and the annular shoulder 284 on the mounting structure 282. The flexible member 260 operates to bias the second auxiliary component 210 to its vent port closure position. As can be seen in FIGS. 31-33, the flexible member 260 may include a relatively flexible conical base 260A and a somewhat less flexible central stem 260B extending downwardly from the base. As best shown in FIGS. 32-33, the flexible member base 260A engages the lower side of the cap member's main body 266. The lower end of the flexible member stem 260B rests on the annular shoulder 284 of the mounting structure 282, in interfacial engagement therewith. The flexible member stem 260B may be formed with a stepped central vertical bore that includes a smaller diameter bore section 260C and a larger diameter bore section 260D. The smaller diameter bore section 260C is sized to slidably receive the upper portion 288 of the mounting structure 282 as it passes upwardly through the flexible member stem 260B. This arrangement effectively mounts the flexible member 260 to the second auxiliary component 210 in a slidably connected manner. The larger diameter bore section 260D is sized to accommodate the tubular secondary body 270 of the cap member 264 during deformation of the flexible member 260. As described in more detail below, such deformation includes the flexible member stem 260B moving upwardly from it initial position in FIG. 32 to the raised position of FIG. 33 wherein its larger diameter bore section 260D surrounds a lower portion of the secondary body 270 in vertically overlapping relationship therewith.

The cap member 264 is vertically fixed by virtue of its connection to the first auxiliary component 208 (thereby forming part of the first auxiliary component), which is itself connected in a vertically fixed manner to the anchor member 6. When the second auxiliary component 210 is in the vent port closure position of FIG. 32, the flexible member stem 260B will engage the annular shoulder 284 of the mounting structure 282 (as previously mentioned). Because the flexible member base 260A engages the main body 266 of the vertically fixed cap member 264, any upward movement of the second auxiliary component 210 will be resisted by the flexible member base 260A as it deforms from its initial conical state (shown in FIG. 32) to a more flattened configuration (shown in FIG. 33). The upward movement of the second auxiliary component 210 may also tend to flatten the flexible member stem 260B, which can be made vertically compressible (e.g., in the vicinity of its larger diameter bore section 260D) by utilizing a relatively thin sidewall and/or lower end wall). The second auxiliary component 210 can only be lifted from its vent port closure position by applying sufficient lifting force to produce the above-described deformation of the flexible member base 260A (and possibly also the aforementioned deformation of the flexible member stem 260B).

The flexible member 260 may be designed so that the resistance generated by deforming the flexible member base 260A (and possibly also the flexible member stem 260B) resists accelerations of the second auxiliary component 210 away from its vent port closure position so as to prevent unwanted venting of the controlled pressure zone 48 due to forces of a first magnitude acting on the anchoring apparatus 202 in the venting direction. Such forces could arise from the anchoring apparatus 202 experiencing vertical loading, lateral loading, or a combination of such loadings. On the other hand, the design of the flexible member 260 may be such that the resistance generated by deforming the flexible member base 260A (and possibly also the flexible member stem 260B) is insufficient to prevent movement of the second auxiliary component 210 away from the vent port closure position during normal use of the anchoring apparatus 202 in which a controlled force of a second magnitude in excess of the first magnitude is applied to the anchoring apparatus, so as to thereby facilitate intentional venting of the controlled pressure zone 48 and removal of the anchoring apparatus from the reference surface 4 by a user.

Optionally, the flexible member base 260A may be formed with one or more vent holes 260E that allow air to pass between the upper and lower sides thereof in order to equalize air pressure as the second auxiliary component 210 moves upwardly and downwardly during use of the anchoring apparatus 202. This will ensure that vertical movement of the second auxiliary component 210 is not impeded by any air pressure imbalance between the upper and lower sides of the flexible member base 260A.

As best shown in FIG. 32, the flexible member 260 may be sized so that, when the which the second auxiliary component 210 is in the vent port closure position, the vertical distance between the uppermost portion of the flexible member base 260A and the lower end of the flexible member stem 260B corresponds to the spacing between the lower side of the cap member's main body 266 and the annular shoulder 284 on the mounting stem 282. To limit the vertical size required for the flexible member 260, the annular shoulder 284 may be disposed proximate to a vertical midpoint of the mounting structure 282, with other locations also being possible. However, because manufacturing tolerances may render it difficult to achieve a perfect no-gap spacing, the flexible member 260 may be sized so that there is a small amount of vertical interference between the cap member's main body 266 and the annular shoulder 284. This will ensure that the flexible member 260 is in an initial interference fit relationship with the cap member 264 and the second auxiliary component 210 when the latter is in its vent port closure position. In order for the flexible member 260 to fit within this vertically-restricted space, the flexible member base 260A (and possibly also the flexible member stem 260B) must deform. This will place the flexible member 260 in an initial state of deformation whereby it exerts a downward preload force on the second auxiliary member 210 in the vent port closure position.

Due to this initial preload force, the second auxiliary component 210 may be characterized as being acted upon by a form of artificial gravity. Any attempt to lift the second auxiliary component 210 upwardly from its vent port closure position will produce additional resistance caused by further deformation (flattening) of the flexible member base 260A (and possibly also the flexible member stem 260B). According to Hooke's law, the flexible member 260 forms a spring whose downward spring force increases in proportion to the distance traveled by the second auxiliary component 210 from its vent port closure position in the upward venting direction. This is in direct contrast to certain prior art anchoring apparatus (as described in the Background section above) wherein an upward spring force is applied to a movable cylinder that controls vent port opening. FIG. 33 graphically illustrates what the maximum flexible member base deformation might look like when the second auxiliary component 210 has reached its upper position in which the vent port 20 is fully open.

It will be appreciated that the flexible member 260 may (or may not) decrease or even eliminate the stealthiness of the anchoring apparatus 202 for embodiments in which the anchor member 6 is a properly designed suction seal stabilizer. The above-mentioned force of a second magnitude may (or may not) be large enough to be felt by the user as a noticeable stickiness when an attempt is made to lift the anchoring apparatus 202 during normal use. In any event, what is gained from the flexible member 260 is an ability of the anchoring apparatus 202 to resist spurious accelerations that could otherwise separate the anchoring apparatus from the reference surface 4, resulting in spillage of the item(s) or material(s) being carried thereby. The flexible member 260 also provides the ability to mount the anchoring apparatus 202 on a reference surface 4 that is non-horizontal, or becomes so periodically over time, such as in a moving vehicle (e.g., an aircraft, watercraft or landcraft). In some embodiments, the flexible member 260 may be designed so that the anchoring apparatus 202 can be mounted on a reference surface 4 that is vertical (or beyond vertical), even when the anchor member 206 is a suction seal stabilizer rather than a suction cup.

It will be seen that the anchoring apparatus 202 may be implemented as a four-component assembly whose components include the anchor member 6, the first auxiliary component 208 (including its cap member 264), the second auxiliary component 210, and the flexible member 260. When the anchoring apparatus 202 is resting on the support surface 4 in the manner shown in FIG. 32, a user can grasp the exposed upper end of mounting structure 282, or an additional structure mounted thereto (not shown), and lift the anchoring apparatus upwardly in a normal manner. Doing so will lift the second auxiliary component 210 off the stem landing zone 31 and thereby vent the controlled pressure zone 48. As a result, the anchoring apparatus 202 may then be lifted away from the reference surface 4 without any apparent resistance above and beyond the weight of the anchoring apparatus and any items or materials (not shown) being carried thereby, as well as the resistance generated by deforming the flexible member 260. If, on the other hand, the anchoring apparatus 202 is resting on the reference surface 4 in the manner shown in FIG. 32 and is impacted by a side load that would otherwise tip the anchoring apparatus and dislodge or spill the item(s) or material(s), the vent port 20 will remain closed so long as the stem landing zone 31 is directly or indirectly engaged by the main body 250 of the second auxiliary component 210, and the anchoring apparatus will not tip due to a negative pressure differential having developed in the controlled pressure zone 48.

As shown in FIGS. 32 and 33, the main body 250 of the second auxiliary component 210 is configured for efficient direct or indirect engagement with the stem landing zone 31 so as to promote superior sealing of the vent port 20. In the illustrated embodiment, the lower side of the main body 250 completely blankets the stem landing zone 31 by covering the entire surface area thereof, and may in fact be several times larger in areal extent. For example, if the main body 250 and the stem landing zone 31 are both circular, the diameter of the main body may be at least two or more times larger than the diameter of the stem landing zone 31. If the anchor member 6A is being used, the main body 250 will likewise blanket the vent port closure member 7 disposed on the stem upper end 30, causing it to then engage the stem landing zone 31 to block the vent port 20.

Turning now to FIGS. 34-41, an alternative anchoring apparatus 302 is shown that is similar to the anchoring apparatus 2 of FIGS. 1-17, and may be formed from the same materials, but has an alternative anchor member, alternative auxiliary components, and a different flexible member design. Correspondence between components of the embodiment of FIGS. 34-41 and like components of the embodiment of FIGS. 1-17 is indicated by using corresponding reference numbers incremented by 300.

As can be seen in FIGS. 34-37, the anchoring apparatus 102 may include an anchor member 306, a first auxiliary component 308, and a second auxiliary component 310 that is vertically movable relative to the first auxiliary component. As will be described below in connection with FIGS. 38-39, the anchor member 306 may be implemented as an alternative stemless anchor member 306 instead of the previously-described anchor member 6 of FIGS. 4-8. As additionally shown in FIGS. 40-41, the first auxiliary component 308 may include a circular disk-like main body 342 and a tube-like secondary body 344 extending upwardly from the periphery of the main body. The second auxiliary component 310 may include a circular disk-like main body 350 and a tube-like secondary body 352 extending upwardly from periphery of the main body. The lower outside surface of the second auxiliary component's secondary body 352 may be in opposing closely spaced relationship with the inside surface of the first auxiliary component's secondary body 344 to help guide the second auxiliary component's vertical motion.

As can be seen in FIGS. 36-37 and 40-41, the second auxiliary component 310 is slidably mounted on the first auxiliary component 308 and connected thereto by a set of flexible members 360 (four are shown). The flexible members 360 resiliently deform to generate resistance as the second auxiliary component 310 moves in a venting direction away from the vent port closure position toward the vent port open position. The flexible members 360 return to their initial form (shape and position) when the second auxiliary component 310 returns to the vent port closure position. The flexible members 360 are connected between the first and second auxiliary components 308 and 310, with the first auxiliary component providing a vertically stable reference end thereof. The flexible members 360 are external to and independent of the anchor member 306, and are non-reliant on pressure within the controlled pressure zone 48 for generating the resistance.

Figure 36:
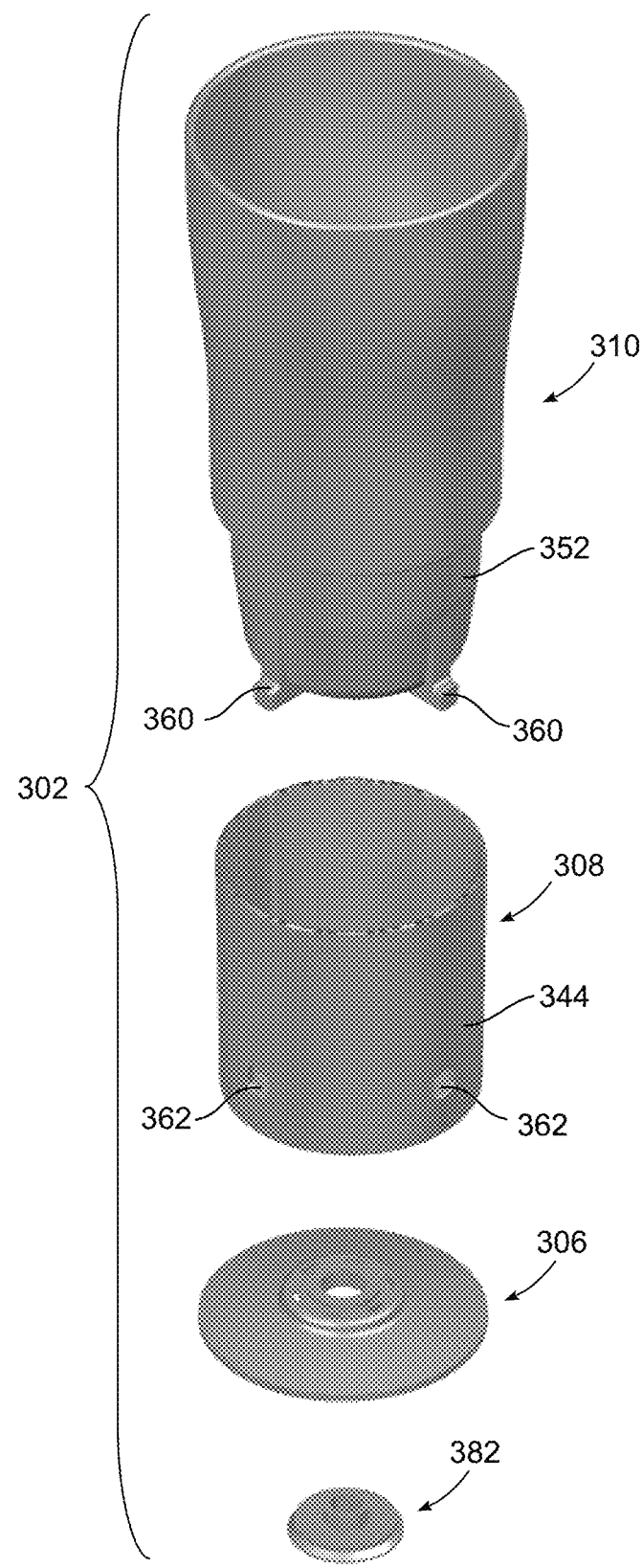
FIG. 36 is fully exploded upper perspective view showing the anchoring apparatus of FIG. 34.
Figure 37:
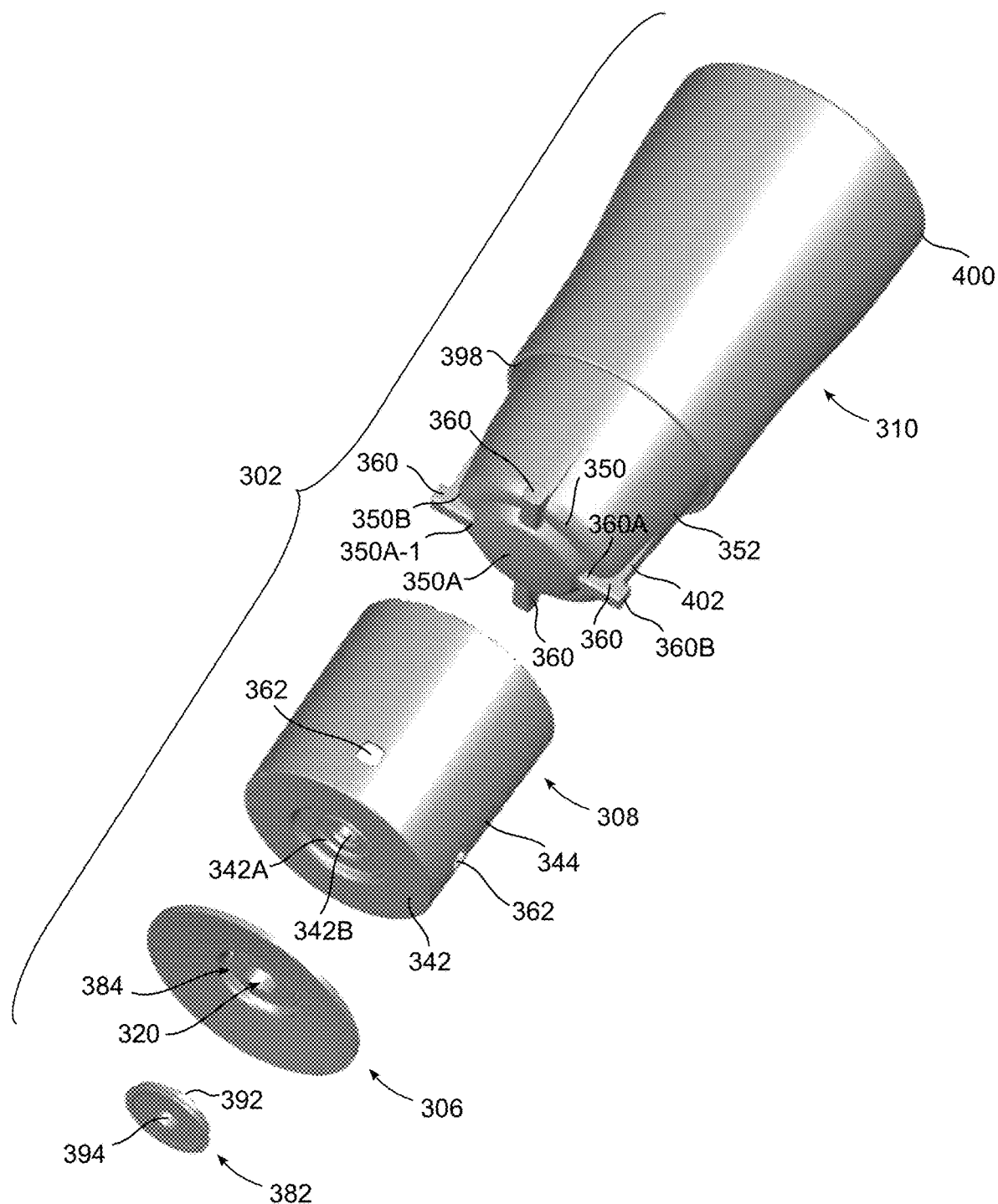
FIG. 37 is fully exploded lower perspective view showing the anchoring apparatus of FIG. 34.

As best shown in FIGS. 36-37, a first end of each flexible member 360 may be integrally formed on the second auxiliary component 310. A second end of each flexible member 360 may be captured in an adjacent flexible member retention opening 362 formed on the first auxiliary component 308. In other embodiments (not shown) the order of parts may be reversed, with the flexible members 360 being integrally formed on the first auxiliary component 308 and flexible member retention openings 362 being formed on the second auxiliary component 310.

Figure 38:
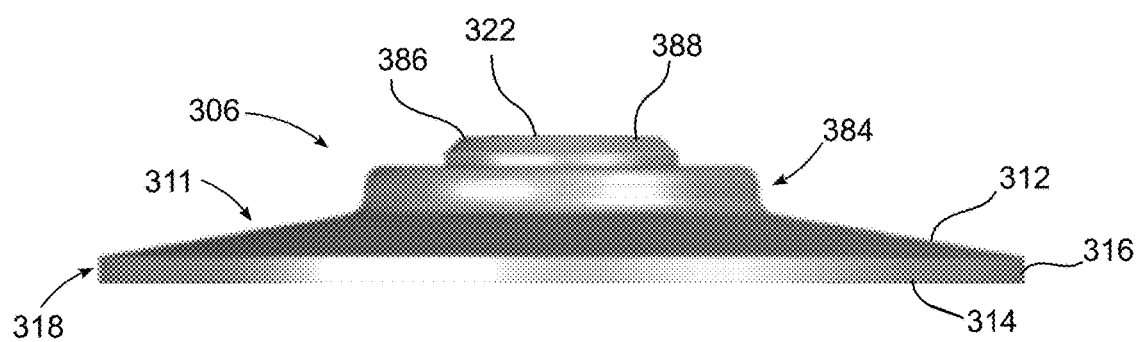
FIG. 38 is a side view of an anchor member that may be used in the anchoring apparatus of FIG. 34.
Figure 39:
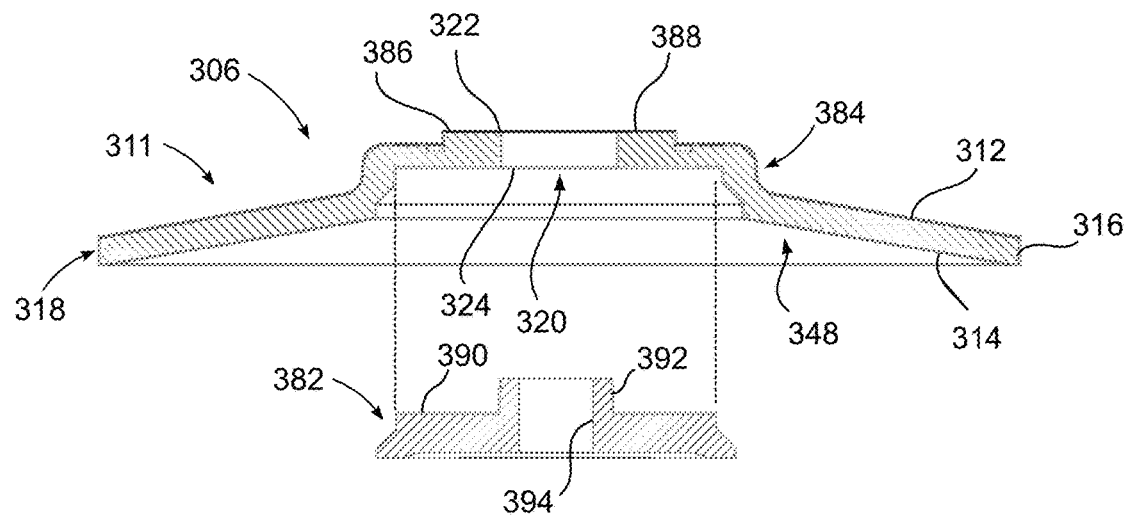
FIG. 39 is a cross-sectional side view showing the anchor member of FIG. 38, together with an anchor member retainer.

With additional reference now to FIGS. 38-39, the anchor member 306 eliminates the anchor member stem of previous embodiments. In lieu of having an anchor member stem, the base seal member 311 of the anchor member 306 may be formed with a central dome 384 formed coaxially with the vent port 320. The vent port upper end 322 is disposed at the top 386 of the central dome 384, which defines an annular upper surface 388. As described below, the annular upper surface 388 seals against the lower side of the main body 342 of the first auxiliary component 308 when the anchoring apparatus 302 is assembled. The central dome 384 may be shaped to resemble an inverted saucer or shallow bowl that is convex on the seal member upper side 312 and concave on the seal member lower side 314. The central dome 384 is sized and shaped to accommodate a discrete anchor member retainer 382 that may be used to attach the anchor member 306 to the first auxiliary component 308.

As shown in FIG. 39, the anchor member retainer 382 may include a circular button-like retainer body 390 that engages the lower surface of the anchor member's central dome 384. Optionally, the anchor member retainer 382 may include an upper retainer bushing 392 that engages the sidewall of the anchor member's vent port 320 and extends partially or completely through the vent port from the vent port lower end 324 toward (or to, or beyond) the vent port upper end 322. A central retainer bore 394 extends vertically through the retainer body 390 and the retainer bushing 392 (if present). When the anchor member retainer 382 engages the anchor member 306, the retainer bore 394 forms an inner sidewall of the anchor member vent port 320. This ensures there will be an unobstructed air pathway from the seal member upper side 312 or the upper end of the retainer bore 394 (whichever is higher) to the seal member lower side 314. The anchor member 306 may be constructed using the same type of resilient material as the anchor member 6 (e.g., silicone rubber). The anchor member retainer 382 may be formed from any suitable rigid (or semi-rigid) material, such as plastic, silicone rubber, etc.

Figure 40:
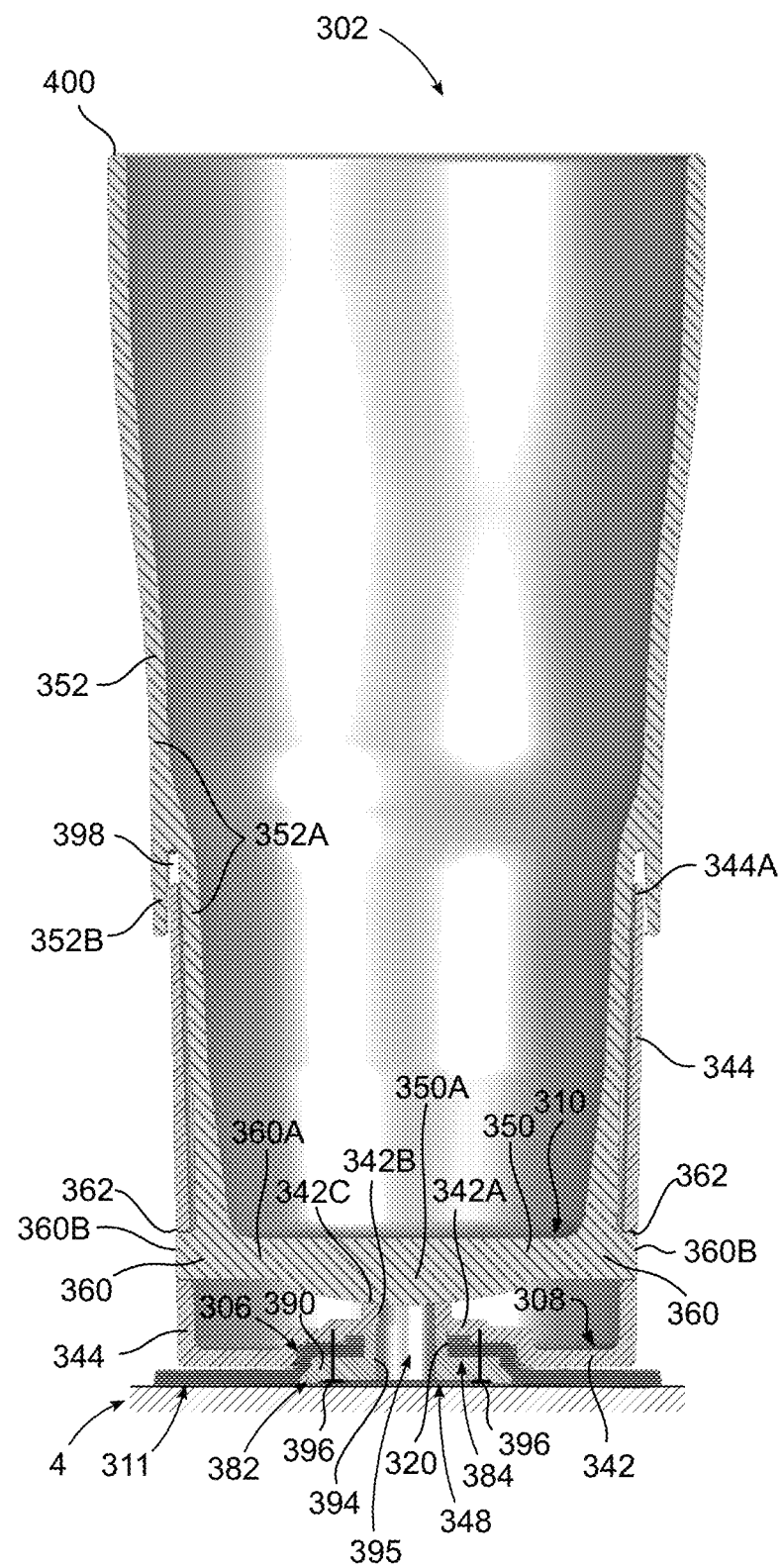
FIG. 40 is a cross-sectional centerline view showing the anchoring apparatus of FIG. 34 with a closed vent port.
Figure 41:
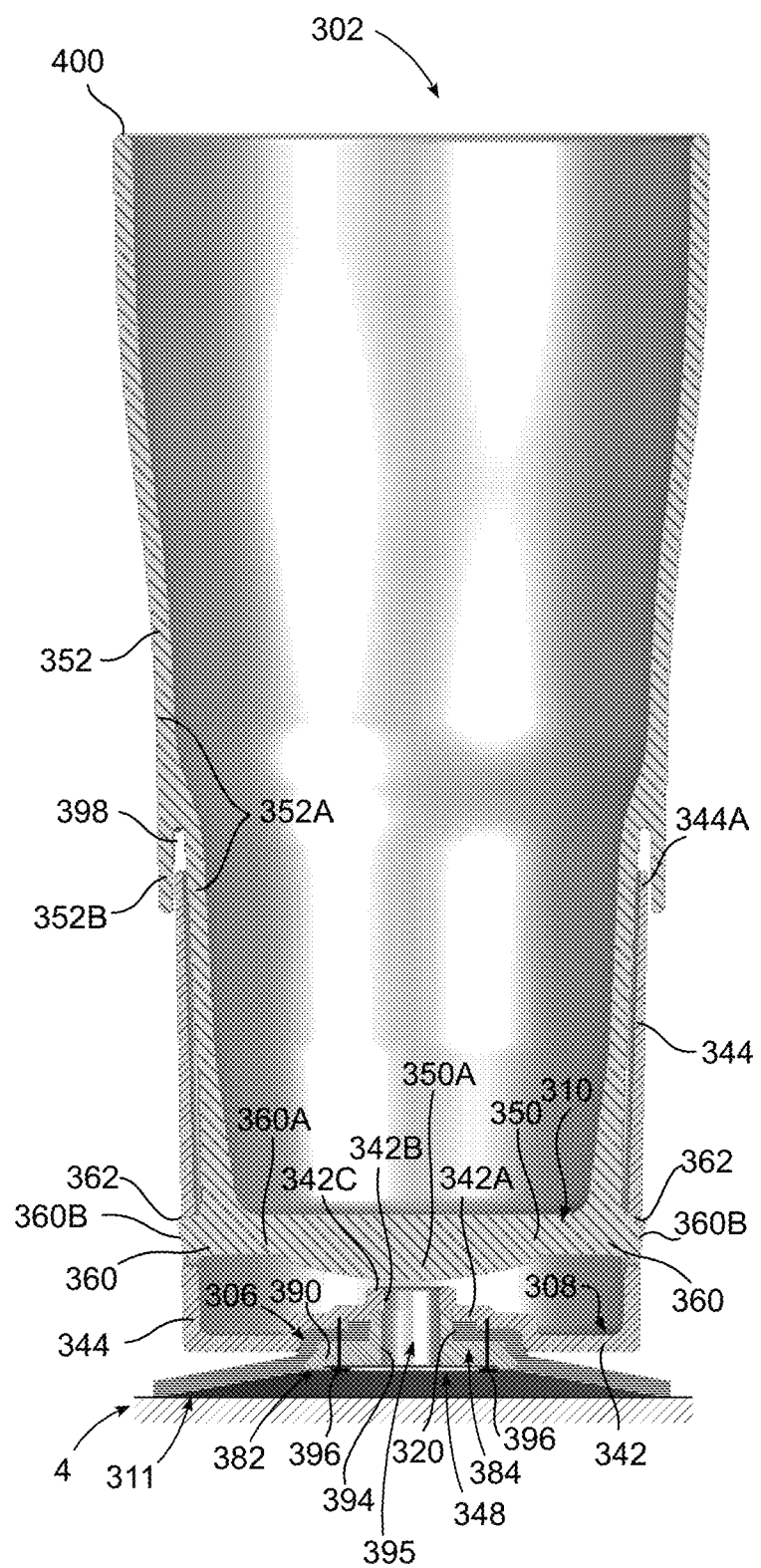
FIG. 41 is a cross-sectional centerline view showing the anchoring apparatus of FIG. 31 with an open vent port.

As best shown in FIGS. 40 and 41, the main body 342 of the first auxiliary component 308 may be formed with a raised central main body portion 342A having a convex upper side and a concave lower upper side that is configured to accommodate the convex upper side of the anchor member's central dome 384. As best shown in FIGS. 37 and 40-41, the central main body portion 342A may have a stepped conical configuration that resembles an inverted saucer or shallow bowl. The main body 342 of the first auxiliary component 308 further includes a central vertical bore 342B that aligns with the retainer bore 394 of the anchor member retainer 382, and provides an upward continuation thereof, thus ensuring there is an unobstructed air pathway from the upper side of the main body 342 to the seal member lower side 314. As shown in FIGS. 40-41, the unobstructed air pathway collectively formed by the vertical bore 342B and the retainer bore 394 (which lines the anchor member vent port 320) represents a global vent port 395 of the anchoring apparatus 302. As can be seen in FIGS. 40-41, an annular landing zone 342C of the main body 342 surrounds the upper end of the vertical bore 342B, and provides a valve seat upon which the main body 350 of the second auxiliary component 310 will rest in the latter's vent port closure position (see FIG. 40).

When the anchoring apparatus 302 is assembled, the upper side of the retainer body 390 engages the lower side of the anchor member's central dome 384. This sandwiches the upper side of the anchor member's central dome 384 against the lower side of the first auxiliary component's central main body portion 342A. One or more fasteners 396 (e.g., rivets, screws, etc.) may extend through the retainer body 390 and the anchor member's central dome 384, and anchor into the central main body portion 342A of the first auxiliary component 308 to secure the connection. Other forms of attachment may also be used, including but not limited to adhesive bonding.

In the first auxiliary component 308, the previously-described flexible member retention openings 362 may be formed in the secondary body 344 proximate to the main body 350 of the second auxiliary component 310 (e.g., in laterally opposing relationship). In the illustrated embodiment wherein there are four flexible members 360, there will be four flexible member retention openings 362. In other embodiments, the number of flexible members 360 and flexible member retention openings 362 could be greater or smaller.

As best shown in FIGS. 37 and 40-41, the second auxiliary component's main body 350 may have a downwardly-extending thickened region that defines a central main body boss 350A. The main body boss 350A is disposed to engage the annular landing zone 342C of the first auxiliary component's main body 342. As previously mentioned, the annular landing zone 342C surrounds the upper end of the first auxiliary component's vertical bore 342B provides a valve seat. As shown in FIG. 40, when the second auxiliary component 310 is in the vent port closure position, its central main body boss 350A will rest on annular landing zone 342C. This closes the upper end of the global vent port 395 to seal the anchor member's controlled pressure zone 348.

The second auxiliary component 310 may be formed from a material having less rigidity than the first auxiliary component 308. For example, if the first auxiliary component 308 is formed from plastic, the second auxiliary component 310 may be formed from a more flexible, less rigid grade of plastic, or from another more flexible, less rigid material, such as silicone rubber. Similarly, if the first auxiliary component 308 is formed from silicone rubber, the second auxiliary component 310 may be formed from a more flexible, less rigid grade of silicone rubber, or from another more flexible, less rigid material. The foregoing choice of materials facilitates efficient mutual engagement so as to promote superior sealing between the second auxiliary component's central main body boss 350A (which is relatively soft and deformable) and the first auxiliary component's annular landing zone 342C (which is relatively rigid and non-deformable). It should be understood that alternate embodiments could be constructed in which the respective rigidities are reversed, such that the central main body boss 350A is relatively rigid and non-deformable and the annular landing zone 343C is relatively soft and deformable.

It will also be seen in FIGS. 40 and 41 that the central main body boss 350A completely blankets the annular landing zone 342C by covering the entire surface area thereof. The central main body boss 350A may in fact be several times larger than the annular landing zone 342C in areal extent. For example, the diameter of the central main body boss 350A may be at least two or more times larger than the diameter of the annular landing zone 342C. In this way, there is little possibility that the central main body boss 350A will not affirmatively engage the annular landing zone 342C and form an airtight planar sealable interface that closes the global vent port 395. This holds true even if a misalignment develops between the first auxiliary component 308 and the second auxiliary component 310, such as might occur if the latter component rocks laterally.

With continuing reference to FIGS. 40-41, the lower end of the secondary body 352 of the second auxiliary component 310 may be slidably nested within the secondary body 344 of the first auxiliary component 308. The second auxiliary component's secondary body 352 may also be formed with an inter-component registration slot 398 that begins above the upper edge 344A of the first auxiliary component's secondary body 344 and opens downwardly therefrom. As can be seen in FIG. 37, the inter-component registration slot 398 may be annular in shape. As can be seen in FIGS. 40-41, the inter-component registration slot 398 is defined on a laterally inboard side thereof by a main portion 352A of the secondary body 352 that extends upwardly from the peripheral edge of the second auxiliary component's main body 350 to an upper edge 400 thereof that may be circular in shape. The inter-component registration slot 398 is defined on a laterally outboard side thereof by a short annular ring section 352B of the secondary body 352 that splits off from the main portion 352A above the upper edge 344A of the first auxiliary component's secondary body 344. The split-off point of the ring section 352B forms a base of the inter-component registration slot 398. It is spaced above the upper edge 344A of the secondary body 344 by a distance that is sufficient to accommodate movement of the second auxiliary component 310 between the vent port closure position to the vent port open position. It will be appreciated that the inter-component registration slot 398 provides a slidable connection between the first and second auxiliary components 308 and 310. The width of the slot may be chosen to be slightly larger than the thickness of the second auxiliary component's secondary body 344 proximate to its upper edge 344A. This will help limit lateral rocking of the second auxiliary component 310 relative to the first auxiliary component 308 during use of the anchoring apparatus 302.

As previously noted, the secondary body 352 of the second auxiliary component 310 extends upwardly from the peripheral edge of the main body 350 to the upper edge 400. The second auxiliary component 310 may serve as a closed-bottom, open-top beverage container whose hollow interior carries an item or material that may be a solid or a liquid. For example, the anchoring apparatus 302 may serve as a travel mug, with the secondary body 352 of the second auxiliary component 310 providing a grasping portion. In that case, the area of the second auxiliary component 310 proximate to the upper edge 400 may have threads (not shown) for removably attaching a lid (not shown). As also shown, the outer surface of the secondary body 352 may be ergonomically tapered for user convenience, such as by creating a bulge near the upper edge 400.

With continuing reference to FIGS. 40 and 41, the flexible members 360 may be integral with the second auxiliary component 310, and thus formed from the same relatively non-rigid flexible material. As previously mentioned, this material could be relatively soft plastic or silicon rubber so as to be capable of resiliently deforming in response to upward accelerations of the second auxiliary component 310, following which the material will return to its initial form (shape and position). The material used to form the flexible members 360 will typically be firmer and less flexible than the resilient material used for the anchor member 306, but this need not always be the case.

As can be seen in FIGS. 37 and 40-41, the flexible members 360 are disposed between the second auxiliary component's main body 342 and the first auxiliary component's secondary body 344. In particular, the flexible members 360 extend laterally outwardly from the second auxiliary component's main body 350. The flexible members 360 are configured as short cantilevered beams having a fixed end 360A and a free end 360B.

As best shown in FIG. 37, the fixed end 360A of each flexible member 360 is attached to the lower side of the second auxiliary component's main body 350. In particular, the fixed end 360A begins at a peripheral edge 350A-1 of the central main body boss 350A, then runs along the bottom side of the main body 350 to a peripheral edge 350B thereof. To increase the bending stiffness at the fixed end 360A, a gusset 402 may be provided that interconnects between the outer side of the secondary body 352 and the top of the flexible member 360 as it emerges from the secondary body.

The free end 360B of each flexible member 360 is disposed radially outwardly from peripheral edge 350B, where the outboard end portion of the flexible member inserts into one of the flexible member retention openings 362 on the secondary body 352 of the second auxiliary component 310. As shown in FIGS. 40-41, the flexible members 360 may extend completely through the flexible member retention openings 362 to ensure there is secure connection between the first and second auxiliary components 308 and 310 that will not separate when the flexible members are flexed.

The flexible members 360 operate to bias the second auxiliary component 310 to its vent port closure position (see FIG. 40). When the second auxiliary component 310 is in the vent port closure position of FIG. 40, any upward movement of the second auxiliary component will be resisted by the flexible members 360 as they undergo flexural beam deformation from their initial state to a flexed bending configuration. The second auxiliary component 310 can only be lifted from its vent port closure position by applying sufficient lifting force to produce the above-described deformation of the flexible members 360.

The flexible members 360 may be designed so that the resistance generated by deforming the flexible members in the beam bending mode resists accelerations of the second auxiliary component 310 away from its vent port closure position so as to prevent unwanted venting of the controlled pressure zone 348 due to forces of a first magnitude acting on the anchoring apparatus 302 in the venting direction. Such forces could arise from the anchoring apparatus 302 experiencing vertical loading, lateral loading, or a combination of such loadings. On the other hand, the design of the flexible members 360 may be such that the resistance generated by deforming the flexible members in the beam bending mode is insufficient to prevent movement of the second auxiliary component 310 away from the vent port closure position during normal use of the anchoring apparatus 302 in which a controlled force of a second magnitude in excess of the first magnitude is applied to the anchoring apparatus, so as to thereby facilitate intentional venting of the controlled pressure zone 348 and removal of the anchoring apparatus from the reference surface 4 by a user.

As best shown in FIG. 41, the flexible members 360 may be sized so that their vertical height corresponds to the vertical height of the flexible member retention openings 362. However, because manufacturing tolerances may render it difficult to achieve a perfect no-gap spacing, the flexible members 360 may be sized so that there is a small amount of vertical interference with the flexible member retention openings 362. This will ensure that the flexible members 360 are in an initial interference fit relationship with the flexible member retention openings 362. Moreover, the flexible members 360 may be angled slightly upwardly from their base end 360A to their free end 360B. This will place the flexible members 360 in an initial state of deformation whereby they exert a downward preload force on the second auxiliary member 310 in the vent port closure position.

Due to this initial preload force, the second auxiliary component 310 may be characterized as being acted upon by a form of artificial gravity. Any attempt to lift the second auxiliary component 310 upwardly from its vent port closure position will produce additional resistance caused by further bending deformation the flexible members 360. According to Hooke's law, the flexible members 360 form springs whose downward spring force increases in proportion to the distance traveled by the second auxiliary component 310 from its vent port closure position in the upward venting direction. This is in direct contrast to certain prior art anchoring apparatus (as described in the Background section above) wherein an upward spring force is applied to a movable cylinder that controls vent port opening. FIG. 41 graphically illustrates what the maximum flexible member deformation might look like when the second auxiliary component 310 has reached its upper position in which the global vent port 395 is fully open.

It will be appreciated that the flexible members 360 may (or may not) decrease or even eliminate the stealthiness of the anchoring apparatus 302 for embodiments in which the anchor member 306 is a properly designed suction seal stabilizer. The above-mentioned force of a second magnitude may (or may not) be large enough to be felt by the user as a noticeable stickiness when an attempt is made to lift the anchoring apparatus 302 during normal use. In any event, what is gained from the flexible members 360 is an ability of the anchoring apparatus 302 to resist spurious accelerations that could otherwise separate the anchoring apparatus from the reference surface 4, resulting in spillage of the items or materials being carried thereby. The flexible members 360 also provide the ability to mount the anchoring apparatus 302 on a reference surface 4 that is non-horizontal, or becomes so periodically over time, such as in a moving vehicle (e.g., an aircraft, watercraft or landcraft). In some embodiments, the flexible members 360 may be designed so that the anchoring apparatus 302 can be mounted on a reference surface 4 that is vertical (or beyond vertical), even when the anchor member 306 is a suction seal stabilizer rather than a suction cup.

It will be seen that the anchoring apparatus 302 may be implemented as a four-component assembly whose components include the anchor member 306, the first auxiliary component 308, and the second auxiliary component 310 and the anchor member retainer 382. When the anchoring apparatus 302 is resting on the support surface 4 in the manner shown in FIG. 40, a user can grasp the second auxiliary component 310 and lift the anchoring apparatus upwardly in a normal manner. Doing so will lift the second auxiliary component 310 off the annular landing zone 342C and thereby vent the controlled pressure zone 348. As a result, the anchoring apparatus 302 may then be lifted away from the reference surface 4 without any apparent resistance above and beyond the weight of the anchoring apparatus and any item(s) or material(s) (not shown) being carried thereby, as well as the resistance generated by deforming the flexible members 360. If, on the other hand, the anchoring apparatus 302 is resting on the reference surface 4 in the manner shown in FIG. 40 and is impacted by a side load that would otherwise tip the anchoring apparatus and dislodge or spill the contents item(s) or material(s), the global vent port 395 will remain closed so long as the annular landing zone 342C is engaged by the central main body boss 350A of the second auxiliary component 310, and the anchoring apparatus will not tip due to a negative pressure differential having developed in the controlled pressure zone 348.

Turning now to FIGS. 42-47, an alternative anchoring apparatus 402 is shown that is similar to the anchoring apparatus 2 of FIGS. 1-17, and may be formed from the same materials, but has alternative auxiliary components and a different flexible member design. Correspondence between components of the embodiment of FIGS. 42-47 and like components of the embodiment of FIGS. 1-17 is indicated by using corresponding reference numbers incremented by 400.

As can be seen in FIGS. 42-45, the anchoring apparatus 402 may include the previously-described anchor member 6 of FIGS. 4-8 (or alternatively the anchor member 6A of FIG. 3A), a first auxiliary component 408 that is rigidly self-mounted to the anchor member stem 26, and a second auxiliary component 410 that is vertically movable relative to the first auxiliary component. As additionally shown in FIGS. 46-47, the first auxiliary component 408 may include a circular disk-like main body 442, a tube-like secondary body 444 extending upwardly from the periphery of the main body, and a tube-like tertiary body 446 extending downwardly from the periphery of the main body in radial alignment with the secondary body. The second auxiliary component 410 may include a circular disk-like main body 450 and a tube-like secondary body 452 extending downwardly from the main body at a location that is proximate to the main body periphery. The outside surface of the second auxiliary component's secondary body 452 may be in opposing closely spaced relationship with the inside surface of the first auxiliary component's secondary body 444 to help guide the second auxiliary component's vertical motion. Alternatively, the secondary body 452 of the second auxiliary component 410 could be on the outside of the secondary body 444 of the first auxiliary component 408.

Figure 46:
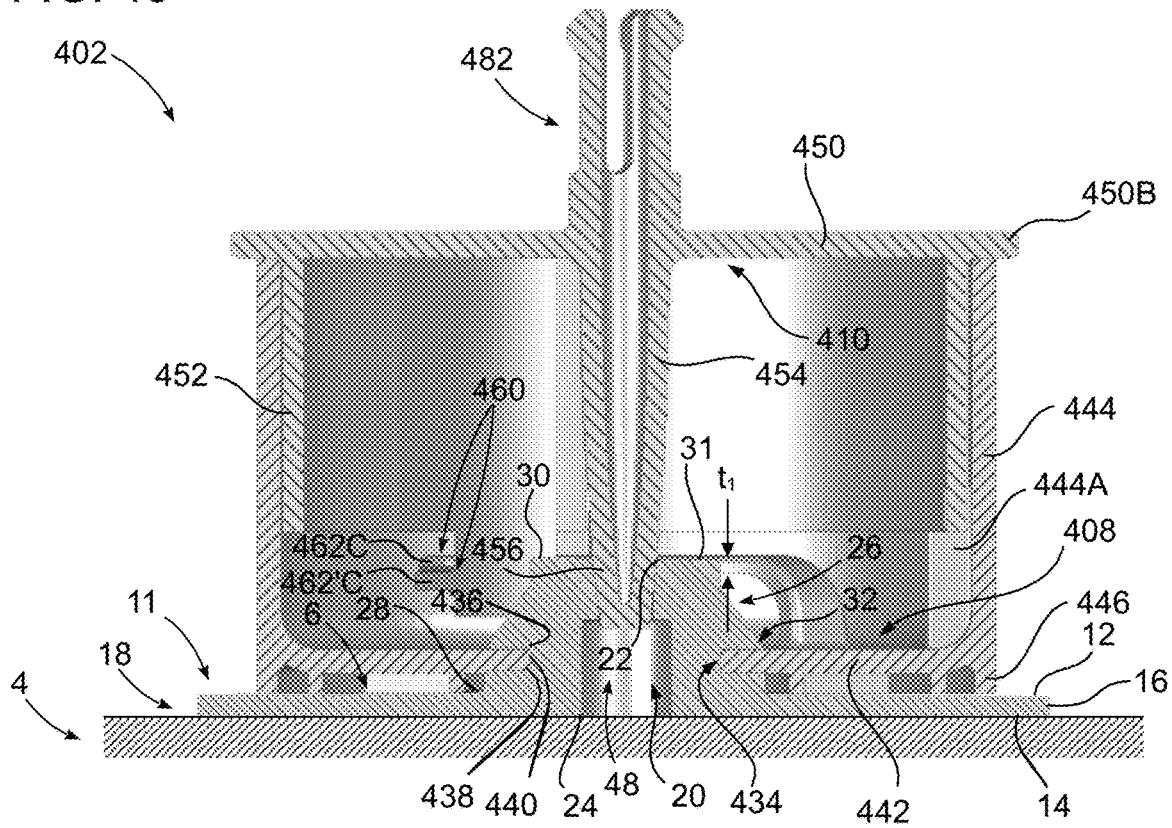
FIG. 46 is a cross-sectional centerline view showing the anchoring apparatus of FIG. 42 with a closed vent port.
Figure 47:
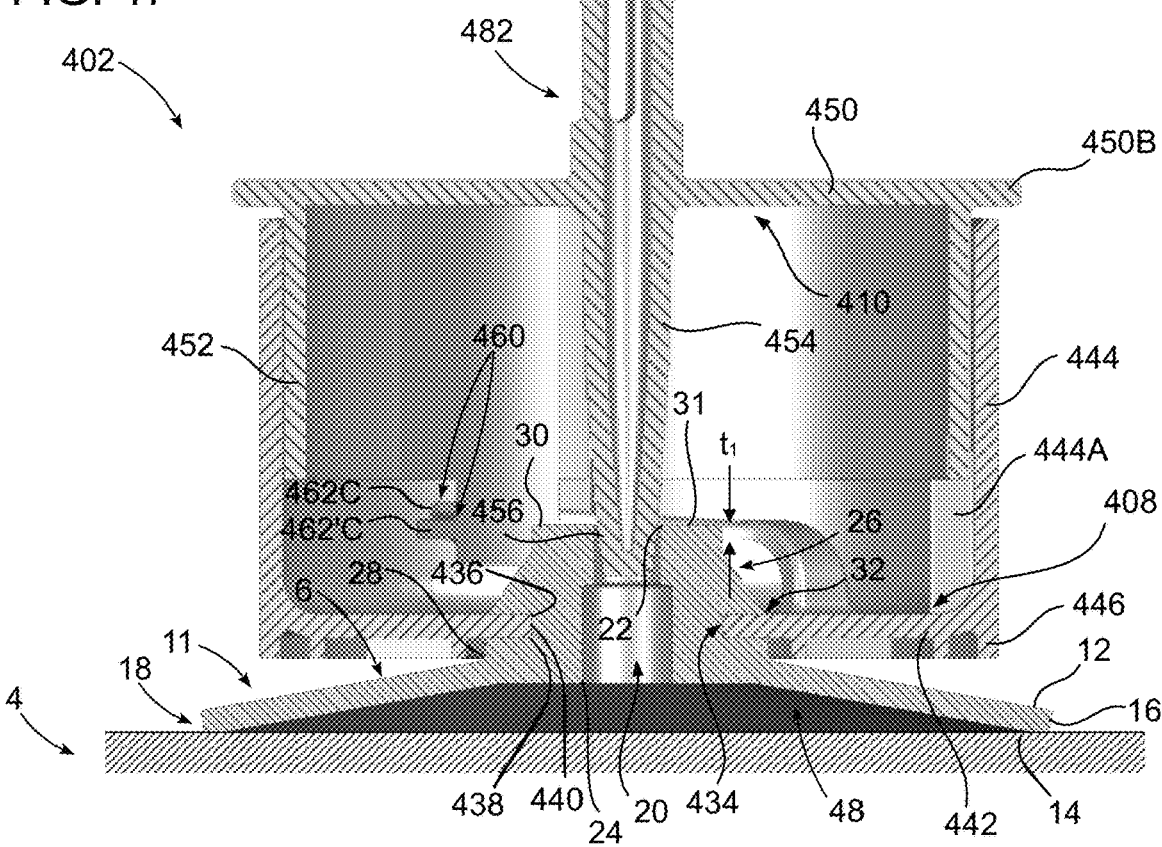
FIG. 47 is a cross-sectional centerline view showing the anchoring apparatus of FIG. 42 with an open vent port.

The underside of the second auxiliary component's main body 450 is formed with a non-planar stem engagement structure 454 in the form of a central elongated post protrusion that extends downwardly from the lower side of the main body. In the illustrated embodiment, the stem engagement structure 454 is cylindrical at its upper end and has a tapered tip 456 at its lower end. As best shown in FIGS. 46-47, the stem engagement structure 454 is sized and positioned to engage the vent port 20 of the anchor member 6, the upper end 22 of which is located at the upper end 30 of the anchor member stem 26. In this embodiment, the vent port 20 is shown as being stepped inwardly so that the upper end 22 of the vent port has a smaller diameter than the lower end 24. The diameter of the lower tip end 456 of the stem engagement structure 454 may be slightly smaller than the vent port's smaller diameter upper end 22 so the tip end will insert into the vent port 20 until the tapered sidewall of the stem engagement structure (above the tip end) engages the sides of the vent port 20 to form an airtight seal. Other stem engagement structure configurations (such as a non-tapered tip) could also be used. Although the interior of the stem engagement structure 454 is shown as being hollow along most of its length, a solid design could also be used.

In order to limit the downward travel of the second auxiliary component 410, the main body 450 of the second auxiliary component may include a peripheral lip 450B that extends radially beyond the second auxiliary component's secondary body 452, and also beyond the secondary body 444 of the first auxiliary component 408. As best shown in FIGS. 46-47, the peripheral lip 450B will contact the upper rim of the secondary body 444 when the second auxiliary component 408 reaches is lower vent port closure position. This contact between the peripheral lip 450B and the upper rim of the secondary body 444 prevents the stem engagement structure 454 from penetrating too far into the vent port 20, which could in some situations result in the second auxiliary component 410 becoming stuck in the vent port closure position.

Although not shown, the anchor member 6 of FIGS. 4-8 could be replaced by the anchor member 6A of FIG. 3A. In that case, the lower tip end 456 of the stem engagement structure 454 would engage the vent port closure member 7 to actuate the closure member into and out of sealing engagement with the vent port 20.

Figure 44:
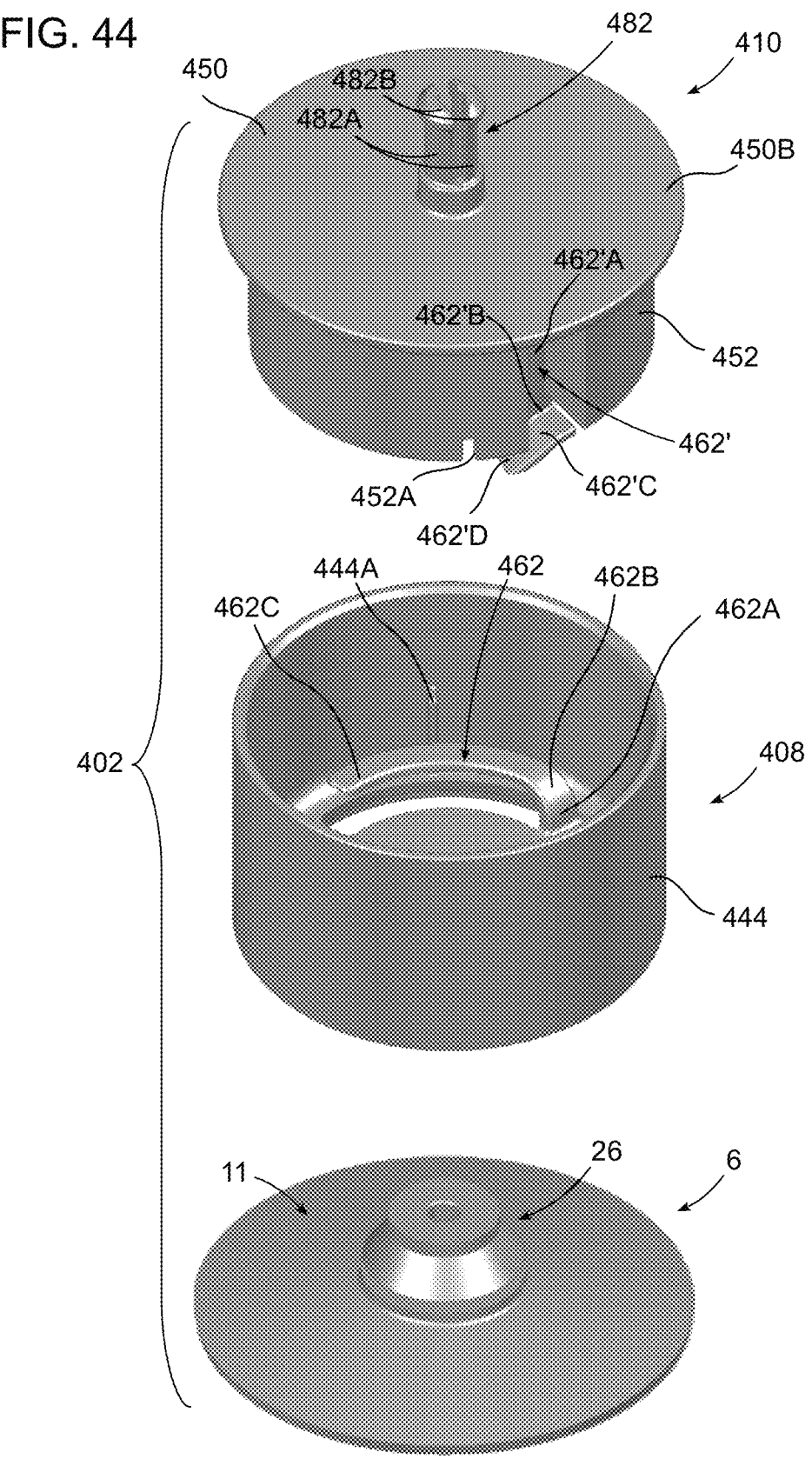
FIG. 44 is fully exploded upper perspective view showing the anchoring apparatus of FIG. 42.
Figure 45:
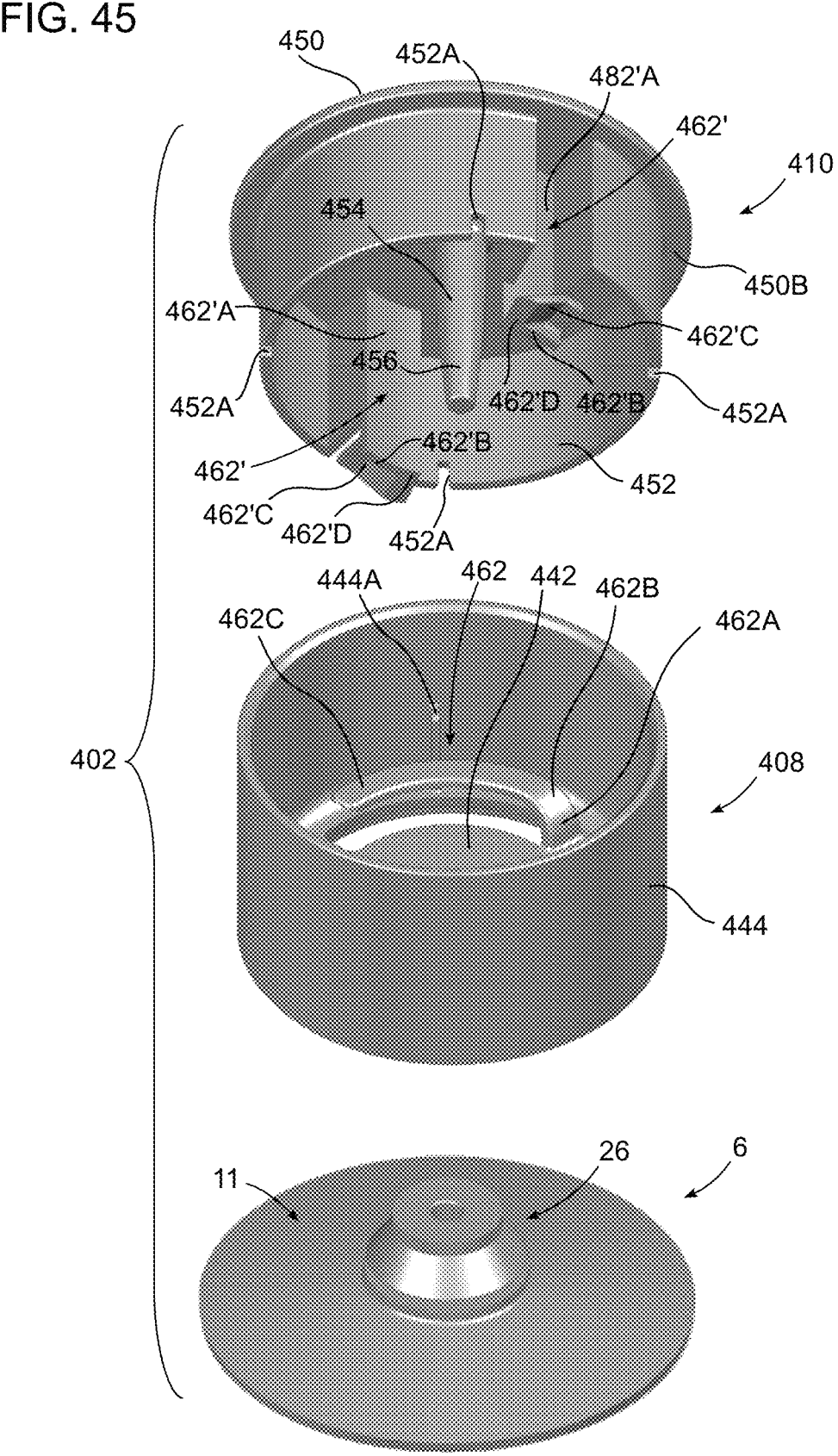
FIG. 45 is fully exploded combination upper and lower perspective view showing the anchoring apparatus of FIG. 42.

As shown in FIG. 44-45, a slot-and-tab arrangement may be provided to guide the upward and downward movement of the second auxiliary component 410 and to prevent axial rotation thereof relative to the first auxiliary component 408. In particular, the secondary body 444 of the first auxiliary component 408 may be formed with one or more vertical fins 444A (one of four is shown) on its inside surface, and the secondary body 452 of the second auxiliary component 410 may be formed with one or more opposing vertical slots 452A (four are shown) on its outside surface. In this way, the second auxiliary component 410 will be guided vertically relative to the first auxiliary component 408, and will not rotate axially. The fins 444A may also serve as stops that engage the upper end of the slots 452A when the second auxiliary member 410 reaches its vent port closure position. This fin-and-slot stop arrangement allows the peripheral rim 450B of the second auxiliary member's main body 450 to be dispensed with if so desired. It will be appreciated that the arrangement of parts could be reversed, with the secondary body 444 of the first auxiliary component 408 having fins and the secondary body 452 of the second auxiliary component 410 having slots.

With continuing reference to FIGS. 42-47, the anchoring apparatus 402 may be designed to maintain affirmative direct or indirect engagement between the stem engagement member 454 of the second auxiliary component 408 and the vent port 20 even in the presence of accelerations that are imparted to the anchoring apparatus while engaging the reference surface 4. To that end, one or more flexible members 460 (see FIGS. 46-47) may be provided that resiliently deform to generate resistance as the second auxiliary component 410 moves in a venting direction away from the vent port closure position toward the vent port open position, and with the flexible members returning to their initial form when the second auxiliary component returns to the vent port closure position. The one or more flexible members 460 may be connected between the first and second auxiliary components 408 and 410, with the first auxiliary component providing a vertically stable reference end thereof. The one or more flexible members 460 are external to and independent of the anchor member 6, and non-reliant on pressure within the controlled pressure zone 48 for generating the resistance.

In the illustrated embodiment of FIGS. 42-47, there are two flexible members 460, each of which is formed by two interlocking fingers 462 and 462' that are respectively integrally formed on the first auxiliary component 408 and the second auxiliary component 410. In this embodiment, each flexible member 460 may thus be thought of as a two-part structure provided by an interlocking finger pair. For each flexible member 460, a first finger 462 on the first auxiliary component 408 engages a corresponding second finger 462' on the second auxiliary component 410. Unlike the fingers 62 and 62' described above in connection with FIGS. 1-3 and 9-17, which may both be flexible structures, only one set of the fingers 462 and 462' is flexible. These are the fingers 462 on the first auxiliary component 408. As discussed in more detail below, the fingers 462' on the second auxiliary component 410 need not be flexible, and may in fact be relatively inflexible (as compared to the fingers 462) or even rigid.

The first auxiliary component's fingers 462 extend as freestanding structures from the upper side of the main body 442 of the first auxiliary component 8. They may be identical in construction to the fingers 62 previously described in connection with FIGS. 1-3 and 9-17. Thus, as shown in FIG. 45, the fingers 462 may each include a short longitudinally-oriented stub section 462A that emerges from the upper side of the first auxiliary component's main body 442 and extends for several millimeters (e.g., 2-10 mm, etc.) to a 90 degree transition 462B in the finger. After the 90 degree transition 462B, an elongated laterally-oriented finger section 462C extends to a free end of the finger 462. The elongated finger section 462C section of each finger 462 defines an arcuate shape, with the respective arc centerline of each finger being aligned on a common axis (not shown) that is concentric with the central anchor member mounting bore 434 (see FIGS. 46-47).

The second auxiliary component's fingers 462' are somewhat different from the fingers 62' of FIGS. 1-3 and 9-17 insofar as they extend from the lower side of the main body 450 of the second auxiliary component 410, but not as freestanding structures. Instead, due to the fact that the main body 450 of the second auxiliary component 410 is situated near the top of the anchoring apparatus 402, remote from the main body 442 of the first auxiliary component 408, each finger 462' has an extended stub section 462'A formed as part of the second auxiliary component's secondary body 452. In particular, as shown in FIGS. 44-45, the extended stub section 462'A may be defined by a vertical, radially-inwardly extending channel of the secondary body 452. The extended stub section 462'A extends for the vertical length of the secondary body 452, and may additionally project downwardly therefrom a short distance (e.g., 2-10 mm) before reaching a 90 degree transition 462'B in the finger 462'. After the 90 degree transition 462'B, a short laterally-oriented finger section 462'C extends radially outwardly a short distance (e.g., 2-10 mm) to a radially-outboard free end of the finger 462'. The elongated finger section 462'C section of each finger 62' defines a cantilevered stub beam that includes a downwardly-extending ramp section 462'D.

The ramp section 462'D facilitates assembly of the anchoring apparatus 402 by allowing the fingers 462 and 462' to be rotated into vertically and rotationally interlocking engagement, with the upper surface of the ramp section 462'D of each finger 462' on the second auxiliary component 410 sliding underneath the lower surface of the elongated finger section 462C of a corresponding one of the fingers 462 formed on the first auxiliary component 408.

As previously mentioned, the fingers 462' on the second auxiliary component 410 need not be as flexible as the fingers 462 on the first auxiliary component 408. This may be achieved by designing the elongated finger sections 462C of the fingers 462 to be relatively flexible, and by designing the short finger section 462'C and the ramp section 462'D of the fingers 462' to be relatively rigid. The elongated finger section 462C of the fingers 462 may be configured to flex by virtue having a relatively thin cross-sectional thickness dimension $t_1$ (e.g., 1-3 mm) (see FIGS. 46-47) that may vary depending on the material used to form the first auxiliary component 8. The short finger section 462'C and the ramp section 462'D of the fingers 462' may be configured to be inherently inflexible by keeping the these structures short and stub-like.

When the second auxiliary component 410 is in the vent port closure position of FIG. 46, the bottom of the elongated finger sections 462C of the first auxiliary component's fingers 462 may directly engage the top of the short finger sections 462'C of the second auxiliary component's fingers 462', so that there is no vertical gap between them. This ensures that any upward movement of the second auxiliary component 10 will be resisted by the fingers 462 and 462', and that the second auxiliary component can only be lifted from its vent port closure position by applying sufficient lifting force to cause deformation of the fingers 462. Because manufacturing tolerances may render it difficult to achieve a perfect no-gap spacing between the elongated finger sections 462C and 462'C with zero finger deflection, the fingers 462 and 462' may be configured so that there is a small amount of vertical interference between the elongated finger sections 462C and 462'C. The resultant deflection of the finger sections 462C and 462'C will provide an initial preload force that tends to pull the second auxiliary component 410 downwardly so that its stem engagement structure 454 is in direct or indirect engagement with the vent port 20 (see FIG. 46). Due to this initial preload force, the second auxiliary component 410 may be characterized as being acted upon by a form of artificial gravity. Any attempt to thereafter lift the second auxiliary component 410 upwardly from its vent port closure position will produce additional resistance caused by further deformation of the fingers 462. According to Hooke's law, the interlocking finger 462 that defines part of each flexible member 460 forms a spring, thereby rendering the flexible member itself a spring. One end of each spring-like flexible member 460 is anchored by the vertically fixed first auxiliary component 408 and the other end is movable with the second auxiliary component 410. A downward spring force is applied to the movable second auxiliary component 410 that increases in proportion to the distance traveled by the second auxiliary component from its vent port closure position in the upward venting direction. This is in direct contrast to certain prior art anchoring apparatus (as described in the Background section above) wherein in an upward spring force is applied to a movable cylinder that controls vent port opening. FIG. 47 graphically illustrates what the maximum finger deformation (of the fingers 462) might look like when the second auxiliary component 410 has reached its upper position in which the vent port 20 is fully open.

The one or more flexible members 460 may be designed so that the resistance generated by deforming the fingers 462 resists accelerations of the second auxiliary component 410 away from its vent port closure position so as to prevent unwanted venting of the controlled pressure zone 48 due to forces of a first magnitude acting on the anchoring apparatus 402 in the venting direction. Such forces could arise from the anchoring apparatus 402 experiencing vertical loading, lateral loading, or a combination of such loadings. On the other hand, the design of the one or more flexible members 460 may be such that the resistance generated by deforming the fingers 462 is insufficient to prevent movement of the second auxiliary component 410 away from the vent port closure position during normal use of the anchoring apparatus 402 in which a controlled force of a second magnitude in excess of the first magnitude is applied to the anchoring apparatus, so as to thereby facilitate intentional venting of the controlled pressure zone 48 and removal of the anchoring apparatus from the reference surface 4 by a user.

It will be appreciated that the one or more flexible members 460 may (or may not) decrease or even eliminate the stealthiness of the anchoring apparatus 402 for embodiments in which the anchor member 6 is a properly designed suction seal stabilizer. The above-mentioned force of a second magnitude may (or may not) be large enough to be felt by the user as a noticeable stickiness when an attempt is made to lift the anchoring apparatus 402 during normal use. In any event, what is gained from the one or more flexible members 460 is an ability of the anchoring apparatus 402 to resist spurious accelerations that could otherwise separate the anchoring apparatus from the reference surface 4, resulting in spillage of the items or materials being carried thereby. The one or more flexible members 460 also provide the ability to mount the anchoring apparatus 402 on a reference surface 4 that is non-horizontal, or becomes so periodically over time, such as in a moving vehicle (e.g., an aircraft, watercraft or landcraft). In some cases, the one or more flexible members 460 may be designed so that the anchoring apparatus 402 can be mounted on a reference surface 4 that is vertical (or beyond vertical), even when the anchor member 6 is a suction seal stabilizer rather than a suction cup.

Figure 42:
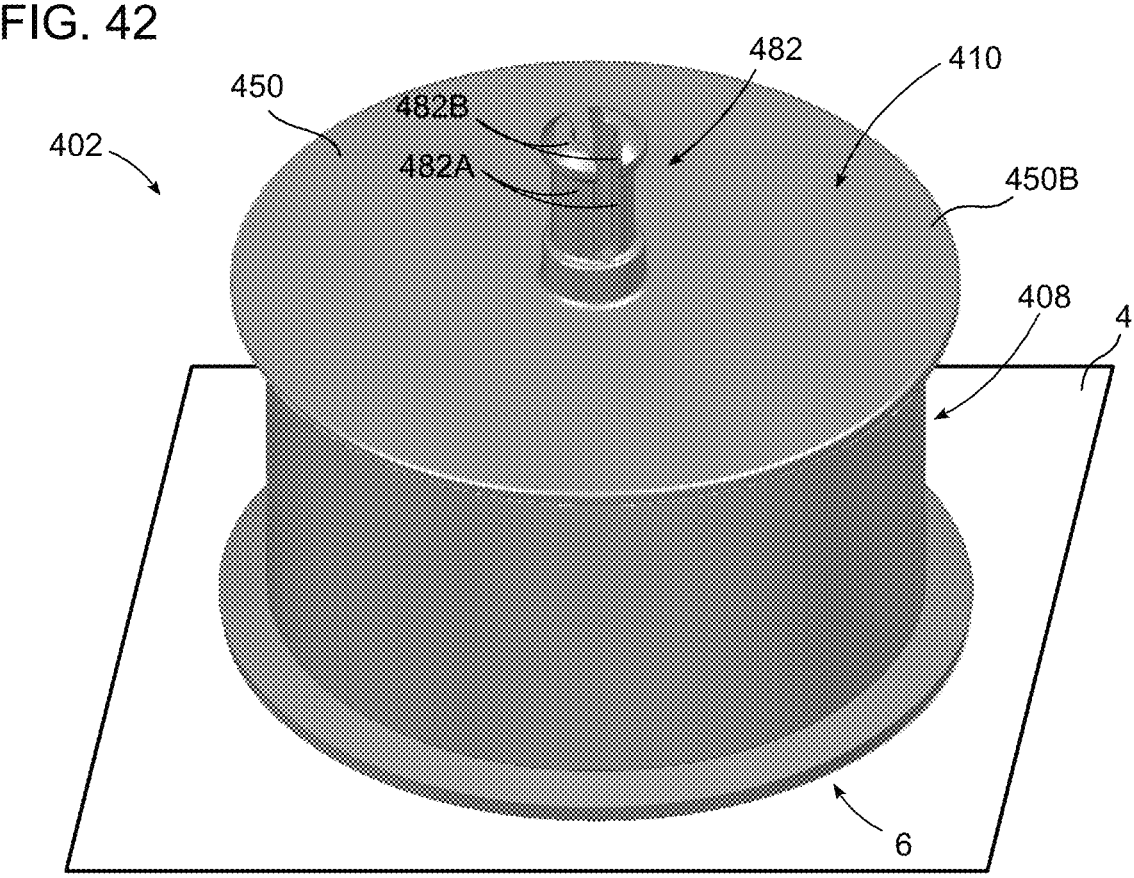
FIG. 42 is is an upper perspective view showing an anchoring apparatus according to another example embodiment.
Figure 43:
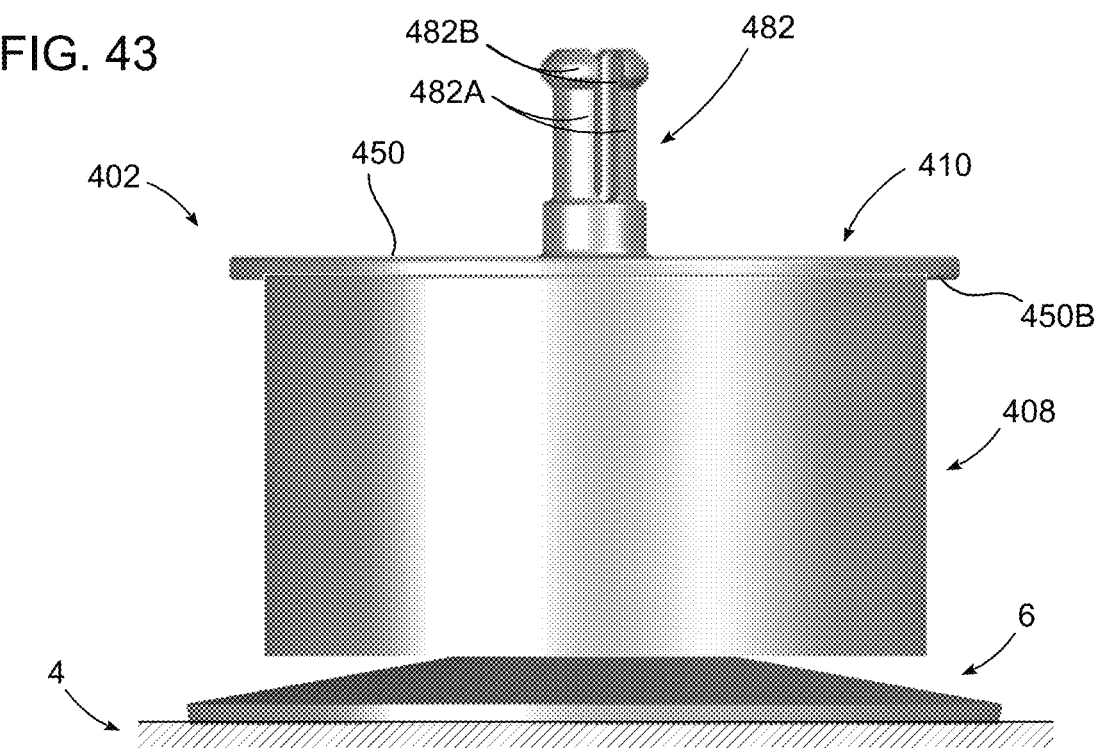
FIG. 43 is a side view showing the anchoring apparatus of FIG. 42.

As shown in each of FIGS. 42-44, the main body 450 of the second auxiliary component 410 may be configured as a universal carrier that can mount any number of separate attachments, each of which is configured for holding one or more specific items. In particular, a universal mounting structure 482 may extend upwardly from the center (or other location) of the main body 450. The universal mounting structure 482 may have the same configuration as the universal mounting structure 82 previously described in connection with FIGS. 22-23. The universal mounting structure 482 may thus take the form of a male connector with two closely-spaced vertical prongs 482A of hemispherical cross-section, each having a radially outwardly-extending flange 482B on its free end. Many other connector designs could also be used. Attachments to be connected to the mounting structure 482 may be formed with counterpart female connectors. Attachments such as the smartphone carrier attachment 84 of FIG. 22 and the bottle-holding attachment 94 of FIG. 23 may be used, among many others.

It will be seen in FIGS. 42-47 that the anchoring apparatus 402 may be implemented as a three-component assembly whose components include the seal member 6, the first auxiliary component 408, and the second auxiliary component 410. When the anchoring apparatus 402 is resting on the support surface 4 in the manner shown in FIG. 46, a user can grasp the secondary body 450 of the second auxiliary component 10, or a structure attached thereto (not shown) via the mounting structure 482, or the mounting structure itself if nothing is attached thereto, and lift the anchoring apparatus 402 upwardly in a normal manner. Doing so will lift the second auxiliary component 410 to its upper position (as shown in FIG. 47), cause the vent port 20 to unblock, and vent the controlled pressure zone 48. As a result, the anchoring apparatus 402 may then be lifted away from the reference surface 4 without any apparent resistance above and beyond its own weight and the weight of any item(s) or material(s) being carried thereby, as well as the resistance generated by deforming the flexible members 460. If, on the other hand, the anchoring apparatus 402 is resting on the reference surface 4 and is impacted by a side load that would otherwise tip the anchoring apparatus and dislodge or spill the item(s) or material(s) carried thereby, the vent port 20 will remain closed so long as the vent port 26 is directly or indirectly engaged by the stem engagement structure 454 of the second auxiliary component 410. Instead of the anchoring apparatus 402 tipping, the base seal member 11 will deform in a manner that tends to increase the volume of the controlled pressure zone 48, causing the air pressure therein to decrease so as to develop a dynamically increasing suction force that stabilizes the anchoring apparatus on the reference surface 4.

It will be appreciated that the various anchoring apparatus described above in connection with FIGS. 1-47 could be embodied in many other shapes and sizes to provide different types of carriers, holders and containers, including but not limited to bowls, buckets, cans, vases, urns, tanks, or any other receptacle apparatus whose function is to hold various types of spillable contents, such as liquids, semi-liquids, solids or semi-solids. The anchoring apparatus could also function to hold a separate carrier, holder or container, such as a can or bottle anchoring apparatus that holds a beverage can or bottle.

Accordingly, a quick-release anchoring apparatus with acceleration damping has been disclosed. Reference in the present disclosure to an "embodiment" means that a particular feature, structure or characteristic described in connection with the embodiment may be included in at least one embodiment of the disclosed device. Thus, the appearances of the term "embodiment" in various places throughout the specification are not necessarily all referring to the same embodiment.

For purposes of explanation, specific configurations and details have been set forth herein in order to provide a thorough understanding of the present invention. However, it will be apparent to one of ordinary skill in the art that embodiments of the present invention may be practiced without the specific details presented herein. Furthermore, well-known features may have been omitted or simplified in order not to obscure the present invention. Various examples may be given throughout this description. These examples are merely descriptions of specific embodiments of the invention. The scope of the invention is not limited to the examples given.

As used in this application, the terms such as "upper," "lower," "top," "bottom," "vertical," "vertically," "lateral," "laterally," "inner," "outer," "outward," "inward," "front," "frontward," "forward," "rear," "rearward," "upwardly," "downwardly," "inside," "outside," "interior," "exterior," and other orientational descriptors are intended to facilitate the description of the example embodiments of the present disclosure, and are not intended to limit the structure of the example embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Terms of rough approximation, such as "generally," are understood by those of ordinary skill to refer to a characteristic or feature of that bears resemblance to something, such that it is reasonable to draw a comparison to facilitate understanding, without requiring that the characteristic or feature be exactly the same, or even substantially the same, as the thing to which it is compared.

Although example embodiments have been shown and described, it should be apparent that many variations and alternative embodiments could be implemented in accordance with the present disclosure. It is understood, therefore, that the invention is not to be in any way limited except in accordance with the spirit of the appended claims and their equivalents.

What is claimed is:

1. A quick-release anchoring apparatus with acceleration damping, comprising:
an anchor member comprising a non-porous resilient material;
the anchor member comprising a flexible base seal member having a seal member upper side, a seal member lower side, and a seal member peripheral edge defining an outer periphery of the seal member upper side and the seal member lower side;

the seal member lower side being configured to engage an external reference surface and form a substantially airtight seal therewith that defines a controlled pressure zone, the controlled pressure zone comprising a region located between the seal member lower side and the reference surface;

a vent port extending through the anchor member having a lower end in fluid communication with the controlled pressure zone and an upper end in fluid communication with an area of ambient pressure;

a first auxiliary component carrying the seal member;

a second auxiliary component that is movable relative to the first auxiliary component between a first position and a second position, the second auxiliary component and the first auxiliary component being discrete components formed independently of each other;

the first position of the second auxiliary component comprising a vent port closure position wherein the second auxiliary component is arranged to cause blocking of the vent port and prevent the passage of air therethrough, such that the controlled pressure zone is rendered airtight and the base seal member will resist movement of the anchoring apparatus away from the reference surface when the base seal member is flexed in a manner that increases the volume of the controlled pressure zone and decreases the air pressure therein;

the second position of the second auxiliary component comprising a vent port open position wherein the second auxiliary component is arranged to cause unblocking of the vent port and allow the passage of air therethrough, such that the controlled pressure zone is vented to the area of ambient pressure and the base seal member will not resist movement of the anchoring apparatus away from the reference surface;

one or more flexible members that resiliently deform to generate resistance as the second auxiliary component moves in a venting direction away from the vent port closure position toward the vent port open position, and return to their initial form when the second auxiliary component returns to the vent port closure position;

the one or more flexible members being connected between the first and second auxiliary components, with the first auxiliary component providing a vertically stable reference end thereof;

the one or more flexible members being independent of the anchor member and non-reliant on pressure within the controlled pressure zone for generating the resistance;

whereby the resistance generated by deforming the one or more flexible members resists accelerations of the second auxiliary component away from the vent port closure position so as to prevent unwanted venting of the controlled pressure zone due to forces of a first magnitude acting on the anchoring apparatus in the venting direction; and whereby the resistance generated by deforming the one or more flexible members is insufficient to prevent movement of the second auxiliary component away from the vent port closure position during normal use of the anchoring apparatus in which a controlled force of a second magnitude in excess of the first magnitude is applied to the anchoring apparatus, so as to facilitate intentional venting of the controlled pressure zone and removal of the anchoring apparatus from the reference surface by a user.

2. The apparatus of claim 1, wherein the one or more flexible members are resiliently deformed when the second auxiliary component is in the vent port closure position in order to impart a preload force to the second auxiliary component.

3. The apparatus of claim 1, wherein the one or more flexible members comprise interlocking members respectively disposed on the first auxiliary component and the second auxiliary component.

4. The apparatus of claim 3, wherein the interlocking members comprise first fingers on the first auxiliary component that engage second fingers on the second auxiliary component, one or both of the first and second fingers being flexible.

5. The apparatus of claim 4, wherein the first fingers of the first auxiliary component extend upwardly from a laterally-extending main body of the first auxiliary component and the second fingers of the second auxiliary component extend downwardly from a laterally-extending main body of the second auxiliary component.

6. The apparatus of claim 1, wherein the one or more flexible members comprise an independent spring member disposed between the first auxiliary component and the second auxiliary component.

7. The apparatus of claim 6, wherein the independent spring member comprises a conical spring element, a first side engaging one of the first auxiliary component or the second auxiliary component, a second side engaging the other of the first auxiliary component or the second auxiliary component.

8. The apparatus of claim 7, wherein the conical spring element is vented so as not to inhibit movement of the second auxiliary component.

9. The apparatus of claim 1, wherein the one or more flexible members are disposed on the second auxiliary component and engage flexible member engagement elements of the first auxiliary component.

10. The apparatus of claim 1, wherein the one or more flexible members on the first auxiliary component comprise cantilevered beam members and the flexible member engaging elements of the second auxiliary component comprise flexible member retention openings that receive the flexible cantilevered beam members.

11. The apparatus of claim 1, wherein the anchor member comprises an anchor member stem on the seal member upper side that extends through an anchor member engagement opening in the first auxiliary component and mounts the anchor member to the first auxiliary component, and wherein the vent port extends through the anchor member stem.

12. The apparatus of claim 1, wherein the anchor member comprises a central dome that engages a lower side of the first auxiliary component and is retained on the first auxiliary component by an anchor member retainer that engages the seal member lower side, and includes a retainer bore that forms a lower part of the vent port that aligns with a bore in the first auxiliary component that forms an upper part of the vent port.

13. The apparatus of claim 1, wherein the second auxiliary component causes blocking of the vent port in the vent port closure position by directly or indirectly engaging a vent port upper end.

14. The apparatus of claim 13, wherein the second auxiliary component comprises a vent port closure structure that directly or indirectly engages the vent port upper end.

15. The apparatus of claim 14, wherein the vent port closure structure blankets the vent port upper end or a vent port closure member on the anchor member stem.

16. The apparatus of claim 14, wherein the vent port closure structure comprises a non-planar structure that engages the vent port upper end or a vent port closure member on the anchor member stem.

17. The apparatus of claim 1, wherein the second auxiliary component comprises a dedicated carrier configured to carry one or more items or materials.

18. The apparatus of claim 17, wherein the second auxiliary component comprises a universal carrier configured to interchangeably mount an assortment of attachments, each of which carries one or more items or materials.

19. A quick-release anchoring apparatus with acceleration damping, comprising:
- an anchor member comprising a non-porous resilient material;
- the anchor member comprising a flexible base seal member having a seal member upper side, a seal member lower side, and a seal member peripheral edge defining an outer periphery of the seal member upper side and the seal member lower side;
- the seal member lower side being configured to engage an external reference surface and form a substantially airtight seal therewith that defines a controlled pressure zone, the controlled pressure zone comprising a region located between the seal member lower side and the reference surface;
- a vent port extending through the anchor member having a lower end in fluid communication with the controlled pressure zone and an upper end in fluid communication with an area of ambient pressure;
- a first auxiliary component carrying the anchor member;
- a second auxiliary component that is movable relative to the first auxiliary component between a first position and a second position, the second auxiliary component and the first auxiliary component being discrete components formed independently of each other;
- the first position of the second auxiliary component comprising a vent port closure position wherein the second auxiliary component is arranged to cause blocking of the vent port and prevent the passage of air therethrough, such that the controlled pressure zone is rendered airtight and the base seal member will resist movement of the anchoring apparatus away from the reference surface when the base seal member is flexed in a manner that increases the volume of the controlled pressure zone and decreases the air pressure therein;
- the second position of the second auxiliary component comprising a vent port open position wherein the second auxiliary component is arranged to cause unblocking of the vent port and allow the passage of air therethrough, such that the controlled pressure zone is vented to the area of ambient pressure and the base seal member will not resist movement of the anchoring apparatus away from the reference surface;
- one or more flexible members that resiliently deform to generate resistance as the second auxiliary component moves in a venting direction away from the vent port closure position toward the vent port open position, and return to their initial form when the second auxiliary component returns to the vent port closure position;
- the one or more flexible members being connected between the first and second auxiliary components, with the first auxiliary component providing a vertically stable reference end thereof;
- the one or more flexible members being independent of the anchor member and non-reliant on pressure within the controlled pressure zone for generating the resistance;
- the flexible members being selected from the group consisting of (1) interlocking members respectively disposed on the first auxiliary component and the second auxiliary component, (2) an independent spring member disposed between the first auxiliary component and the second auxiliary component, and (3) one or more flexible members disposed on the second auxiliary component that engage flexible member engaging elements of the first auxiliary component;
- whereby the resistance generated by flexibly deforming the one or more flexible members resists accelerations of the second auxiliary component away from the vent port closure position so as to prevent unwanted venting of the controlled pressure zone due to forces of a first magnitude acting on the anchoring apparatus in the venting direction; and
- whereby the resistance generated by flexibly deforming the one or more flexible members is insufficient to prevent movement of the second auxiliary component away from the vent port closure position during normal use of the anchoring apparatus in which a controlled force of a second magnitude in excess of the first magnitude is applied to the anchoring apparatus, so as to facilitate intentional venting of the controlled pressure zone and removal of the anchoring apparatus from the reference surface by a user.

20. A quick-release anchoring apparatus with acceleration damping, comprising:
- an anchor member comprising a non-porous resilient material;
- the anchor member comprising a flexible seal member having a seal member upper side, a seal member lower side, and a seal member peripheral edge defining an outer periphery of the seal member upper side and the seal member lower side;
- the seal member lower side being configured to engage an external reference surface and form a substantially airtight seal therewith that defines a controlled pressure zone, the controlled pressure zone comprising a region located between the seal member lower side and the reference surface;
- a first auxiliary component carrying the anchor member;
- a vent port having a lower end in fluid communication with the controlled pressure zone and an upper end in fluid communication with an area of ambient pressure;
- a second auxiliary component that is movable relative to the first auxiliary component between a first position and a second position, the second auxiliary component and the first auxiliary component being discrete components formed independently of each other;
- the first position of the second auxiliary component comprising a vent port closure position wherein the second auxiliary component is arranged to cause blocking of the vent port and prevent the passage of air therethrough, such that the controlled pressure zone is rendered airtight and the seal member will resist movement of the anchoring apparatus away from the reference surface when the seal member is flexed in a manner that increases the volume of the controlled pressure zone and decreases the air pressure therein;

the second position of the second auxiliary component comprising a vent port open position wherein the second auxiliary component is arranged to cause unblocking of the vent port and allow the passage of air therethrough, such that the controlled pressure zone is vented to the area of ambient pressure and the sealing member will not resist movement of the anchoring apparatus away from the reference surface;

one or more flexible members that resiliently deform to generate resistance as the second auxiliary component moves in a venting direction away from the vent port closure position toward the vent port open position, and return to their initial form when the second auxiliary component returns to the vent port closure position;

the one or more flexible members being connected between the first and second auxiliary components, with the first auxiliary component providing a vertically stable reference end thereof;

the one or more flexible members being independent of the anchor member and non-reliant on pressure within the controlled pressure zone for generating the resistance;

whereby the resistance generated by flexibly deforming the one or more flexible members resists accelerations of the second auxiliary component away from the vent port closure position so as to prevent unwanted venting of the controlled pressure zone due to forces of a first magnitude acting on the anchoring apparatus in the venting direction;

whereby the resistance generated by flexibly deforming the one or more flexible members is insufficient to prevent movement of the second auxiliary component away from the vent port closure position during normal use of the anchoring apparatus in which a controlled force of a second magnitude in excess of the first magnitude is applied to the anchoring apparatus, so as to facilitate intentional venting of the controlled pressure zone and removal of the anchoring apparatus from the reference surface by a user;

the vent port being disposed wholly or partially in the anchor member;

the second auxiliary component comprising either a dedicated carrier configured to carry one or more items or materials or a universal carrier configured to interchangeably mount an assortment of attachments, each of which carries one or more items or materials; and the second auxiliary component being slidably mounted to the first auxiliary component.

* * * * *